US006882970B1

(12) United States Patent
Garner et al.

(10) Patent No.: US 6,882,970 B1
(45) Date of Patent: Apr. 19, 2005

(54) LANGUAGE RECOGNITION USING SEQUENCE FREQUENCY

(75) Inventors: Philip Neil Garner, Guildford (GB); Jason Peter Andrew Charlesworth, Haslemere (GB); Asako Higuchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 463 days.

(21) Appl. No.: 09/695,078

(22) Filed: Oct. 25, 2000

(30) Foreign Application Priority Data

Oct. 28, 1999 (GB) ............................................. 9925574
Oct. 28, 1999 (GB) ............................................. 9925576
Oct. 13, 2000 (GB) ............................................. 0025142
Oct. 13, 2000 (GB) ............................................. 0025202

(51) Int. Cl.[7] .......................... G10L 15/08; G06F 17/20
(52) U.S. Cl. ......................... 704/236; 704/239; 707/6
(58) Field of Search ............................... 704/238, 239, 704/240, 241, 242, 236, 234; 707/3, 6

(56) References Cited

U.S. PATENT DOCUMENTS

| | | |
|---|---|---|
| 4,227,176 A | 10/1980 | Moshier |
| 4,736,429 A | 4/1988 | Niyada et al. |
| 4,903,305 A | 2/1990 | Gillick et al. |
| 4,975,959 A | 12/1990 | Benbassat |
| 4,980,918 A | 12/1990 | Bahl et al. |
| 4,985,924 A | 1/1991 | Matsuura |
| 5,075,896 A | 12/1991 | Wilcox et al. |
| 5,131,043 A | 7/1992 | Fujii et al. |
| 5,136,655 A | 8/1992 | Bronson |
| 5,202,952 A | 4/1993 | Gillick et al. |
| 5,333,275 A | 7/1994 | Wheatley et al. |
| 5,390,278 A | 2/1995 | Gupta et al. |
| 5,500,920 A | 3/1996 | Kupiec |
| 5,577,249 A | 11/1996 | Califano |

(Continued)

FOREIGN PATENT DOCUMENTS

| | | |
|---|---|---|
| EP | 0 649 144 A1 | 10/1993 |
| EP | 0 649 144 B1 | 10/1993 |
| EP | 0 597 798 | 5/1994 |
| EP | 0 689 153 | 12/1995 |
| EP | GB 2 302 199 | 1/1997 |
| EP | 789349 | 8/1997 |
| EP | 849723 | 6/1998 |
| GB | 2 331 816 A | 6/1999 |
| GB | 2349260 | 10/2000 |
| WO | WO 98/47084 | 10/1988 |

(Continued)

OTHER PUBLICATIONS

Gerber, C., "A General Approach to Speech Recognition", *Proceedings of the Final Workshop on Multimedia Information Retrieval (Miro '95)*, Glasgow, Scotland (Sep. 18–20, 1995) pp. 1–12.

Okawa, S., et al., "Automatic Training of Phoneme Dictionary Based on Mutual Information Criterion", *IEEE* (1994), pp. 241–244.

(Continued)

Primary Examiner—Richemond Dorvil
Assistant Examiner—Martin Lerner
(74) Attorney, Agent, or Firm—Fitzpatrick, Cella, Harper & Scinto

(57) ABSTRACT

A system is provided for comparing an input query with a number of stored annotations to identify information to be retrieved from a database. The comparison technique divides the input query into a number of fixed-size fragments and identifies how many times each of the fragments occurs within each annotation using a dynamic programming matching technique. The frequencies of occurrence of the fragments in both the query and the annotation are then compared to provide a measure of the similarity between the query and the annotation. The information to be retrieved is then determined from the similarity measures obtained for all the annotations.

130 Claims, 23 Drawing Sheets

U.S. PATENT DOCUMENTS

| | | | |
|---|---|---|---|
| 5,594,641 A | | 1/1997 | Kaplan et al. |
| 5,640,487 A | * | 6/1997 | Lau et al. .................... 704/243 |
| 5,649,060 A | | 7/1997 | Ellozy et al. |
| 5,675,706 A | | 10/1997 | Lee et al. |
| 5,680,605 A | | 10/1997 | Torres |
| 5,684,925 A | | 11/1997 | Morin et al. |
| 5,708,759 A | | 1/1998 | Kemeny |
| 5,721,939 A | | 2/1998 | Kaplan |
| 5,729,741 A | | 3/1998 | Liaguno et al. |
| 5,737,489 A | | 4/1998 | Chou et al. |
| 5,737,723 A | | 4/1998 | Riley et al. |
| 5,752,227 A | | 5/1998 | Lyberg |
| 5,781,884 A | | 7/1998 | Pereira et al. |
| 5,799,267 A | | 8/1998 | Siegel |
| 5,835,667 A | | 11/1998 | Wactlar et al. |
| 5,852,822 A | | 12/1998 | Srinivasan et al. |
| 5,870,740 A | | 2/1999 | Rose et al. |
| 5,873,061 A | | 2/1999 | Hab-Umbach et al. |
| 5,907,821 A | * | 5/1999 | Kaji et al. ..................... 704/4 |
| 5,983,177 A | | 11/1999 | Wu et al. |
| 5,999,902 A | | 12/1999 | Scahill et al. ............... 704/240 |
| 6,026,398 A | | 2/2000 | Brown et al. |
| 6,061,679 A | | 5/2000 | Bournas et al. |
| 6,182,039 B1 | | 1/2001 | Rigazio et al. |
| 6,192,337 B1 | | 2/2001 | Ittycheriah et al. ......... 704/231 |
| 6,236,964 B1 | * | 5/2001 | Tamura et al. .............. 704/254 |
| 6,243,680 B1 | | 6/2001 | Gupta et al. |
| 6,272,242 B1 | * | 8/2001 | Saitoh et al. ............... 382/187 |
| 6,314,400 B1 | * | 11/2001 | Klakow ...................... 704/257 |
| 6,321,226 B1 | | 11/2001 | Garber et al. |
| 6,389,395 B1 | | 5/2002 | Ringland |
| 6,487,532 B1 | | 11/2002 | Schoofs et al. |
| 6,535,850 B1 | | 3/2003 | Bayya ........................ 704/239 |
| 6,567,778 B1 | | 5/2003 | Chao Chang et al. ...... 704/257 |
| 6,567,816 B1 | | 5/2003 | Desai et al. |
| 2002/0022960 A1 | | 2/2002 | Charlesworth et al. |
| 2002/0052740 A1 | | 5/2002 | Charlesworth et al. |

FOREIGN PATENT DOCUMENTS

| | | |
|---|---|---|
| WO | WO 99/05681 | 2/1999 |
| WO | 00/31723 | 6/2000 |
| WO | WO 00/54168 | 9/2000 |
| WO | WO 01/31627 | 5/2001 |
| WO | WO 02/27546 | 4/2002 |

OTHER PUBLICATIONS

Rahim, M. et al., "A Neural Tree Network for Phoneme Classificiation With Experiments on the Timit Database", *IEEE* (1992), pp. II–345–II–348.

Sankoff, D., et al, "Time Warps, String Edits, and Macromolecules: The Theory and Practice Of Sequence Comparison", Bell Laboratories and David Sankoff (1983), Ch. One, pp. 1–44; Part Three, pp. 211–214; Ch. Eleven, pp. 311–321, Ch. Sixteen, pp. 359–362.

Wang, H., "Retrieval of Mandarin Spoken Documents Based on Syllable Lattice Matching", *Pattern Recognition Letters* (Jun. 2000), 21, pp. 615–624.

Berge, C., "Graphs And Hypergraphs", North Holland Mathematical Library, Amsterdam (1976) p. 175.

Gelin, P. & Wellekens, C. J., "Keywords Spotting For Video Soundtrack Indexing", *1996 IEEE Int. Conf. on Acoustics, Speech, and Sig. Proc.*, ICASSP-96, Conference Proceedings (May 7–10, 1996), vol. 1, pp. 299–302.

James, D.A. & Young, S. J., "A Fast Lattice–Based Approach To Vocabulary Independent Wordspotting", 1994 *IEEE Int. Conf. on Acoustics, Speech, and Sig. Proc.*, ICASSP–94, vol. i (Adelaide, Australia, Apr. 19–22, 1994), pp. I–377–380.

Lee, K., "Automatic Speech Recognition: The Development Of the SPHINX System", Kluwar Academic Publishers (1989), pp. 28–29.

Rabiner & Juang, "Fundamentals Of Speech Recognition" (1993), pp. 42–50.

Sankoff, D., et al., "Time Warps, String Edits, and Macromolecules: The Theory And Practice Of Sequence Comparison", Bell Laboratories and David Sankoff (1983), Ch. One, pp. 1–44; Part Three, pp. 211–214; Ch. Eleven, pp. 311–218, Ch. Sixteen, pp. 359–362.

Bahl, L. R., et al., "A Method For The Construction Of Acoustic Markov Models For Words," *IEEE Transactions on Speech and Audio Processing*, vol. 1, No. 4 (Oct. 1993), pp. 443–452.

Bird, S. & Liberman, M., "Towards a Formal Framework for Linguistic Annotations," *Presented At The International Conference On Spoken Language Processing*, (Sydney, Australia, Dec. 1998).

Bird, S. & Liberman, M., "A Formal Framework for Linguistic Annotation," Mar., 1999.

Bird, S. & Liberman, M., "A Framework for Linguistic Annotation," Aug. 13, 1999.

Cassidy, S. & Harrington, J., "EMU: An Enhanced Hierarchical Speech Data Management System," *Proc. Of the 6th Australian Speech Science and Technology Conference* (Adelaide 1996), pp. 381–386.

Gagnoulet, C., et al., "Marievox: A Voice–Activated Information System," *Speech Communication*, vol. 10, No. 1 (Feb. 1991), pp. 23–31.

Markowitz, J. A., "*Using Speech Recognition*," Prentice Hall (1996), pp. 220–221.

Srinivasan, S., et al., "Phonetic Confusion Matrix Based Spoken Document Retrieval," *Proceedings Of The 23rd Annual International ACM SIGIR Conference On Research And Development In Information Retrieval*, (Jul. 24–28, 2000), pp. 81–87.

Wechsler, M., "Spoken Document Retrieval Based on Phoneme Recognition," *Swiss Federal Institute of Technology*, (Zurich, 1998).

Wold, E., et al., "Content–Based Classification, Search, and Retrieval of Audio," *IEEE Multimedia*, vol. 3, No. 3 (Fall 1996), pp. 27–36.

Schmid, P., et al., "Automatically generated word pronunciations from phoneme classifier output", Statistical Signal And Array Processing. Minneapolis, Apr. 27–30, 1993, Proceedings Of The International Conference On Acoustics, Speech, And Signal Processing (ICASSP), New York, IEEE, US, vol. 4, Apr. 27, 1993, pp. 223–226, XP010110434 ISBN: 0–7803–0964–4.

"Template Averaging For Adapting A Dynamic Time Warping Speech" IBM Technical Disclosure Bulletin, IBM Corp. New York, US, vol. 32, No. 11, Apr. 1, 1990, pp. 22–426, XP000097761 ISSN: 0018–8689.

Jain, N., et al., Creating speaker–specific phonetic templates with a speaker–independent phonetic recognizer: implications for voice dialing 1996 IEEE International Conference On Acoustics, Speech, And Signal Processing Conference Proceedings (Cat. No. 96CH35903), 1996 IEEE International Conference On Acoustics, Speech, And Signal Processing Conference Proceedings, Atlanta, GA, USA, 7–10 M, pp. 881–884 vol. 2, XP002194439 1996, New York, NY USA, IEEE, USA ISBN: 0–7803–3192–3.

Zobel, J., et al., Phonetic String Matching: Lessons From Information Retrieval Sigir Forum, Association For Computing Machinery, New York, US, 1996, pp. 166–172, XP000870222.

J. Skilling, "*Classic Maximum Entropy,*" Maximun Entropy and Bayesian Methods, pp. 45–52 (1989,) by Kluwer Academic Publishers.

Jokinen, P. et al., "*A Comparison of Approximate String Matching Algorithms,*" Software Practice & Experience, GB, John Wiley & Sons Ltd., Chichester, vol. 26, No. 12 (Dec. 1, 1996), pp. 1439–1458, XP000655612, ISSN: 0038–0644.

Besling, S., "*A Statistical Approach to Multilingual Phonetic Transcription,*" Philips Journal of Research, NL, Elsevier, Amsterdam, vol. 49, No. 4 (1995), pp. 367–379, XP004000261, ISSN: 0165–5817.

Haeb–Umbach, R., et al., "*Automatic Transcription of Unknown Words in a Speech Recognitions System,*" 0–7803–2431–5/95 (1995), IEEE, pp. 840–843.

Witbrock, M.J., et al., "*Using Words and Phonetic Strings for Efficient Information Retrieval from Perfectly Transcribed Spoken Documents,*" School of Computer Sciences, Carnegie Mellon University, XP–002146047, 1997.

Ng, K., "*Survey of Approaches to Informational Retrieval of Speech Messages,*" Spoken Language Systems Group, Laboratory of Computer Science, Massachusetts Institute of Technology (Feb. 16, 1996), pp. 1–34.

Ng, K., et al., "*Subword Unit Representations for Spoken Document Retrieval,*" Spoken Language Systems Group, MIT Laboratory for Computer Science, MA 02139, USA, 1997 (?).

Ng, K., et al., "*Phonetic Recognition for Spoken Document Retrieval,*" Spoken Language Systems Group, MIT Laboratory for Computer Science, MA 02139, USA, 1998 (?).

Wechsler, M., et al., "*Spoken Document Retrieval Based on Phoneme Recognitions,*" Dissertation submitted to the Swiss Federal Institute of Technology (ETH) Zurich (1998) DISS.ETH No. 12879, pp. 1–x and 1–121.

Foote, J.T., et al., "*Unconstrained Keyword Spotting Using Phone Lattices With Application to Spoken Document Retrieval,*" Computer Speech and Language (1997) 11, pp. 207–224.

Wright, J.H., et al., "*Statistical Models for Topic Identification Using Phoneme Substrings,*" IEEE (1996), 0–780303192–3/96, pp. 307–310.

Kobayashi, Y., et al., *Matching Algorithms Between a Phonetic Lattice and Two Types of Templates—Lattice and Graph*, Dept. of Computer Science, Kyoto Institute of Technology, IEEE (1985), CH2118–8/85/0000–1597, pp. 1597–1600.

Micca, G., et al., "*Three Dimensional DP for Phonetic Lattice Matching,*" International Conference on Digital Signal Processing, Fierence, Italy (1987), pp. 547–551.

Sankoff, D., et al., "*Time Warps, String Edits and Macromolecules,*" David Hume Series, CSLI Publication, Center for the Study of Language and Information, Leland Stanford Junior University, USA (1999), ISBN: 1–57586–217–4.

Scheil, et al., "The Partitur Format at BAS", In Proceedings of the First International Conference on Language Resources and Evaluation, Grandada, Spain, 1998, 7 pages.

* cited by examiner

LANGUAGE RECOGNITION USING SEQUENCE FREQUENCY

BACKGROUND OF THE INVENTION

1. Field of the Invention

The present invention relates to an apparatus and method for matching sequences of phonemes or the like. The invention can be used to search a database of data files having associated phonetic annotations, in response to a user's input query. The input query may be a voiced or typed query.

2. Description of the Related Art

Databases of information are well known and suffer from the problem of how to locate and retrieve the desired information from the database quickly and efficiently. Existing database search tools allow the user to search the database using typed keywords. Whilst this is quick and efficient, this type of searching is not suitable for various kinds of databases, such as video or audio databases.

A recent proposal has been made to annotate such video and audio databases with a phonetic transcription of the speech content in the audio and video files, with subsequent retrieval being achieved by comparing a phonetic transcription of a user's input query with the phoneme annotation data in the database. The technique proposed for matching the sequences of phonemes firstly defines a set of features in the query, each feature being taken as an overlapping fixed size fragment from the phoneme string, it then identifies the frequency of occurrence of the features in both the query and the annotation and then finally determines a measure of the similarity between the query and the annotation using a cosine measure of these frequencies of occurrences. One advantage of this kind of phoneme comparison technique is that it can cope with situations where the sequence of words of the query do not exactly match the sequence of words of the annotation. However, it suffers from the problem that it is prone to error especially when the query and the annotation are spoken at different speeds and if there are any deletions of parts of words from the query, but not from the annotation, or vice versa.

SUMMARY OF THE INVENTION

The present invention aims to provide an alternative technique for matching sequences of phonemes.

According to one aspect, the present invention provides a feature comparison apparatus comprising: means for receiving first and second sequences of features; means for identifying a plurality of different first sub-sequences of features within said first sequence of features; first determining means for determining and outputting the number of times each of said different first sub-sequences occurs within said first sequence of features; means for defining a plurality of second sub-sequences of features from said second sequence of features; second determining means for determining and outputting the number of times each of said different first sub-sequences occurs within said second sequence of features by comparing each first sub-sequence of features with each second sub-sequence of features; and means for computing a measure of the similarity between the first and second sequences of features by comparing the numbers output from said first determining means with the numbers output from said second determining means; characterised in that said second determining means comprises: means for comparing a current first sub-sequence of features with each second sub-sequence of features using predetermined data including similarity information which defines similarities between different features, to provide a set of similarity measures; means for thresholding each similarity measure of the set with a predetermined threshold value and for outputting a threshold result; and means for incrementing a count associated with the current first sub-sequence of features in dependence upon said threshold result.

According to another aspect, the present invention provides a feature comparison method comprising the steps of: receiving first and second sequences of features; identifying a plurality of different first sub-sequences of features within said first sequence of features; a first determining step of determining and outputting the number of times each of said different first sub-sequences occurs within said first sequence of features; defining a plurality of second sub-sequences of features from said second sequence of features; a second determining step of determining and outputting the number of times each of said different first sub-sequences occurs within said second sequence of features by comparing each first sub-sequence of features with each second sub-sequence of features; and means for computing a measure of the similarity between the first and second sequences of features by comparing the numbers output from said first determining step with the numbers output from said second determining step; characterised in that said second determining step comprises the steps of: comparing a current first sub-sequence of features with each second sub-sequence of features using predetermined data including similarity information which defines similarities between different features, to provide a set of similarity measures; thresholding each similarity measure of the set with a predetermined threshold value and outputting a threshold result; and incrementing a count associated with the current first sub-sequence of features in dependence upon said threshold result.

According to another aspect, the present invention provides a feature comparison apparatus comprising means for receiving first and second sequences of features; means for identifying a plurality of different first sub-sequences of features within said first sequence of features; first obtaining means for obtaining the number of times each of said different first sub-sequences occurs within said first sequence of features:
  second obtaining means for obtaining the number of times each of said different first sub-sequences occurs within said second sequence of features; and means for computing a similarity score representative of the similarity between the first and second sequences of features using the numbers obtained from said first and second obtaining means; characterised in that the apparatus further comprises third obtaining means for obtaining the total number of sub-sequences of features in said second sequence; and in that said computing means comprises:
  first computing means for computing a measure of the probability of each of said first sub-sequences occurring in said second sequence of features using the numbers obtained from said second obtaining means and the number obtained from said third obtaining means; and second computing means for computing said similarity score by taking products of said computed probability measures in dependence upon said numbers obtained from said first obtaining means.

According to another aspect, the present invention provides an apparatus for searching a database comprising a plurality of information entries to identify information to be retrieved therefrom, each of said plurality of information entries having an associated annotation comprising a sequence of speech features, the apparatus comprising:

means for receiving an input query comprising a sequence of speech features; the above feature comparison apparatus for comparing said query sequence of speech features with the speech features of each annotation to provide a set of comparison results; and means for identifying said information to be retrieved from said database using said comparison results; characterised in that said apparatus according to any of claims 1 to 44 has a plurality of different comparison modes of operation and in that the apparatus further comprises:

means for determining (i) if the query sequence of speech features was generated from an audio signal or from text; and (ii) if the sequence of speech features of a current annotation was generated from an audio signal or from text, and for outputting a determination result; and means for selecting, for the current annotation, the mode of operation of said apparatus in dependence upon said determination result.

BRIEF DESCRIPTION OF THE DRAWINGS

Exemplary embodiments of the present invention will now be described with reference to FIGS. 1 to 24, in which:

FIG. 19b is a plot illustrating the way in which a dynamic programming score varies with a comparison of a query with an annotation in the embodiment illustrated in FIG. 19a;

DETAILED DESCRIPTION OF THE PREFERRED EMBODIMENTS

Embodiments of the present invention can be implemented using dedicated hardware circuits, but the embodiment to be described is implemented in computer software or code, which is run in conjunction with processing hardware such as a personal computer, workstation, photocopier, facsimile machine, personal digital assistant (PDA) or the like.

Data File Annotation

Figure 1:
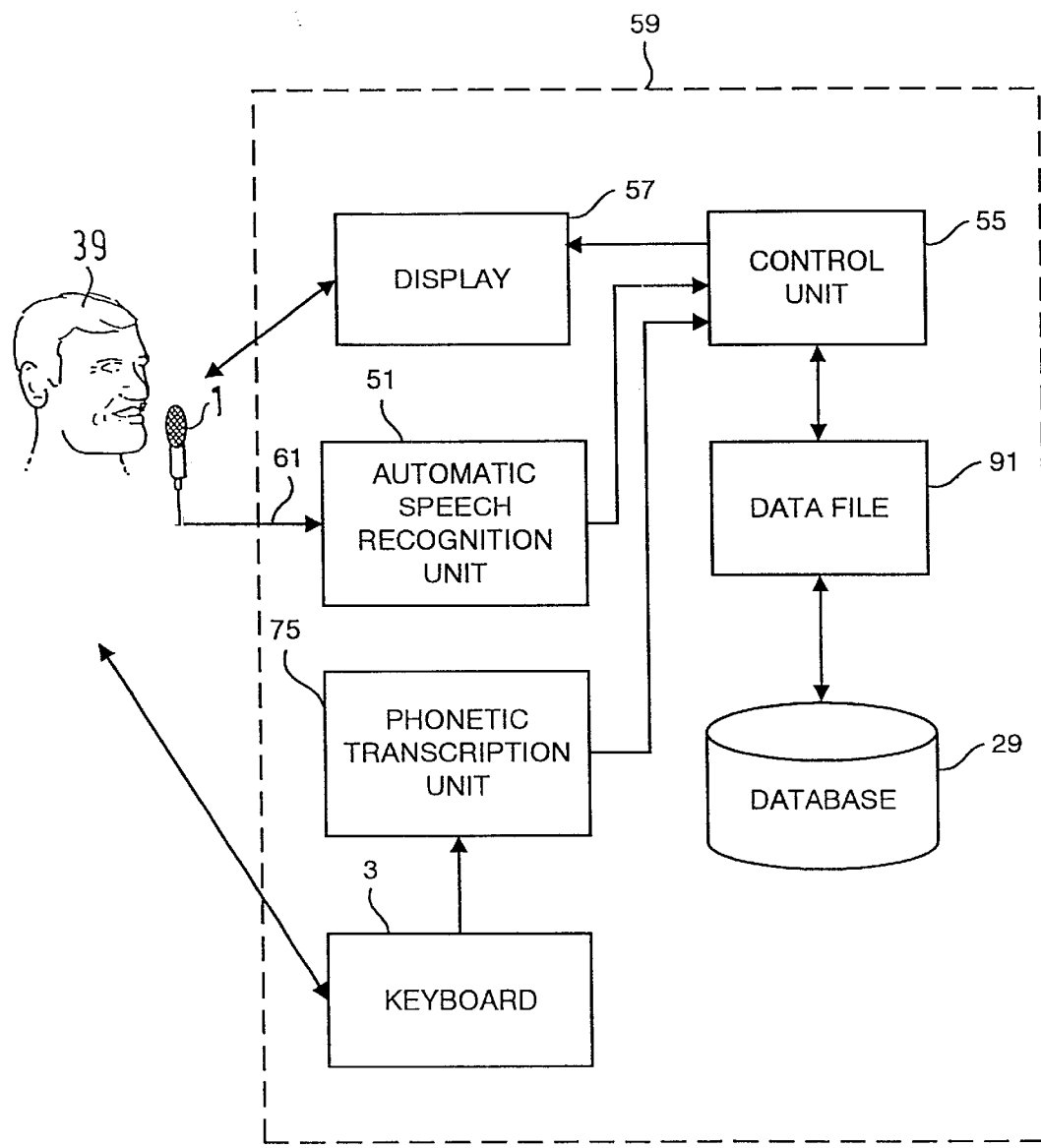
FIG. 1 is a schematic block diagram illustrating a user terminal which allows the annotation of a data file with annotation data generated from a typed or voiced input from a user.
Figure 2:
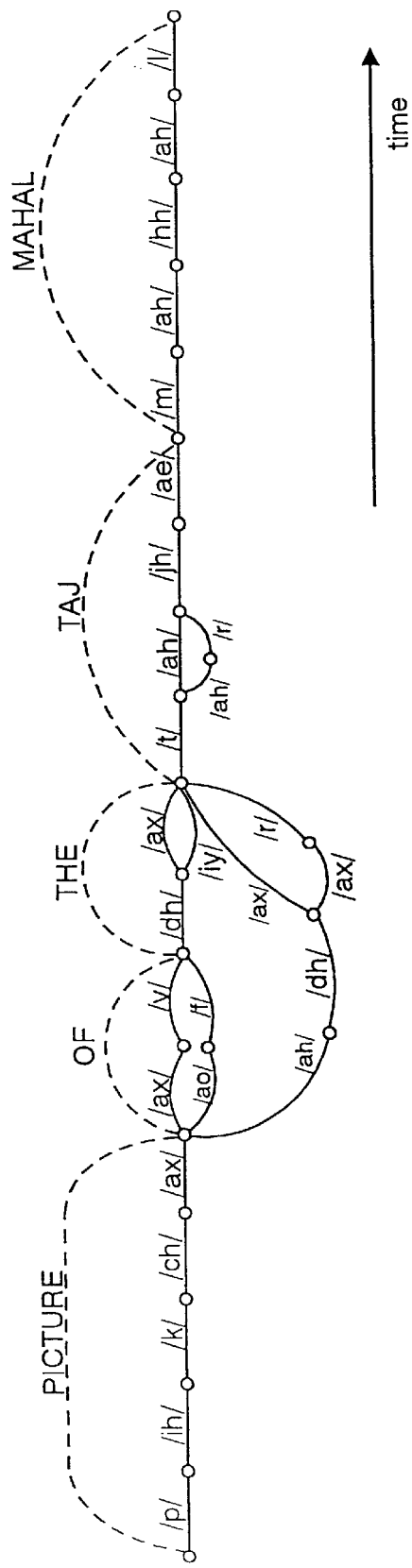
FIG. 2 is a schematic diagram of phoneme and word lattice annotation data which is generated from a typed input by the user for annotating the data file.

FIG. 1 illustrates the form of a user terminal 59 which allows a user to input typed or voiced annotation data via the keyboard 3 and microphone 7 for annotating a data file 91 which is to be stored in a database 29. In this embodiment, the data file 91 comprises a two dimensional image generated by, for example, a camera. The user terminal 59 allows the user 39 to annotate the 2D image with an appropriate annotation which can be used subsequently for retrieving the 2D image from the database 29. In this embodiment, a typed input is converted, by the phonetic transcription unit 75, into phoneme (or phoneme-like) and word lattice annotation data which is passed to the control unit 55. FIG. 2 illustrates the form of the phoneme and word lattice annotation data generated for the typed input "picture of the Taj Mahal". As shown in FIG. 2, the phoneme and word lattice is an acyclic directed graph with a single entry point and a single exit point. It represents different parses of the user's input. As shown, the phonetic transcription unit 75 identifies a number of different possible phoneme strings which correspond to the typed input, from an internal phonetic dictionary (not shown).

Figure 3:
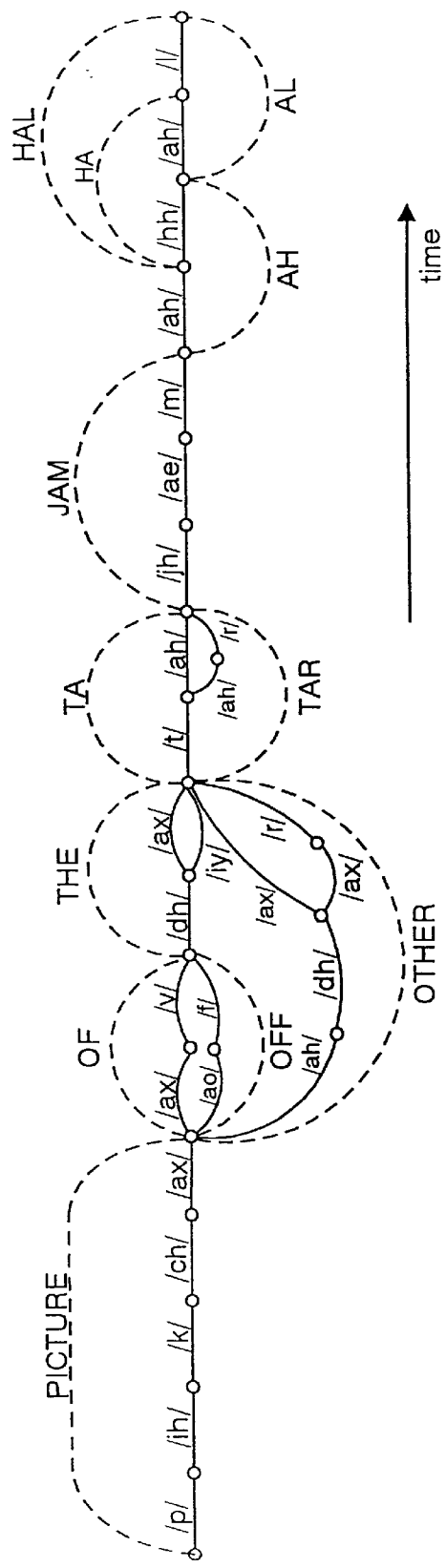
FIG. 3 is a schematic diagram of phoneme and word lattice annotation data which is generated from a voiced input by the user for annotating the data file.

Similarly, a voiced input is converted by the automatic speech recognition unit 51 into phoneme (or phoneme-like) and word lattice annotation data which is also passed to the control unit 55. The automatic speech recognition unit 51 generates this phoneme and word lattice annotation data by (i) generating a phoneme lattice for the input utterance; (ii) then identifying words within the phoneme lattice; and (iii) finally by combining the two. FIG. 3 illustrates the form of the phoneme and word lattice annotation data generated for the input utterance "picture of the Taj Mahal". As shown, the automatic speech recognition unit identifies a number of different possible phoneme strings which correspond to this input utterance. As is well known in the art of speech recognition, these different possibilities can have their own weighting which is generated by the speech recognition unit 51 and is indicative of the confidence of the speech recognition unit's output. In this embodiment, however, this weighting of the phonemes is not performed. As shown in FIG. 3, the words which the automatic speech recognition unit 51 identifies within the phoneme lattice are incorporated into the phoneme lattice data structure. As shown for the example phrase given above, the automatic speech recognition unit 51 identifies the words "picture", "of", "off", "the", "other", "ta", "tar", "jam", "ah", "hal", "ha" and "al".

As shown in FIG. 3, the phoneme and word lattice generated by the automatic speech recognition unit 51 is an acyclic directed graph with a single entry point and a single exit point. It represents different parses of the user's input annotation utterance. It is not simply a sequence of words with alternatives, since each word does not have to be replaced by a single alternative, one word can be substituted for two or more words or phonemes, and the whole structure can form a substitution for one or more words or phonemes. Therefore, the density of the data within the phoneme and word lattice annotation data essentially remains linear throughout the annotation data, rather than growing exponentially as in the case of a system which generates the N-best word lists for the audio annotation input.

In this embodiment, the annotation data generated by the automatic speech recognition unit 51 or the phonetic transcription unit 75 has the following general form:

Header
    flag if word if phoneme if mixed
    time index associating the location of blocks of annotation data within memory to a given time point.
    word set used (i.e. the dictionary)
    phoneme set used
    the language to which the vocabulary pertains
    phoneme probability data
Block(i) i=0,1,2, . . .
    node $N_j$ j=0,1,2, . . .
        time offset of node from start of block
        phoneme links (k) k=0,1,2 . . . offset to node $N_j=N_k-N_j$ ($N_k$ is node to which link K extends) phoneme associated with link (k)
        word links (l) l=0,1,2, . . . offset to node $N_j=N_i-N_j$ ($N_i$ is node to which link 1 extends) word associated with link (l)

The flag identifying if the annotation data is word annotation data, phoneme annotation data or if it is mixed is provided since not all the data files within the database will include the combined phoneme and word lattice annotation data discussed above, and in this case, a different search strategy would be used to search this annotation data.

In this embodiment, the annotation data is divided into blocks of nodes in order to allow the search to jump into the middle of the annotation data for a given search. The header therefore includes a time index which associates the location of the blocks of annotation data within the memory to a given time offset between the time of start and the time corresponding to the beginning of the block.

The header also includes data defining the word set used (i.e. the dictionary), the phoneme set used and their probabilities and the language to which the vocabulary pertains. The header may also include details of the automatic speech recognition system used to generate the annotation data and any appropriate settings thereof which were used during the generation of the annotation data.

The blocks of annotation data then follow the header and identify, for each node in the block, the time offset of the node from the start of the block, the phoneme links which connect that node to other nodes by phonemes and word links which connect that node to other nodes by words. Each phoneme link and word link identifies the phoneme or word which is associated with the link. They also identify the offset to the current node. For example, if node $N_{50}$ is linked to node $N_{55}$ by a phoneme link, then the offset to node $N_{50}$ is 5. As those skilled in the art will appreciate, using an offset indication like this allows the division of the continuous annotation data into separate blocks.

In an embodiment where an automatic speech recognition unit outputs weightings indicative of the confidence of the speech recognition units output, these weightings or confidence scores would also be included within the data structure. In particular, a confidence score would be provided for each node which is indicative of the confidence of arriving at the node and each of the phoneme and word links would include a transition score depending upon the weighting given to the corresponding phoneme or word. These weightings would then be used to control the search and retrieval of the data files by discarding those matches which have a low confidence score.

In response to the user's input, the control unit 55 retrieves the appropriate 2D file from the database 29 and appends the generated phoneme and word annotation data to the data file 91. The augmented data file is then returned to the database 29. During this annotating step, the control unit 55 is operable to display the 2D image on the display 57, so that the user can ensure that the annotation data is associated with the correct data file 91.

As will be explained in more detail below, the use of such phoneme and word lattice annotation data allows a quick and efficient search of the database 29 to be carried out, to identify and to retrieve a desired 2D image data file stored therein. This can be achieved by firstly searching in the database 29 using the word data and, if this search fails to provide the required data file, then performing a further search using the more robust phoneme data. As those skilled in the art of speech recognition will realise, use of phoneme data is more robust because phonemes are dictionary independent and allow the system to cope with out of vocabulary words, such as names, places, foreign words etc. Use of phoneme data is also capable of making the system future-proof, since it allows data files which are placed into the database 29 to be retrieved when the original annotation was input by voice and the original automatic speech recognition system did not understand the words of the input annotation.

Data File Retrieval

Figure 4:
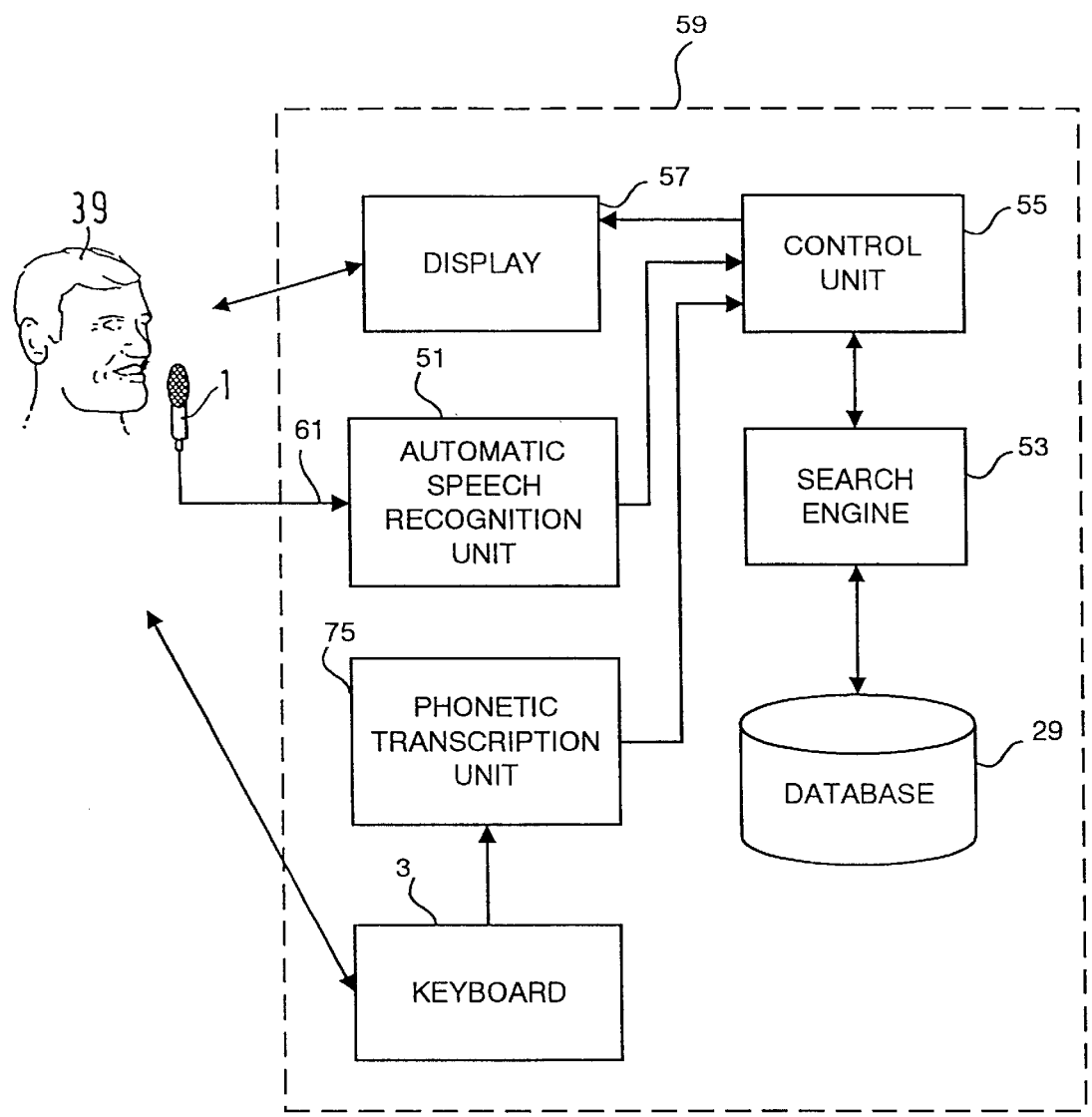
FIG. 4 is a schematic block diagram of a user's terminal which allows the user to retrieve information from the database by a typed or voice query.

FIG. 4 is a block diagram illustrating the form of a user terminal 59 which is used, in this embodiment, to retrieve the annotated 2D images from the database 29. This user terminal 59 may be, for example, a personal computer, a hand-held device or the like. As shown, in this embodiment, the user terminal 59 comprises the database 29 of annotated 2D images, an automatic speech recognition unit 51, a phonetic transcription unit 75, a keyboard 3, a microphone 7, a search engine 53, a control unit 55 and a display 57. In operation, the user inputs either a voice query via the microphone 7 or a typed query via the keyboard 3 and the query is processed either by the automatic speech recognition unit 51 or the phonetic transcription unit 75 to generate corresponding phoneme and word data. This data may also take the form of a phoneme and word lattice, but this is not essential. This phoneme and word data is then input to the control unit 55 which is operable to initiate an appropriate search of the database 29 using the search engine 53. The results of the search, generated by the search engine 53, are then transmitted back to the control unit 55 which analyses the search results and generates and displays appropriate display data (such as the retrieved 2D image) to the user via the display 57.

Figure 5A:
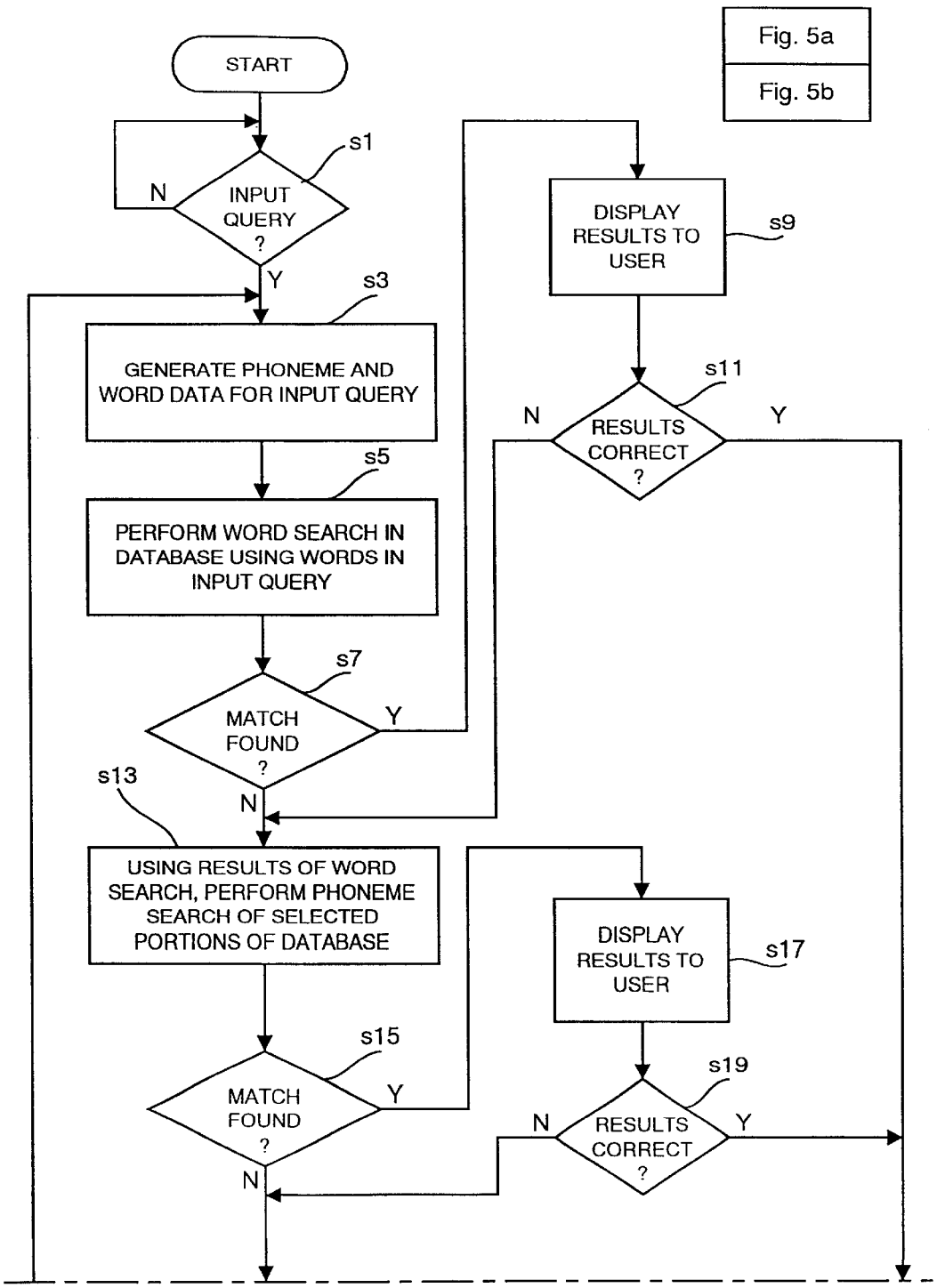
FIG. 5a is a flow diagram illustrating part of the flow control of the user terminal shown in FIG. 4.
Figure 5B:
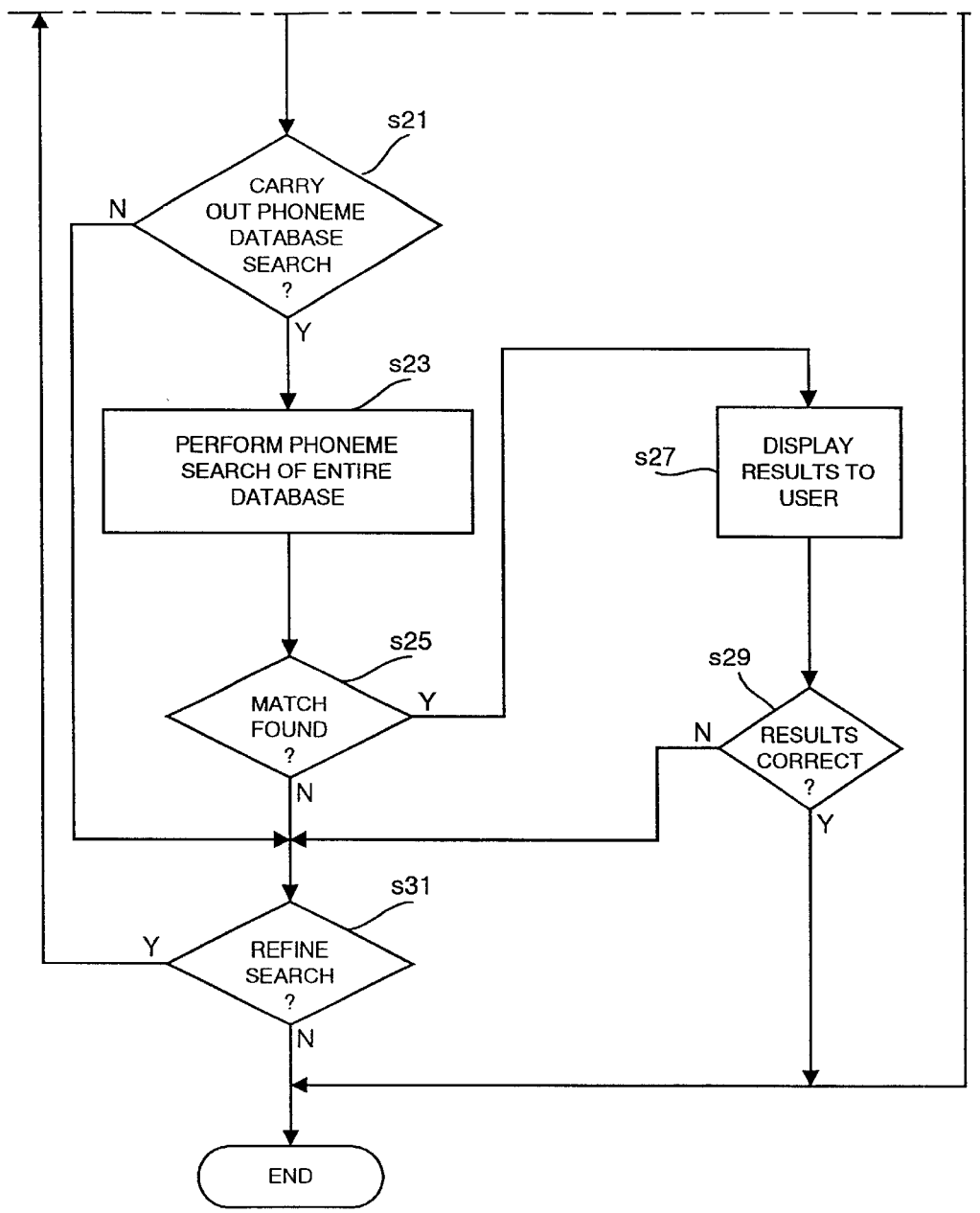
FIG. 5b is a flow diagram illustrating the remaining part of the flow control of the user terminal shown in FIG. 4.

FIGS. 5a and 5b are flow diagrams which illustrate the way in which the user terminal 59 operates in this embodiment. In step s1, the user terminal 59 is in an idle state and awaits an input query from the user 39. Upon receipt of an input query, the phoneme and word data for the input query is generated in step s3 by the automatic speech recognition unit 51 or the phonetic transcription unit 75. The control unit 55 then instructs the search engine 53, in step s5, to perform a search in the database 29 using the word data generated from the input query. The word search employed in this embodiment is the same as is currently being used in the art for typed word searches, and will not be described in more detail here. If in step s7, the control unit 55 identifies from the search results, that a match for the user's input query has been found, then it outputs the search results to the user via the display 57.

In this embodiment, the user terminal 59 then allows the user to consider the search results and awaits the user's confirmation as to whether or not the results correspond to the information the user requires. If they are, then the processing proceeds from step s11 to the end of the processing and the user terminal 59 returns to its idle state and awaits the next input query. If, however, the user indicates (by, for example, inputting an appropriate voice command) that the search results do not correspond to the desired information, then the processing proceeds from step s11 to step s13, where the search engine 53 performs a phoneme search of the database 29. However, in this embodiment, the phoneme search performed in step s13 is not of the whole database 29, since this could take several hours depending on the size of the database 29.

Instead, the phoneme search performed in step s13 uses the results of the word search performed in step s5 to identify one or more portions within the database which may correspond to the user's input query. For example, if the query comprises three words and the word search only identifies one or two of the query words in the annotation, then it performs a phoneme search of the portions of the annotations surrounding the identified word or words. The way in which the phoneme search performed in step s13 is carried out in this embodiment will be described in more detail later.

After the phoneme search has been performed, the control unit 55 identifies, in step s15, if a match has been found. If a match has been found, then the processing proceeds to step s17 where the control unit 55 causes the search results to be displayed to the user on the display 57. Again, the system then awaits the user's confirmation as to whether or not the search results correspond to the desired information. If the results are correct, then the processing passes from step s19 to the end and the user terminal 59 returns to its idle state and awaits the next input query. If however, the user indicates that the search results do not correspond to the desired information, then the processing proceeds from step s19 to step s21, where the control unit 55 is operable to ask the user, via the display 57, whether or not a phoneme search should be performed of the whole database 29. If in response to this query, the user indicates that such a search should be performed, then the processing proceeds to step s23 where the search engine performs a phoneme search of the entire database 29.

On completion of this search, the control unit 55 identifies, in step s25, whether or not a match for the user's input query has been found. If a match is found, then the processing proceeds to step s27 where the control unit 55 causes the search results to be displayed to the user on the display 57. If the search results are correct, then the processing proceeds from step s29 to the end of the processing and the user terminal 59 returns to its idle state and awaits the next input query. If, on the other hand, the user indicates that the search results still do not correspond to the desired information, then the processing passes to step s31 where the control unit 55 queries the user, via the display 57, whether or not the user wishes to redefine or amend the search query. If the user does wish to redefine or amend the search query, then the processing returns to step s3 where the user's subsequent input query is processed in a similar manner. If the search is not to be redefined or amended, then the search results and the user's initial input query are discarded and the user terminal 59 returns to its idle state and awaits the next input query.

A general description has been given above of the way in which a search is carried out in this embodiment by the user terminal 59. A more detailed description will now be given of the way in which the search engine 53 carries out the phoneme searches, together with a brief description of the motivation underlying the search strategy.

Information Retrieval as a Classification Problem

In the classic classification scenario, a test datum has to be classified into one of K classes. This is done using knowledge about other data for which the class is known. The classification problem assumes that there is a "class" random variable which can take values from 1 to K. The optimal classification then being found by identifying the class to which the test datum most likely belongs. It is assumed that the training data is generated by N generative processes which resulted in $n_k$ data of class k, where $\Sigma^K_{k=1} n_k = N$. Denoting the vector $(n_1, n_2, \ldots, n_k)$ by n, the training data by D and the test datum by x, the classic classification problem is to determine the value of k which maximises the following probability:

$$P(k|x, D, n) = \frac{P(x|k, D, n) P(k|D, n)}{P(x|D)} \quad (1)$$

The second term on the numerator is a prior probability for the class which gives more weight to classes which occur more often. In the context of information retrieval, each class has a single training datum (i.e. the annotation data). Therefore, for information retrieval, the second term on the right-hand side of the above expression can be ignored. Similarly, the denominator can also be ignored since $P(x|D)$ is the same for each class and therefore just normalises the numerator. Consequently, the order of the classes can be ranked by simply ranking the order of the first term on the numerator of the above expression for the classes. In other words, determining and ranking $P(x|d_k)$ for all the classes, where $d_k$ is the training datum for class k.

Figure 6A:
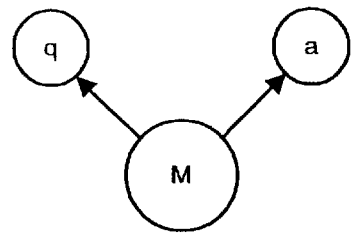
FIG. 6a is a schematic diagram which shows an underlying statistical model which is assumed to have generated both the query and the annotation.

In this embodiment, the test datum x represents the input query and the training datum for class k (i.e. $d_k$) represents the $k^{th}$ annotation, and it is assumed that there is an underlying statistical model (M) which generated both the query and the annotation, as illustrated in FIG. 6a. In the general case, this model has three unknowns: the model structure, m, the state sequences through that model for both the query and the annotation, $s_q$ and $s_a$, and the output distribution C. In this case, we know the output distribution since it embodies the characteristics of the speech recognition system which generates the phoneme strings from the input speech. As will be described later, it can be obtained by applying a large database of known speech to the speech recognition system, and it will be referred to hereinafter as the confusion statistics. Therefore, introducing the state sequences and the model into the above probabilities (and using the variables q for the input query and a for the annotation) yields:

$$P(q|a) = \sum_m \sum_{s_a} \sum_{s_q} P(q|m, s_q, s_a, C, a) P(m, s_q, s_a | C, a) \quad (2)$$

which can be expanded using Bayesian methods to give:

$$P(q|a) = \frac{\sum_m \sum_{s_a} \sum_{s_q} P(q|m, s_q, C) P(a|m, s_a, C)}{\sum_m \sum_{s_a} \sum_{s_q} P(a|m, s_a, C) P(s_a|m, C) P(m|C)} \quad (3)$$

Although the above expression looks complicated, the summations over the set of state sequences $s_q$ and $s_a$ can be performed using a standard dynamic programming algorithm. Further, the last term on both the numerator and the denominator can be ignored, since it can be assumed that each model is equally likely and the state sequence terms $P(s|m,c)$ can be ignored because it can also be assumed that each state sequence is equally likely. Further, by assuming that the underlying model structure is a canonical sequence of phonemes having approximately the same length as the query, subject to insertions, the summation over the different models can be removed, although it is replaced with a summation over all possible phonemes because, in the general case, the canonical sequence of phonemes of the model is unknown. Therefore, ignoring the state sequence summations, the term which is to be evaluated inside the dynamic programming algorithm becomes:

$$\sum_{r=1}^{N_p} P(a_i | p_r, C) P(q_j | p_r, C) P(p_r | C) \quad (4)$$

on the numerator, and $$\sum_{r=1}^{N_p} P(a_i | p_r, C) P(p_r | C) \quad (5)$$

on the denominator (i.e. the normalising term), where $N_p$ is the total number of phonemes known to the system and $a_i$, $q_j$ and $p_r$ are the annotation phoneme, query phoneme and model phoneme respectively which correspond to the current DP lattice point being evaluated. As can be seen from a comparison of equations (4) and (5), the probability terms calculated on the denominator are calculated on the numerator as well. Therefore, both terms can be accumulated during the same dynamic programming routine. Considering the probabilities which are determined in more detail, $P(q_j|p_r,C)$ is the probability of decoding canonical phoneme $p_r$ as query phoneme $q_j$ given the confusion statistics; $P(a_i|p_r,C)$ is the probability of decoding canonical phoneme $p_r$ as annotation phoneme ai given the confusion statistics; and $P(p_r|C)$ is the probability of canonical phoneme $p_r$ occurring unconditionally given the confusion statistics.

In addition to the above terms, at each point in the dynamic programming calculation, a further term must be calculated which deals with insertions and deletions in the query or the annotation relative to the model. As those skilled in the art will appreciate, an insertion or a deletion in the query is independent from an insertion or a deletion in the annotation and vice versa. Therefore, these additional terms are dealt with separately. Insertions and deletions in the annotation relative to the model must also be considered for the normalising term given in equation (5) above.

As those skilled in the art will appreciate from the description of FIGS. 4 and 5, in this embodiment, the annotation phoneme data and the query phoneme data may both be derived either from text or speech. Therefore, there are four situations to consider:

i) both the annotation and the query are generated from text;
ii) the annotation is generated from text and the query is generated from speech;
iii) the annotation is generated from speech and the query is generated from text; and
iv) both the query and annotation are generated from speech.

The first situation is the simple case in which there can be no time compression/expansion of the annotation or the query and the comparison between the annotation and the query is performed by a simple boolean comparison of the respective phoneme sequences.

Figure 6B:
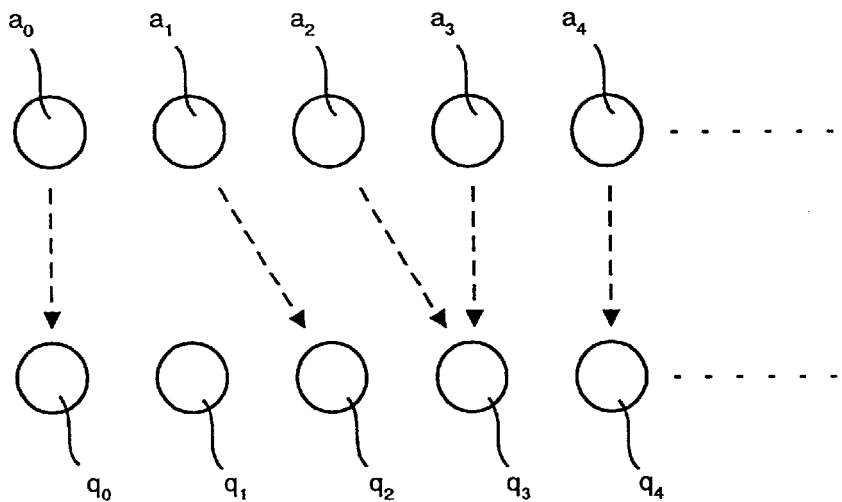
FIG. 6b is a schematic diagram which shows a first sequence of phonemes representative of a typed input and a second sequence of phonemes representative of a user's voice input, and which illustrates the possibility of there being phoneme insertions and deletions from the user's voice input relative to the typed input.

In the second situation, the annotation is taken to be correct and the dynamic programming alignment allows the insertion and deletion of phonemes in the query in order to find the best alignment between the two. To illustrate this case, FIG. 6b shows a possible matching between a sequence of annotation phonemes (labelled $a_0, a_1, a_2 \ldots$) and a sequence of query phonemes (labelled $q_0, q_1, q_2 \ldots$), when the annotation phonemes are generated from text. As illustrated by the dashed arrows, annotation phoneme $a_0$ is aligned with query phoneme $q_0$, annotation phoneme $a_1$ is aligned with query phoneme $q_2$, annotation phoneme $a_2$ is aligned with query phoneme $q_3$, annotation phoneme $a_3$ is aligned with query phoneme $q_3$ and annotation phoneme $a_4$ is aligned with query phoneme $q_4$. For each of these alignments, the dynamic programming routine calculates the terms given in equations (4) and (5) above. However, in this case, these equations simplify because the canonical sequence of model phonemes is known (since these are the annotation phonemes). In particular, the normalising term is one because the annotation is the model and the numerator simplifies to $P(q_i|a_j,C)$. In addition to these decoding terms, the dynamic programming routine also calculates the relevant insertion and deletion probabilities for the phonemes which are inserted in the query relative to the annotation (such as query phoneme $q_i$) and for the phonemes which are deleted in the query relative to the annotation (represented by query phoneme $q_3$ which is matched with the two annotation phonemes $a_2$ and $a_3$).

The third situation mentioned above is similar to the second situation except the sequence of query phonemes is taken to be correct and the dynamic programming alignment allows the insertion and deletion of phonemes in the annotation relative to the query. However, in this situation, equations (1) to (5) cannot be used because the query is known. Therefore, in this situation, equation (1) can be reformulated as:

$$P(K|x, D, n) = \frac{P(D|K, x, n)P(K|x, n)}{P(D|x)} \quad (6)$$

As with the corresponding terms in the equation (1) above, the second term on the numerator and the denominator can both be ignored. The first term of the numerator in equation (6) above can be expanded in a similar way to the way in which the first term on the numerator of equation (1) was expanded. However, in this situation, with the query being taken to be the model, the normalising term calculated during the dynamic programming routine simplifies to one and the numerator simplifies to $P(a_i|q_j,C)$. Like the second situation discussed above, the dynamic programming routine also calculates the relevant insertion and deletion probabilities for the phonemes which are inserted in the annotation relative to the query and for the phonemes which are deleted in the annotation relative to the query.

Figure 6C:
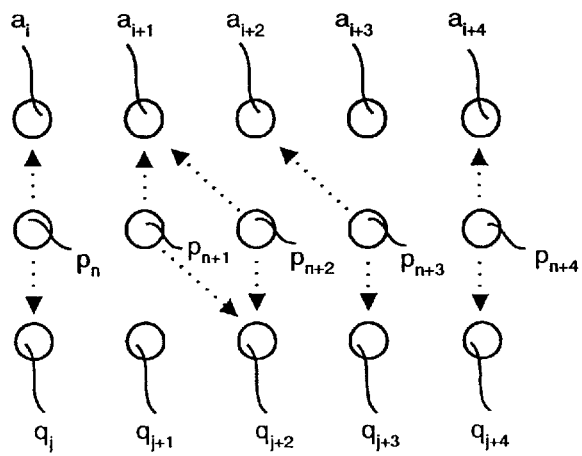
FIG. 6c is a schematic diagram which shows a first and second sequence of phonemes, each representative of a voiced input and a third sequence of phonemes representative of a canonical sequence of phonemes corresponding to what was actually said in the corresponding voiced inputs, and which illustrates the possibility of there being phoneme insertions and deletions from the two voiced inputs relative to the corresponding canonical sequence of phonemes.

Finally, in the fourth situation, when both the annotation and the query are generated from speech, both sequences of phoneme data can have insertions and deletions relative to the unknown canonical sequence of model phonemes which represents the text of what was actually spoken. This is illustrated in FIG. 6c, which shows a possible matching between a sequence of annotation phonemes (labelled $a_i$, $a_{i+1}, a_{i+2} \ldots$), a sequence of query phonemes (labelled $q_j$, $q_{j+1}, q_{j+2} \ldots$) and a sequence of phonemes (labelled $p_n$, $p_{n+1}, p_{n+2} \ldots$) which represents the canonical sequence of phonemes of what was actually spoken by both the query and the annotation. As shown in FIG. 6c, in this case, the dynamic programming alignment technique must allow for the insertion of phonemes in both the annotation and the query (represented by the inserted phonemes $a_{i+3}$ and $q_{j+1}$) as well as the deletion of phonemes from both the annotation and the query (represented by phonemes $a_{i+1}$ and $q_{j+2}$, which are both aligned with two phonemes in the canonical sequence of phonemes), relative to the canonical sequence of model phonemes.

As those skilled in the art will appreciate, by introducing the model sequence of phonemes into the calculations, the algorithm is more flexible to pronunciation variations in both the query and the annotation.

A general description has been given above of the way in which the present embodiment performs information retrieval by matching the sequence of query phonemes with the sequences of annotation phonemes in the database. In order to understand the operation of the present embodiment further, a brief description will now be given of a standard dynamic programming algorithm followed by a more detailed description of the particular algorithm used in this embodiment.

Overview of DP Search

Figure 7:
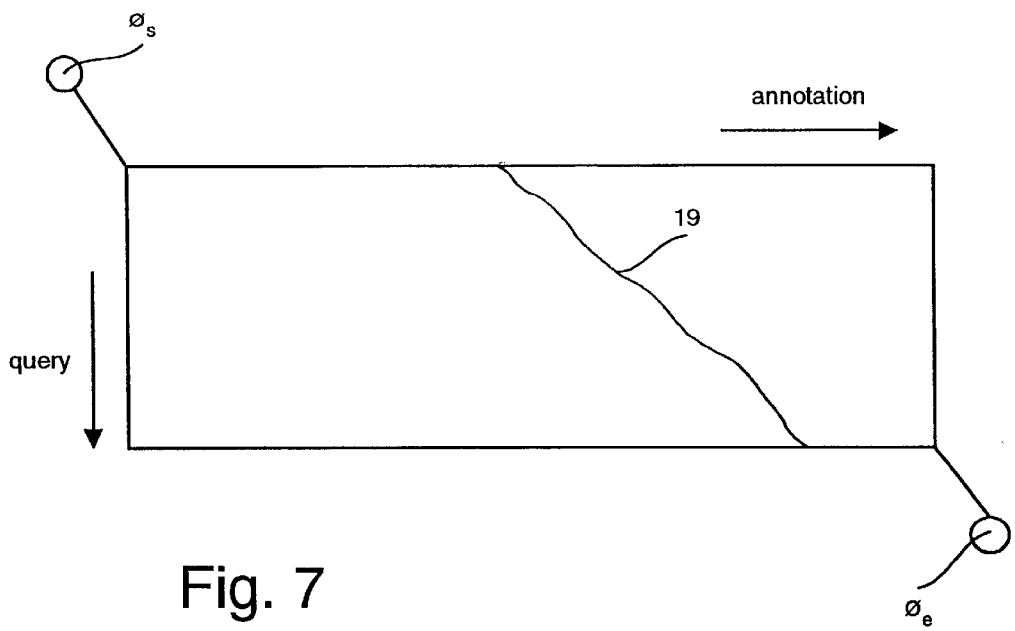
FIG. 7 schematically illustrates a search space created by the sequence of annotation phonemes and the sequence of query phonemes together with a start null node and an end null node.
Figure 8:
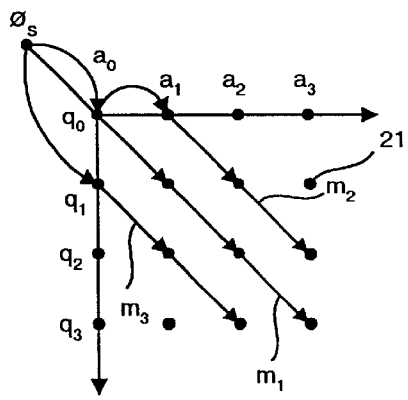
FIG. 8 is a two dimensional plot with the horizontal axis being provided for the phonemes of the annotation and the vertical axis being provided for the phonemes of the query, and showing a number of lattice points, each corresponding to a possible match between an annotation phoneme and a query phoneme.

As those skilled in the art know, dynamic programming is a technique which can be used to find the optimum alignment between sequences of features, which in this embodiment are phonemes. It does this by simultaneously propagating a plurality of dynamic programming paths, each of which represents a possible matching between a sequence of annotation phonemes and a sequence of query phonemes. All paths begin at a start null node, which is at the beginning of the annotation and the query, and propagate until they reach an end null node, which is at the end of the annotation and the query. FIGS. 7 and 8 schematically illustrate the matching which is performed and this path propagation. In particular, FIG. 7 shows a rectangular coordinate plot with the horizontal axis being provided for the annotation and the vertical axis being provided for the query. The start null node $\phi_s$ is provided in the top left hand corner and the end null node $\phi_e$ is provided on the bottom right hand corner. As shown in FIG. 8, the phonemes of the annotation are provided along the horizontal axis and the phonemes of the query are provided along the vertical axis. FIG. 8 also shows a number of lattice points, each of which represents a possible alignment between a phoneme of the annotation and a phoneme of the query. For example, lattice point 21 represents a possible alignment between annotation phoneme $a_3$ and query phoneme $q_1$. FIG. 8 also shows three dynamic programming paths $m_1, m_2$ and $m_3$ which represent three possible matchings between the sequences of phonemes representative of the annotation and of the query and which begin at the start null node $\phi_s$ and propagate through the lattice points to the end null node $\phi_e$. Referring back to equations (2) and (3) above, these dynamic programming paths represent the different state sequences $s_q$ and sa discussed above.

As represented by the different lengths of the horizontal and vertical axes shown in FIG. 7, the input query does not need to include all the words of the annotation. For example, if the annotation is "picture of the Taj Mahal", then the user can simply search the database 29 for this picture by inputting the query "Taj Mahal". In this situation, the optimum alignment path would pass along the top horizontal axis until the query started to match the annotation. It would then start to pass through the lattice points to the lower horizontal axis and would end at the end node. This is illustrated in FIG. 7 by the path 23. However, as those skilled in the art will appreciate, the words in the query must be in the same order as they appear in the annotation, otherwise the dynamic programming alignment will not work.

In order to determine the similarity between the sequence of annotation phonemes and the sequence of query phonemes, the dynamic programming process keeps a score for each of the dynamic programming paths which it propagates, which score is dependent upon the overall similarity of the phonemes which are aligned along the path. In order to limit the number of deletions and insertions of phonemes in the sequences being matched, the dynamic programming process places certain constraints on the way in which the dynamic programming paths can propagate. As those skilled in the art will appreciate, these dynamic programming constraints will be different for the four situations discussed above.

DP Constraints

Both Annotation and Query are Text.

In the case where the query phoneme data and the annotation phoneme data are both generated from text, the dynamic programming alignment degenerates into a boolean match between the two phoneme sequences and no phoneme deletions or insertions are allowed.

Annotation is Text and Query is Speech.

Figure 9A:
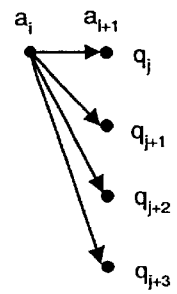
FIG. 9a schematically illustrates the dynamic programming constraints employed in a dynamic programming matching process when the annotation is a typed input and the query is generated from a voiced input.

In the case where the annotation phoneme data is generated from text and the query phoneme data is generated from speech, there can be no phoneme deletions or insertions in the annotation but there can be phoneme deletions and insertions in the query relative to the annotation. FIG. 9a illustrates the dynamic programming constraints which are used in this embodiment, when the annotation is generated from text and the query is generated from speech. As shown, if a dynamic programming path ends at lattice point (i,j), representing an alignment between annotation phoneme $a_i$ and query phoneme $q_j$, then that dynamic programming path can propagate to the lattice points (i+1,j), (i+1,j+1) and (i+1,j+2). A propagation to point (i+1,j) represents the case when there is a deletion of a phoneme from the spoken query as compared with the typed annotation; a propagation to the point (i+1,j+1) represents the situation when there is a simple decoding between the next phoneme in the annotation and the next phoneme in the query; and a propagation to the point (i+1,j+2) represents the situation when there is an insertion of phoneme $q_{j+1}$ in the spoken query as compared with the typed annotation and when there is a decoding between annotation phoneme $a_{i+1}$ and query phoneme $q_{j+2}$.

Annotation is Speech and Query is Text.

Figure 9B:
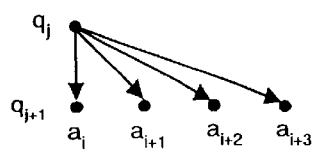
FIG. 9b schematically illustrates the dynamic programming constraints employed in a dynamic programming matching process when the query is a typed input and when the annotation is a voiced input.

In the case where the annotation is generated from speech and the query is generated from text, there can be no insertions or deletions of phonemes from the query but there can be insertions and deletions from the annotation relative to the query. FIG. 9b illustrates the dynamic programming constraints which are used in this embodiment, when the annotation is generated from speech and the query is generated from text. As shown, if a dynamic programming path ends at lattice point (i,j), representing an alignment between annotation phoneme ai and query phoneme $q_j$, then that dynamic programming path can propagate to the lattice points (i,j+1), (i+1,j+1) and (i+2,j+1). A propagation to point (i,j+1) represents the case when there is a deletion of a phoneme from the spoken annotation as compared with the typed query; a propagation to the point (i+1,j+1) represents the situation when there is a simple decoding between the next phoneme in the annotation and the next phoneme in the query; and a propagation to the point (i+2,j+1) represents the situation when there is an insertion of phoneme $a_{i+1}$, in the spoken annotation as compared with the typed query and when there is a decoding between annotation phoneme $a_{i+2}$ and query phoneme $q_{i+1}$.

Annotation is Speech and Query is Speech.

Figure 11:
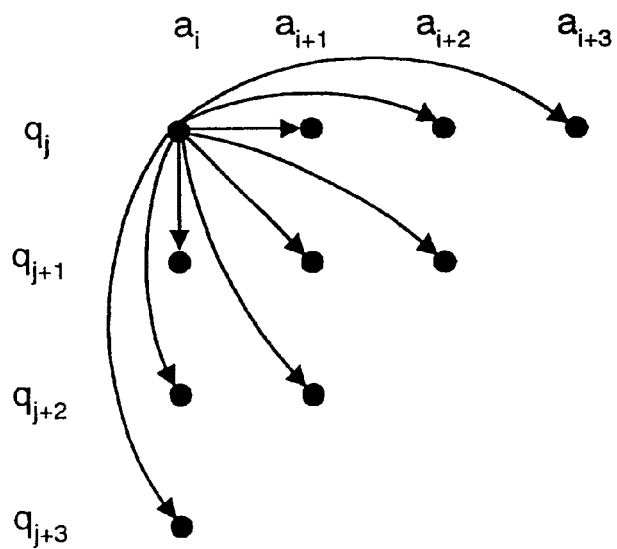
FIG. 11 schematically illustrates the dynamic programming constraints employed in a dynamic programming matching process when both the annotation and the query are voiced inputs.

In the case where both the annotation and the query are generated from speech, phonemes can be inserted and deleted from each of the annotation and the query relative to the other. FIG. 11 shows the dynamic programming constraints which are used in this embodiment, when both the annotation phonemes and the query phonemes are generated from speech. In particular, if a dynamic programming path ends at lattice point (i,j), representing an alignment between annotation phoneme $a_i$ and query phoneme $q_j$, then that dynamic programming path can propagate to the lattice points (i+1,j), (i+2,j), (i+3,j), (i,j+1), (i+1,j+1), (i+2,j+1), (i,j+2), (i+1,j+2) and (i,j+3). These propagations therefore allow the insertion and deletion of phonemes in both the annotation and the query relative to the unknown canonical sequence of model phonemes corresponding to the text of what was actually spoken.

Beginning and End DP Constraints

In this embodiment, the dynamic programming alignment operation allows a dynamic programming path to start and end at any of the annotation phonemes. As a result, the query does not need to include all the words of the annotation, although the query words do need to be in the same order as they appear in the annotation.

DP Score Propagation

As mentioned above, the dynamic programming process keeps a score for each of the dynamic programming paths, which score is dependent upon the similarity of the phonemes which are aligned along the path. Therefore, when propagating a path ending at point (i,j) to these other points, the dynamic programming process adds the respective "cost" of doing so to the cumulative score for the path ending at point (i,j), which is stored in a store (SCORE(i,j)) associated with that point. As those skilled in the art will appreciate, this cost includes the above-mentioned insertion probabilities, deletion probabilities and decoding probabilities. In particular, when there is an insertion, the cumulative score is multiplied by the probability of inserting the given phoneme; when there is a deletion, the cumulative score is multiplied by the probability of deleting the phoneme; and when there is a decoding, the cumulative score is multiplied by the probability of decoding the two phonemes.

Figure 10:
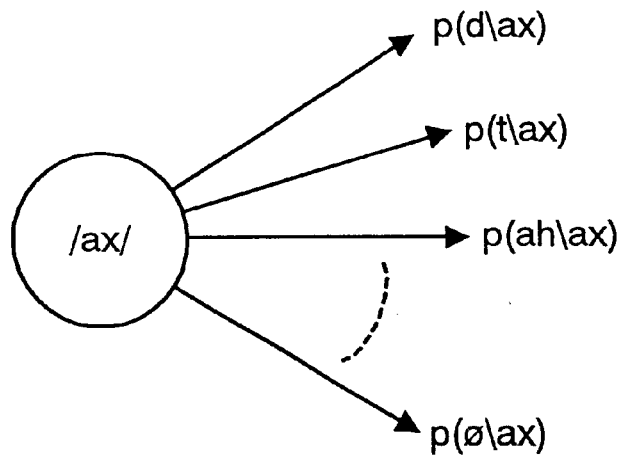
FIG. 10 schematically illustrates the deletion and decoding probabilities which are stored for an example phoneme.

In order to be able to calculate these probabilities, the system stores a probability for all possible phoneme combinations. In this embodiment, the deletion of a phoneme in the annotation or the query is treated in a similar manner to a decoding. This is achieved by simply treating a deletion as another phoneme. Therefore, if there are 43 phonemes known to the system, then the system will store one thousand eight hundred ninety two (1892=43×44) decoding/deletion probabilities, one for each possible phoneme decoding and deletion. This is illustrated in FIG. 10, which shows the possible phoneme decodings which are stored for the phoneme /ax/ and which includes the deletion phoneme (φ) as one of the possibilities. As those skilled in the art will appreciate, all the decoding probabilities for a given phoneme must sum to one, since there are no other possibilities. In addition to these decoding/deletion probabilities, the system stores 43 insertion probabilities, one for each possible phoneme insertion. As will be described later, these probabilities are determined in advance from training data.

To illustrate the score propagations, a number of examples will now be considered. In the case where the annotation is text and the query is speech and for the path propagating from point (i,j) to point (i+1,j+2), the phoneme $q_{j+1}$ is inserted relative to the annotation and query phoneme $q_{j+2}$ is decoded with annotation phoneme $a_{i+1}$. Therefore, the score propagated to point (i+1,j+2) is given by:

$$S(i+1,j+2)=S(i,j).PI(q_{j+1}|C).P(q_{j+2}|a_{i+1},C) \quad (7)$$

where $PI(q_{j+1}|C)$ is the probability of inserting phoneme $q_{j+1}$ in the spoken query and $P(q_{j+2}|a_{i+1},C)$ represents the probability of decoding annotation phoneme $a_{i+1}$ as query phoneme $q_{j+2}$.

In the case where both the annotation and the query are generated from speech and when propagating from point (i,j) to point (i+2,j+1), the annotation phoneme $a_{i+1}$ is inserted relative to the query and there is a decoding between annotation phoneme $a_{i+2}$ and query phoneme $q_{j+1}$. Therefore, the score propagated to point (i+2,j+1) is given by:

$$S(i+2,j+1) = S(i,j) \cdot P/(a_{i+1} | C) \cdot \sum_{r=1}^{N_p} P(a_{i+2} | p_r, C) P(q_{j+1} | p_r, C) P(p_r | C) \quad (8)$$

As those skilled in the art will appreciate, during this path propagation, several paths will meet at the same lattice point. In this embodiment, the scores associated with the paths which meet are simply added together. Alternatively, a comparison between the scores could be made and the path having the best score could be continued whilst the other path(s) is (are) discarded. However, this is not essential in this embodiment, since the dynamic programming process is only interested in finding a score which represents the similarity between the phoneme data of the query and the phoneme data of the annotation. It is not interested in knowing what the best alignment between the two is.

If both the query and the annotation are generated from speech, then once all the paths have been propagated to the end node $\phi_e$ and a total score for the similarity between the query and the current annotation has been determined, the system normalises this score using the normalising term which has been accumulating during the DP process. The system then compares the query with the next annotation in a similar manner. Once the query has been matched with all the annotations, the normalised scores for the annotations are ranked and based on the ranking, the system outputs to the user the annotation(s) most similar to the input query.

Detailed Description of DP Search

Figure 12:
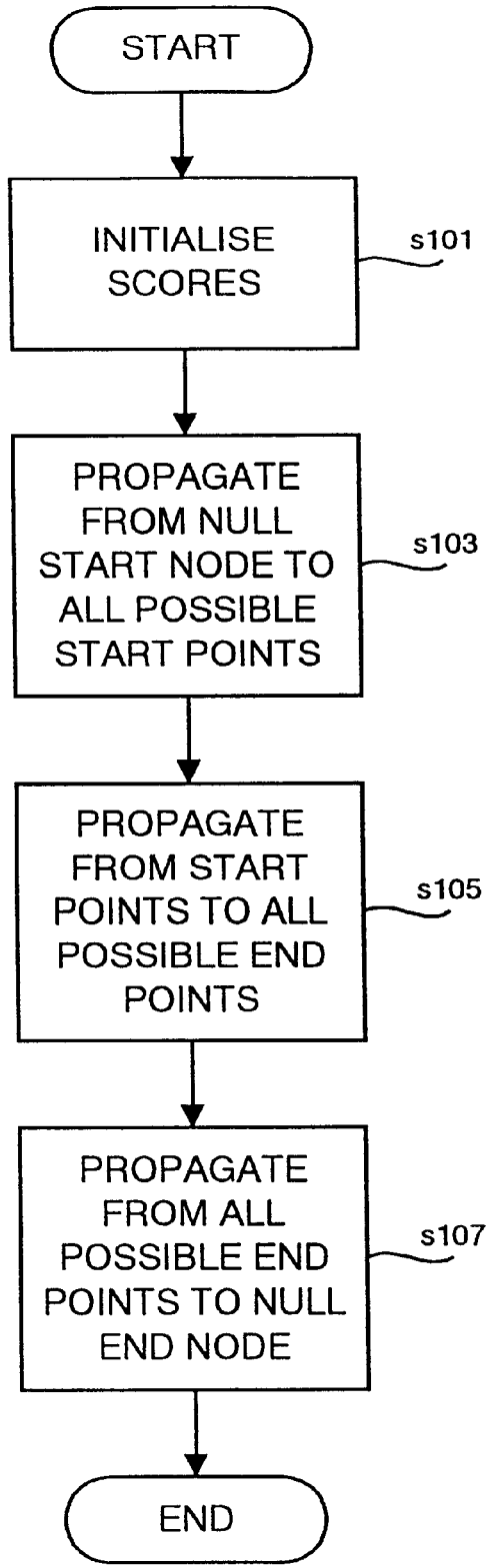
FIG. 12 is a flow diagram illustrating the main processing steps performed in the dynamic programming matching process.

A more detailed description will now be given of the way in which the dynamic programming search is carried out when matching a sequence of query phonemes with a sequence of annotation phonemes. Referring to FIG. 12, in step s101, the system initializes the dynamic programming scores. Then in step s103, the system propagates paths from the null start node ($\phi_s$) to all possible start points. Then in step s105, the system propagates the dynamic programming paths from all the start points to all possible end points using the dynamic programming constraints discussed above. Finally in step s107, the system propagates the paths ending at the end points to the null end node ($\phi_e$).

Figure 13:
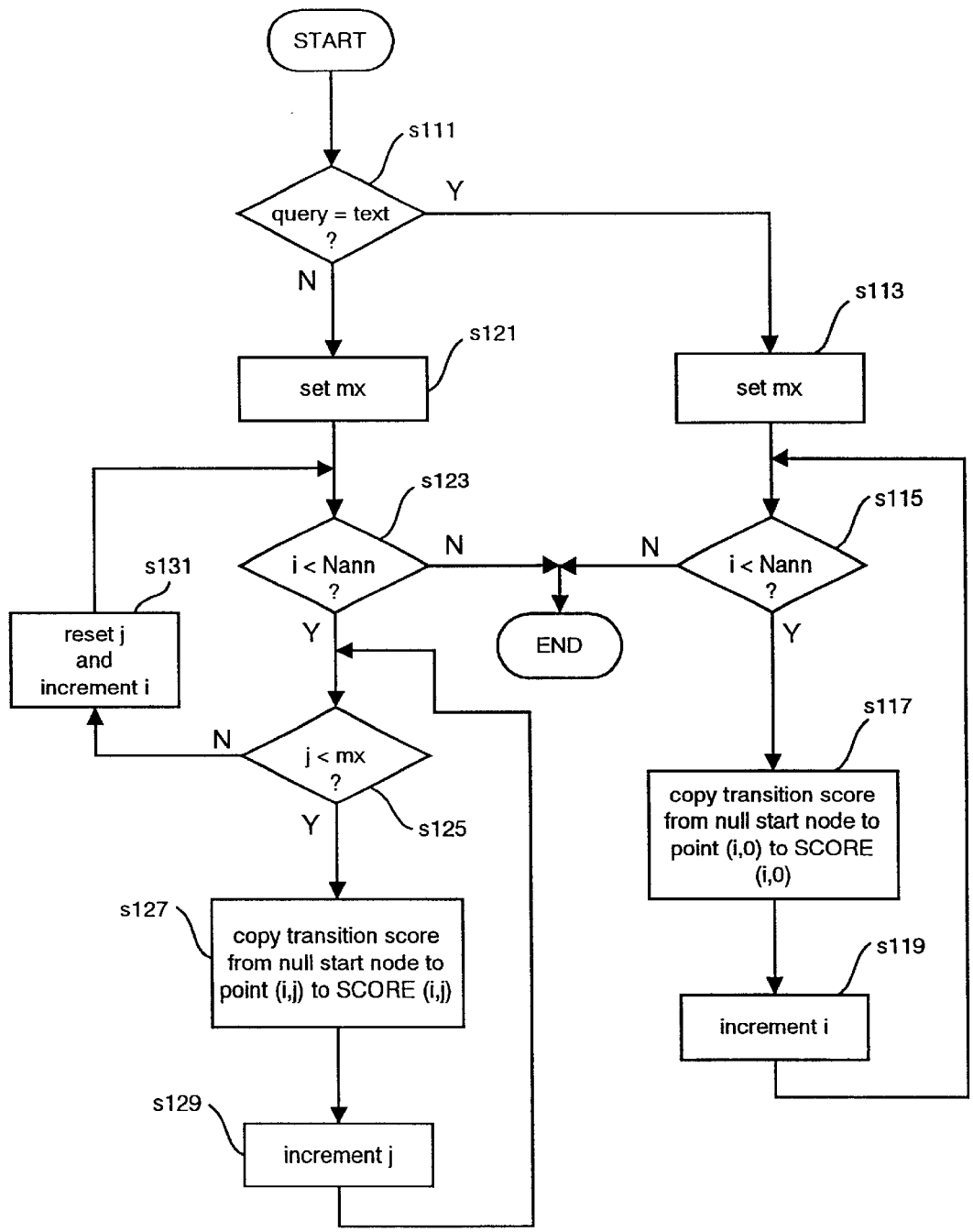
FIG. 13 is a flow diagram illustrating the main processing steps employed to begin the dynamic programming process by propagating from a null start node to all possible start points.

FIG. 13 shows in more detail, the processing steps involved in step s103 in propagating the dynamic programming paths from the null start node ($\phi_s$) to all the possible start points, which are defined by the dynamic programming constraints. One of the constraints is that a dynamic programming path can begin at any of the annotation phonemes and the other constraint, which defines the number of hops allowed in the sequence of query phonemes, depends upon whether or not the query is text or speech. In particular, if the query is generated from text, then the start points comprise the first row of lattice points in the search space, i.e. points (i,0) for i=0 to Nann-1; and if the query is generated from speech, then the start points comprise the first four rows of lattice points in the search space, i.e. points (i,0), (i,1), (i,2) and (i,3) for i=0 to Nann-1.

The way in which this is achieved will now be described with reference to the steps shown in FIG. 13. As shown, in step s111, the system determines whether or not the input query is a text query. If it is, then the processing proceeds to step s113 where the system sets the value of the variable mx to one, which defines the maximum number of "hops" allowed in the sequence of query phonemes when the query is text. The processing then proceeds to steps s115, s117 and s119 which are operable to start a dynamic programming path at each of the lattice points in the first row of the search space, by adding the transition score for passing from the null start node to the lattice point (i,0) to the score (SCORE (i,0)) associated with point (i,0), for i=0 to Nann-1. When the query is text, this ends the processing in step s103 shown in FIG. 12 and the processing then proceeds to step s105.

If the system determines at step s111, that the query is not text and was therefore generated from a spoken input, the system proceeds to step s121 where mx is set to mxhops which is a constant having a value which is one more than the maximum number of "hops" allowed by the dynamic programming constraints. As shown in FIGS. 9 and 10, in the case where the query is speech, a path can jump at most to a query phoneme which is three phonemes further along the sequence of query phonemes. Therefore, in this embodiment, mxhops has a value of four and the variable mx is set equal to four, provided there are four or more phonemes in the query, otherwise mx is set equal to the number of phonemes in the query. The processing then proceeds to steps s123, s125, s127, s129 and s131 which are operable to begin dynamic programming paths at each of the lattice points in the first four rows of the search space by adding the corresponding transition probability to the score associated with the corresponding lattice point. When the query is generated from a spoken input, this ends the processing in step s103 shown in FIG. 12 and the processing then proceeds to step s105.

Figure 14:
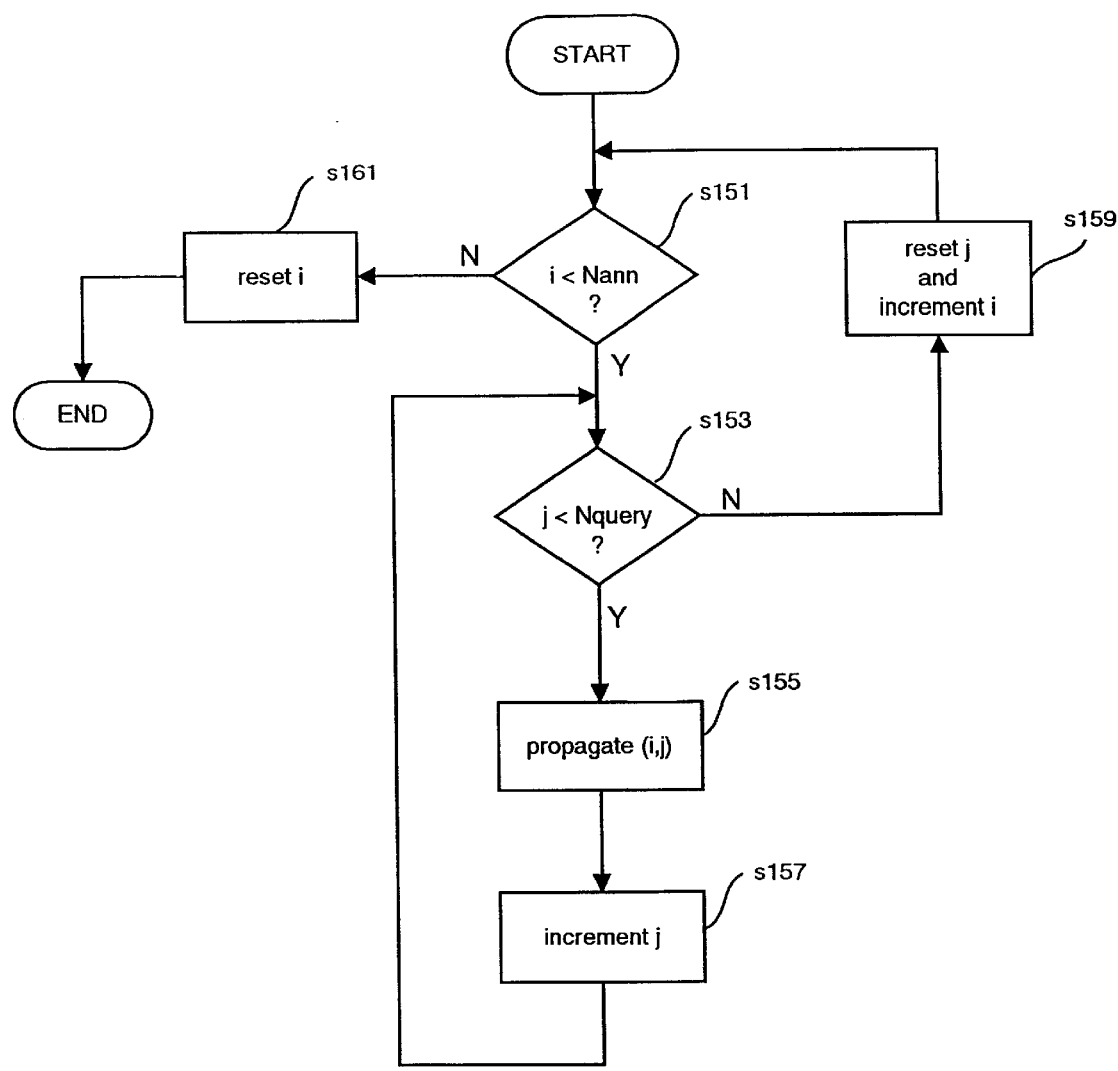
FIG. 14 is a flow diagram illustrating the main processing steps employed to propagate dynamic programming paths from the start points to all possible end points.

In this embodiment, the system propagates the dynamic programming paths from the start points to the end points in step s105 by processing the lattice points in the search space column by column in a raster like technique. The control algorithm used to control this raster processing operation is shown in FIG. 14. In step s151, the system compares an annotation phoneme loop pointer i with the number of phonemes in the annotation (Nann). Initially the annotation phoneme loop pointer i is set to zero and the processing will therefore initially proceed to step s153 where a similar comparison is made for a query phoneme loop pointer j relative to the total number of phonemes in the query (Nquery). Initially the loop pointer j is also set to zero and therefore the processing proceeds to step s155 where the system propagates the path ending at point (i,j) using the dynamic programming constraints discussed above. The way in which the system propagates the paths in step s155 will be described in more detail later. After step s155, the loop pointer j is incremented by one in step s157 and the processing returns to step s153. Once this processing has looped through all the phonemes in the query (thereby processing the current column of lattice points), the processing proceeds to step s159 where the query phoneme loop pointer j is reset to zero and the annotation phoneme loop pointer i is incremented by one. The processing then returns to step s151 where a similar procedure is performed for the next column of lattice points. Once the last column of lattice points have been processed, the processing proceeds to step s161 where the annotation phoneme loop pointer i is reset to zero and the processing in step s105 shown in FIG. 12 ends.

Figure 15:
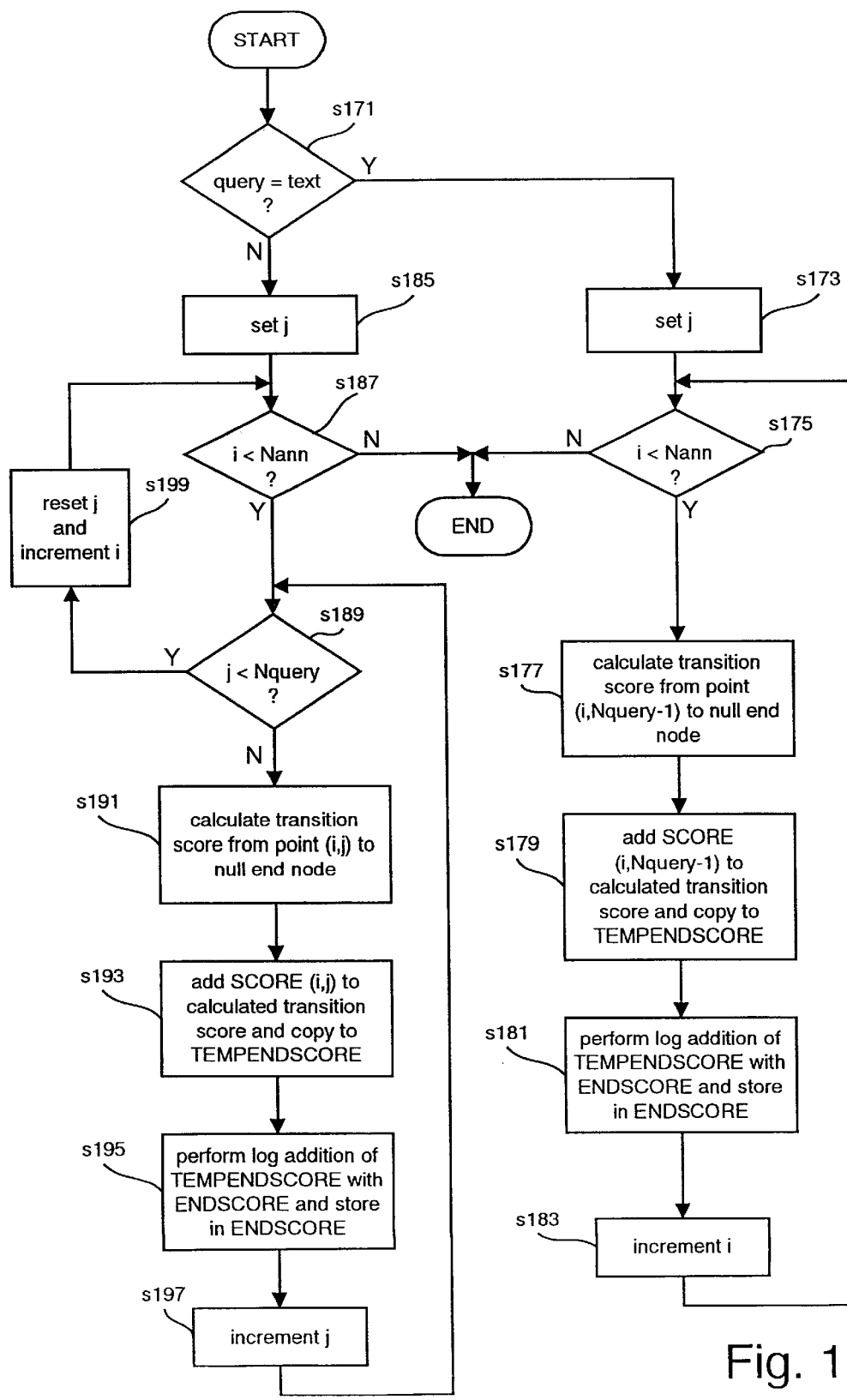
FIG. 15 is a flow diagram illustrating the main processing steps employed in propagating the paths from the end points to a null end node.

FIG. 15 shows in more detail the processing steps involved in step s107 shown in FIG. 12, when propagating the paths at the end points to the end null node $\phi_e$. As with the propagation from the start null node $\phi_s$, the lattice points which are the "end points", are defined by the dynamic programming constraints, which depend upon whether the query is text or speech. Further, in this embodiment, the dynamic programming constraints allow dynamic programming paths to exit the annotation at any point along the sequence of annotation phonemes. Therefore, if the query is text, then the system will allow dynamic programming paths ending in the last row of the lattice points, i.e. at points (i,Nquery-1) for i=0 to Nann-1, to propagate to the end null node $\phi_e$. If, however, the query was generated from speech, then the system allows any path propagating in the last four rows of the lattice points, i.e. points (i,Nquery-4), (i,Nquery-3), (i,Nquery-2) and (i,Nquery-1) for i=0 to Nann-1, to propagate to the end null node $\phi_o$.

As shown in FIG. 15, this process begins at step s171 where the system determines whether or not the query is text. If it is, then the processing proceeds to step s173 where the query phoneme loop pointer j is set to Nquery-1. The processing then proceeds to step s175 where the annotation phoneme loop pointer i is compared with the number of phonemes in the annotation (Nann). Initially the annotation phoneme loop pointer i is set to zero and therefore the processing will proceed to step s177 where the system calculates the transition score from point (i,Nquery-1) to the null end node $\phi_e$. This transition score is then combined with the cumulative score for the path ending at point (i,Nquery-1) which is stored in SCORE(i,Nquery-1). As mentioned above, in this embodiment, the transition and cumulative scores are probability based and they are combined by multiplying the probabilities together. However, in this embodiment, in order to remove the need to perform multiplications and in order to avoid the use of high floating point precision, the system employs log probabilities for the transition and cumulative scores. Therefore, in step s179, the system adds the cumulative score for the path ending at point (i,Nquery-1) to the transition score calculated in step s1 77 and the result is copied to a temporary store, TEMPENDSCORE.

As mentioned above, if two or more dynamic programming paths meet at the same point, then the cumulative scores for each of the paths are added together. Therefore, since log probabilities are being used, the scores associated with paths which meet are effectively converted back to probabilities, added and then reconverted to log probabilities. In this embodiment, this operation is referred to as a "log addition" operation. This is a well known technique and is described in, for example, the book entitled "Automatic Speech Recognition. The Development of the (Sphinx) System" by Lee, Kai-Fu published by Kluwer Academic Publishers, 1989, at pages 28 and 29.

Since the path propagating from point (i,Nquery-1) to the null end node will meet with other dynamic programming paths, the system performs a log addition of TEMPENDSCORE with the score stored in the end node (ENDSCORE) and the result is stored in ENDSCORE. The processing then proceeds to step s183 where the annotation phoneme loop pointer i is incremented. The processing then returns to step s175 where a similar process is performed for the next lattice point in the last row of lattice points. Once all the lattice points in the last row have been processed in this way, the processing performed in step s107 shown in FIG. 12 ends.

If the system determines at step s171 that the query is not text, then the processing proceeds to step s185 where the query phoneme loop pointer j is set to the number of phonemes in the query minus mxhops, i.e. Nquery-4. The processing then proceeds to step s1 87, where the system checks to see if the annotation phoneme loop pointer i is less than the number of phonemes in the annotation (Nann). Initially the annotation phoneme loop pointer i is set to zero and therefore the processing proceeds to step s189 where the system checks to see if the query phoneme loop pointer j is less than the number of phonemes in the query (Nquery). Initially it will be, and the processing proceeds to step s191 where the system calculates the transition score from lattice point (i,j) to the null end node $\phi_e$. This transition score is then added, in step s193, to the cumulative score for the path ending at point (i,j) and the result is copied to the temporary score, TEMPENDSCORE. The processing then proceeds to step s195 where the system performs a log addition of TEMPENDSCORE with ENDSCORE and the result is stored in ENDSCORE. The processing then proceeds to step s197 where the query phoneme loop pointer j is incremented by one and the processing returns to step s189. The above processing steps are then repeated until the query phoneme loop pointer j has been incremented so that it equals the number of phonemes in the query (Nquery). The processing then proceeds to step s199, where the query phoneme loop pointer j is reset to Nquery-4 and the annotation phoneme loop pointer i is incremented by one. The processing then returns to step s187. The above processing steps are then repeated until all the lattice points in the last four rows of the search space have been processed in this way, after which the processing performed in step s107 shown in FIG. 12 ends.

Propagate

Figure 16A:
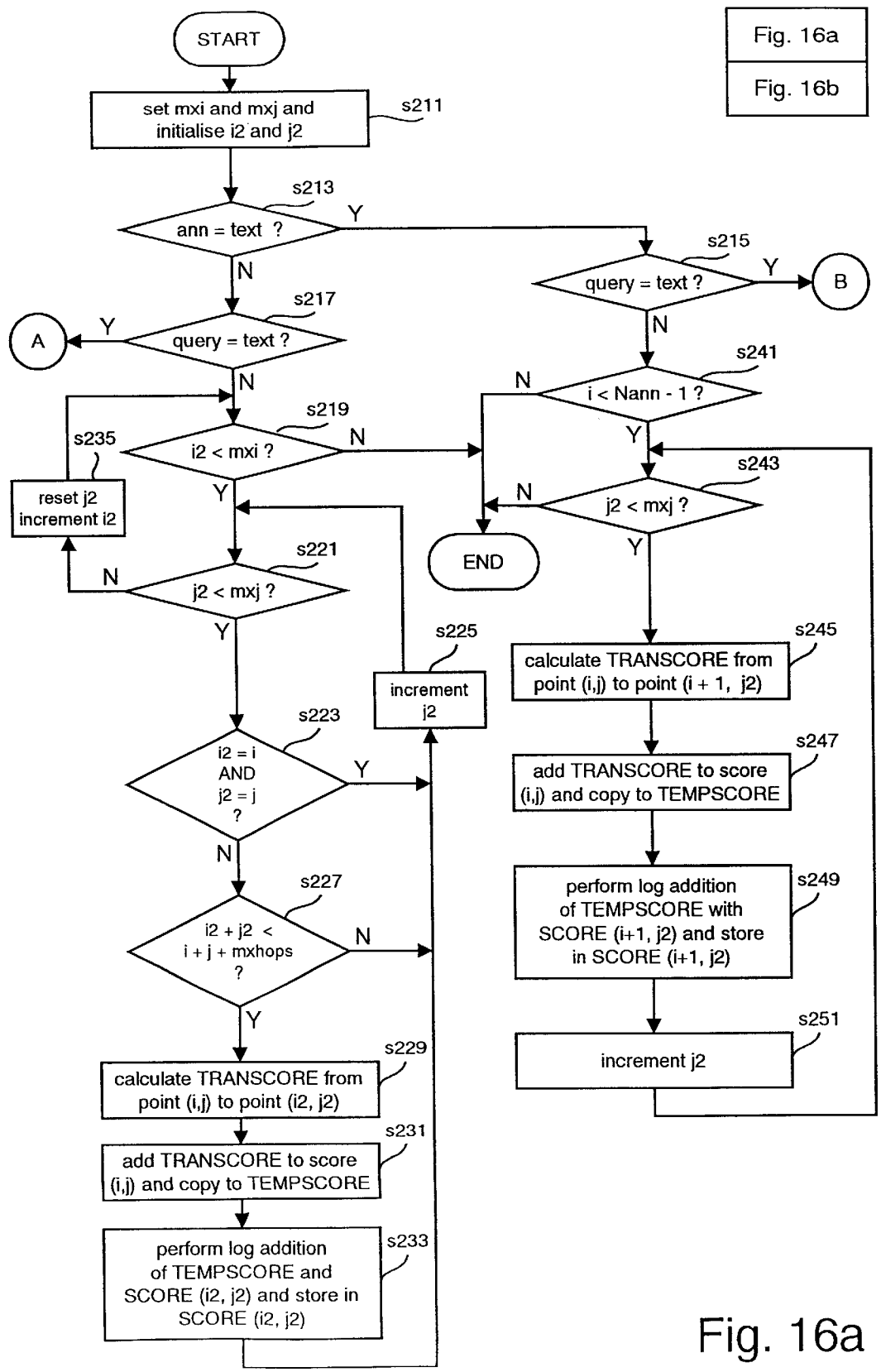
FIG. 16a is a flow diagram illustrating part of the processing steps performed in propagating a path using the dynamic programming constraints.

In step s155 shown in FIG. 14, the system propagates the path ending at lattice point (i,j) using the dynamic programming constraints discussed above. FIG. 16 is a flowchart which illustrates the processing steps involved in performing this propagation step. As shown, in step s211, the system sets the values of two variables mxi and mxj and initializes annotation phoneme loop pointer i2 and query phoneme loop pointer j2. The loop pointers i2 and j2 are provided to loop through all the lattice points to which the path ending at point (i,j) can propagate to and the variables mxi and mxj are used to ensure that i2 and j2 can only take the values which are allowed by the dynamic programming constraints. In particular, mxi is set equal to i plus mxhops, provided this is less than or equal to the number of phonemes in the annotation, otherwise mxi is set equal to the number of phonemes in the annotation (Nann). Similarly, mxj is set equal to j plus mxhops, provided this is less than or equal to the number of phonemes in the query, otherwise mxj is set equal to the number of phonemes in the query (Nquery). Finally, in step s211, the system initializes the annotation phoneme loop pointer i2 to be equal to the current value of the annotation phoneme loop pointer i and the query phoneme loop pointer j2 to be equal to the current value of the query phoneme loop pointer j.

Since the dynamic programming constraints employed by the system depend upon whether the annotation is text or speech and whether the query is text or speech, the next step is to determine how the annotation and the query were generated. This is performed by the decision blocks s213, s215 and s217. If both the annotation and the query are generated from speech, then the dynamic programming path ending at lattice point (i,j) can propagate to the other points shown in FIG. 11 and process steps s219 to s235 operate to propagate this path to these other points. In particular, in step s219, the system compares the annotation phoneme loop pointer i2 with the variable mxi. Since annotation phoneme loop pointer i2 is set to i and mxi is set equal to i+4, in step s211, the processing will proceed to step s221 where a similar comparison is made for the query phoneme loop pointer j2. The processing then proceeds to step s223 which ensures that the path does not stay at the same lattice point (i,j) since initially, i2 will equal i and j2 will equal j. Therefore, the processing will initially proceed to step s225 where the query phoneme loop pointer j2 is incremented by one.

The processing then returns to step s221 where the incremented value of j2 is compared with mxj. If j2 is less than mxj, then the processing returns to step s223 and the processing proceeds to step s227, which is operable to prevent too large a hop along both the sequences of annotation phonemes and query phonemes. It does this by ensuring that the path is only propagated if i2+j2 is less than i+j+mxhops. This ensures that only the triangular set of points shown in FIG. 11 are processed. Provided this condition is met, the processing then proceeds to step s229 where the system calculates the transition score (TRANSCORE) from lattice point (i,j) to lattice point (i2, j2). The processing then proceeds to step s231 where the system adds the transition score determined in step s229 to the cumulative score stored for the point (i,j) and copies this to a temporary store, TEMPSCORE. As mentioned above, in this embodiment, if two or more dynamic programming paths meet at the same lattice point, the cumulative scores associated with each of the paths are added together. Therefore, in step s233, the system performs a log addition of TEMPSCORE with the cumulative score already stored for point (i2,j2) and the result is stored in SCORE (i2,j2). The processing then returns to step s225 where the query phoneme loop pointer j2 is incremented by one and the processing returns to step s221. Once the query phoneme loop pointer j2 has reached the value of mxj, the processing proceeds to step s235, where the query phoneme loop pointer j2 is reset to the initial value j and the annotation phoneme loop pointer i2 is incremented by one. The processing then proceeds to step s219 where the processing begins again for the next column of points shown in FIG. 11. Once the path has been propagated from point (i,j) to all the other points shown in FIG. 11, the processing ends.

If the decision blocks s213 and s215 determine that the annotation is text and the query is speech, then the processing proceeds to steps s241 to s251, which are operable to propagate the path ending at point (i,j) to the points shown in FIG. 9a. In particular, in step s241, the system determines whether or not the annotation phoneme loop pointer i is pointing to the last phoneme in the annotation. If it is, then there are no more phonemes in the annotation and the processing ends. If the annotation phoneme loop pointer i is less than Nann-1, then the processing proceeds to step s243, where the query phoneme loop pointer j2 is compared with mxj. Initially, j2 will be less than mxj and therefore the processing proceeds to step s245 where the system calculates the transition score (TRANSCORE) from point (i,j) to point (i+1,j2). This transition score is then added to the cumulative score associated with the path ending at point (i,j) and the result is copied to the temporary score, TEMP-SCORE. The system then performs, in step s249, a log addition of TEMPSCORE with the cumulative score associated with the point (i+1,j2) and stores the result in SCORE (i+1,j2), to ensure that the path scores for paths which meet at the lattice point (i+1,j2) are combined. The processing then proceeds to step s251 where the query phoneme loop pointer j2 is incremented by one and then the processing returns to step s243. Once the path which ends at point (i,j) has been propagated to the other points shown in FIG. 9a, j2 will equal mxj and the propagation of the path ending at point (i,j) will end.

Figure 16B:
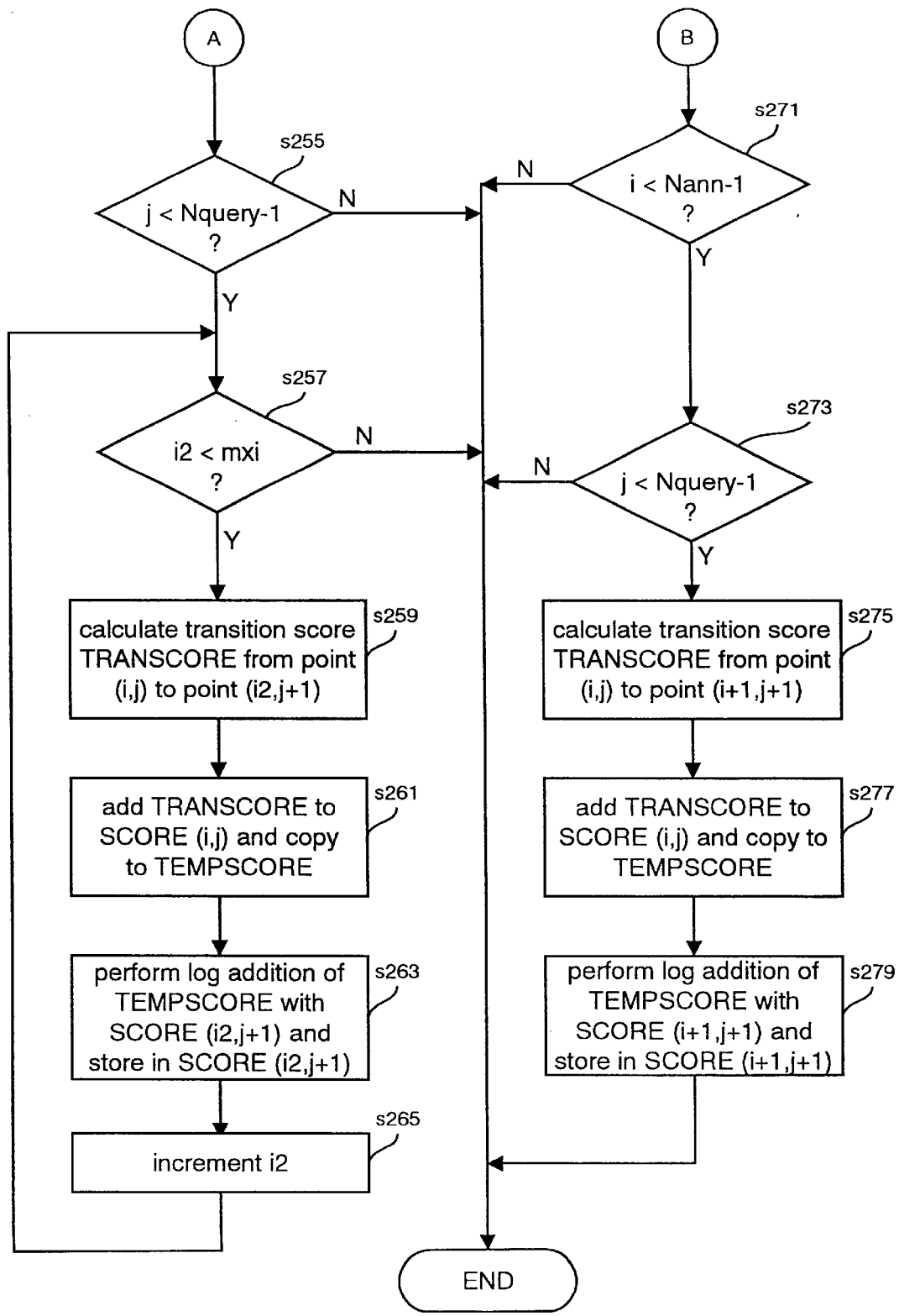
FIG. 16b is a flow diagram illustrating the remaining process steps involved in propagating a path using the dynamic programming constraints.

If the decision blocks s213 and s217 determine that the annotation is speech and the query is text, then the processing proceeds to steps s255 to s265 shown in FIG. 16b, which are operable to propagate the path ending at point (i,j) to the other points shown in FIG. 9b. This is achieved by firstly checking, in step s255, that the query phoneme loop pointer j is not pointing to the last phoneme in the sequence of phonemes representing the query. If it is not, then the processing proceeds to step s257 where the annotation phoneme loop pointer i2 is compared with mxi. Initially i2 has a value of i and provided annotation phoneme i is not at the end of the sequence of phonemes representing the annotation, the processing will proceed to step s259, where the transition score for moving from point (i,j) to point (i2,j+1) is calculated. The processing then proceeds to step s261 where this transition score is added to the cumulative score for the path ending at point (i,j) and the result is copied to the temporary score, TEMPSCORE. The processing then proceeds to step s263 where a log addition is performed of TEMPSCORE with the cumulative score already stored for the point (i2,j+1) and the result is stored in SCORE (i2,j+1). The processing then proceeds to step s265 where the annotation phoneme loop pointer i2 is incremented by one and the processing returns to step s257. These processing steps are then repeated until the path ending at point (i,j) has been propagated to each of the other points shown in FIG. 9b. At this time, the propagation of the path at point (i,j) is completed and the processing ends.

Finally, if the decision blocks s213 and s215 determine that both the annotation and the query are text, then the processing proceeds to steps s271 to s279 shown in FIG. 16b, which are operable to propagate the path ending at point (i,j) to the point (i+1,j+1), provided of course there is a further annotation phoneme and a further query phoneme. In particular, in step s271, the system checks that the annotation phoneme loop pointer i is not pointing to the last annotation phoneme. If it is not then the processing proceeds to step s273 where a similar check is made for the query phoneme loop pointer j relative to the sequence of query phonemes. If there are no more annotation phonemes or if there are no more query phonemes, then the processing ends. If, however, there is a further annotation phoneme and a further query phoneme, then the processing proceeds to step s275 where the system calculates the transition score from point (i,j) to point (i+1,j+1). This transition score is then added, in step s277, to the cumulative score stored for the point (i,j) and stored in the temporary score, TEMPSCORE. The processing then proceeds to step s279 where the system performs a log addition of TEMPSCORE with the cumulative score already stored for point (i+1,j+1) and the result is copied to SCORE (i+1,j+1). As those skilled in the art will appreciate, steps s277 and s279 are necessary in this embodiment because the dynamic programming constraints allow a path to start at any phoneme within the sequence of phonemes representative of the annotation and therefore, point (i+1,j+1) may already have a score associated with it. After step s279, the propagation of point (i,j) is completed and the processing ends.

Transition Score

In steps s103, s105 and s107 shown in FIG. 12, dynamic programming paths are propagated and during this propagation, the transition score from one point to another point is calculated in steps s1 27, s117, s177, s191, s229, s245, s259 and s275. In these steps, the system calculates the appropriate insertion probabilities, deletion probabilities and decoding probabilities relative to the start point and end point of the transition. The way in which this is achieved in this embodiment, will now be described with reference to FIGS. 17 and 18.

Figure 17:
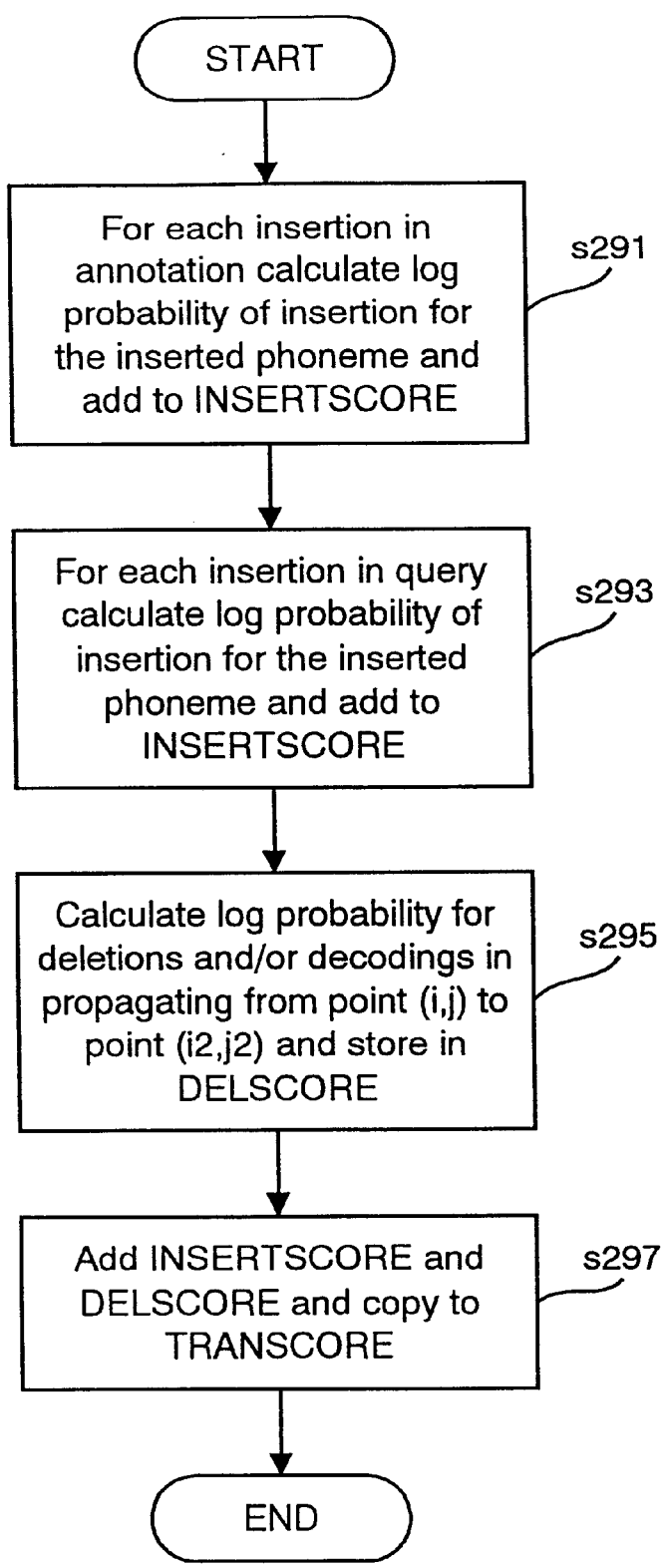
FIG. 17 is a flow diagram illustrating the processing steps involved in determining a transition score for propagating a path from a start point to an end point.

In particular, FIG. 17 shows a flow diagram which illustrates the general processing steps involved in calculating the transition score for a path propagating from lattice point (i,j) to lattice point (i2,j2). In step s291, the system calculates, for each annotation phoneme which is inserted between point (i,j) and point (i2,j2), the score for inserting the inserted phoneme(s) (which is just the log of probability PI( ) discussed above) and adds this to an appropriate store, INSERTSCORE. The processing then proceeds to step s293 where the system performs a similar calculation for each query phoneme which is inserted between point (i,j) and point (i2,j2) and adds this to INSERTSCORE. Note, however, that if (i,j) is the start null node $\phi_s$ or if (i2,j2) is the end null node $\phi_o$, then the system does not calculate the insertion probabilities for any inserted annotation phonemes (since there is no penalty for starting or ending a path at any of the annotation phonemes), although it does calculate insertion probabilities for any inserted query phonemes. As mentioned above, the scores which are calculated are log based probabilities, therefore the addition of the scores in INSERTSCORE corresponds to the multiplication of the corresponding insertion probabilities. The processing then proceeds to step s295 where the system calculates the scores for any deletions and/or any decodings in propagating from point (i,j) to point (i2,j2) and these scores are added and stored in an appropriate store, DELSCORE. The processing then proceeds to step s297 where the system adds INSERTSCORE and DELSCORE and copies the result to TRANSCORE.

Figure 18A:
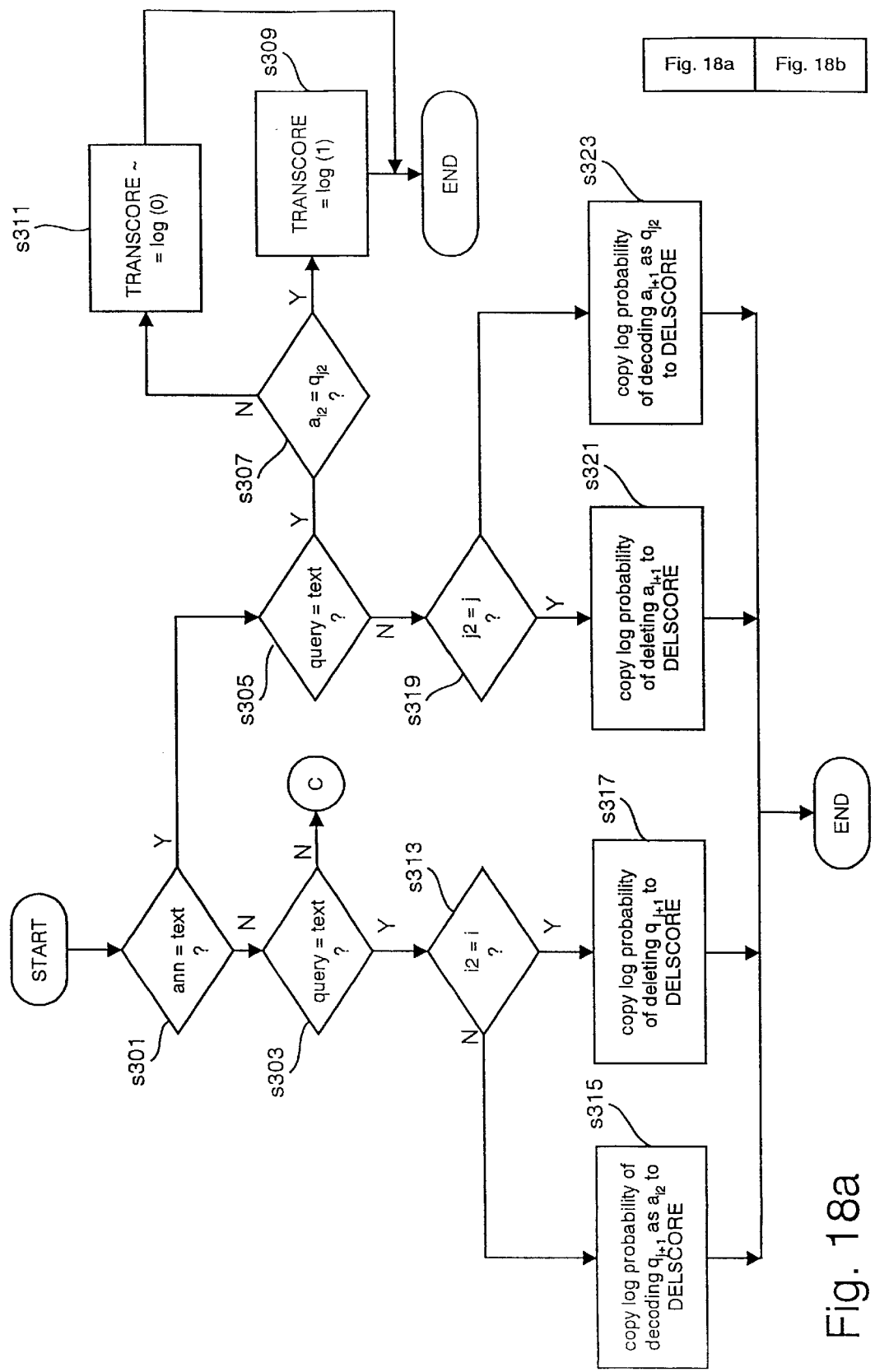
FIG. 18a is a flow diagram illustrating part of the processing steps employed in calculating scores for deletions and decodings of annotation and query phonemes.
Figure 18B:
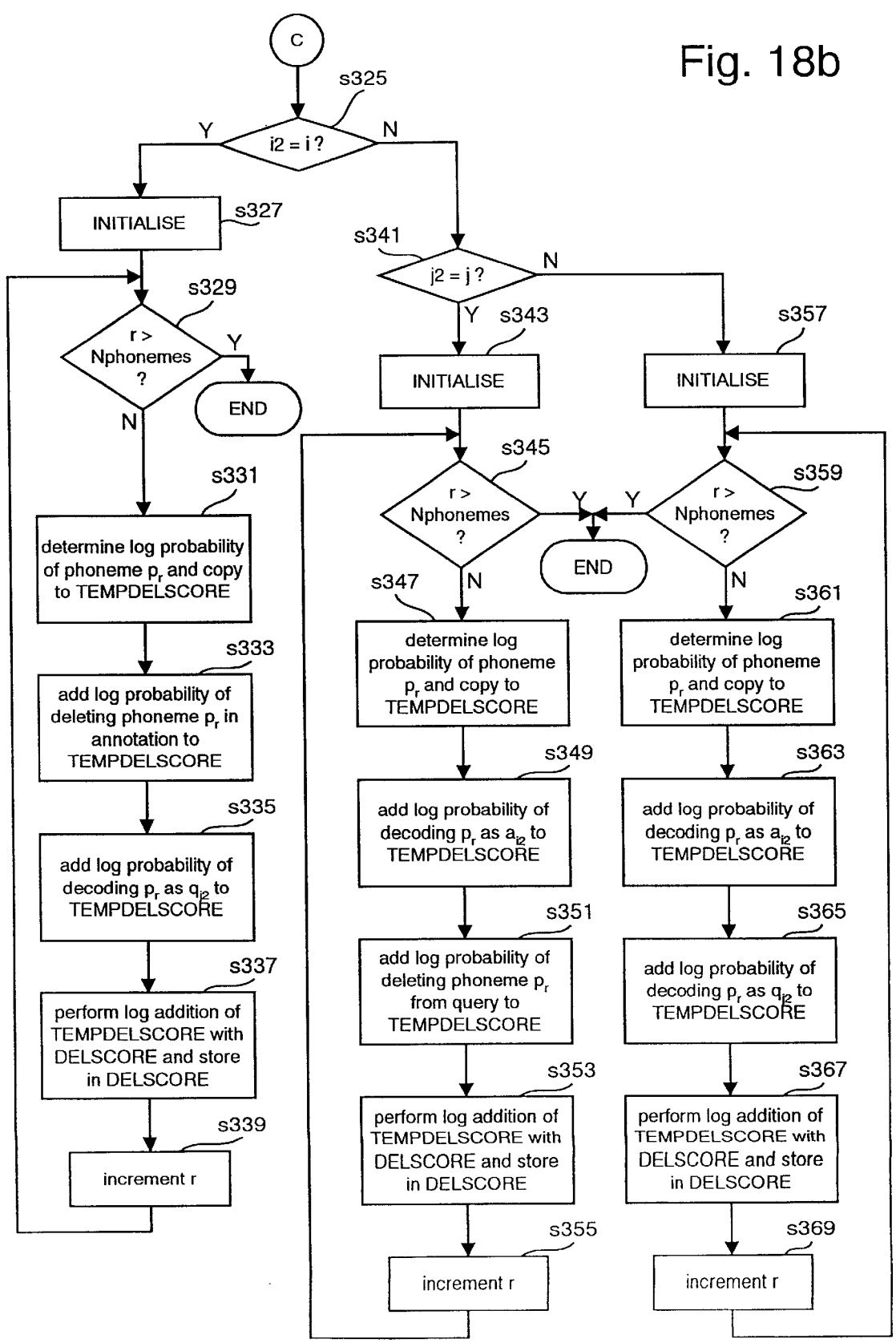
FIG. 18b is a flow diagram illustrating the remaining steps employed in determining scores for deletions and decodings of annotation and query phonemes.

The processing involved in step s295 to determine the deletion and/or decoding scores in propagating from point (i,j) to point (i2,j2) will now be described in more detail with reference to FIG. 18. Since the possible deletions and decodings depend on whether or not the annotation was generated from text and whether or not the query was generated from text, the decision blocks s301, s303 and s305 determine if the annotation is text or speech and if the query is text or speech. If these decision blocks determine that both the annotation and the query are text, then there are no deletions and the decoding of the two phonemes is performed by a boolean match in step s307. If annotation phoneme $a_{i2}$ is the same as query phoneme $q_{j2}$, then the processing proceeds to step s309, where TRANSCORE is set to equal log [one] (i.e. zero) and the processing ends. If, however, annotation phoneme $a_{i2}$ is not the same as query phoneme $q_{j2}$, then the processing proceeds to step s311 where TRANSCORE is set to a very large negative number which is a system approximation of log [zero] and the processing then ends.

If the decision blocks s301 and s305 determine that the annotation is speech and the query is text, then the transition scores are determined using the simplified form of equation (4) discussed above. In this case, the processing passes from step s303 to step s313 where the system determines if annotation loop pointer i2 equals annotation loop pointer i. If it does, then this means that the path has propagated from point (i,j) to point (i,j+1). Therefore, the query phoneme $q_{j+1}$ has been deleted from the sequence of annotation phonemes relative to the sequence of query phonemes. Therefore, in step s317, the system copies the log probability of deleting phoneme $q_{j+1}$ (i.e. log $P(\phi|q_{j+1},C)$) to DELSCORE and the processing ends. If in step s313, the system determines that i2 is not equal to i, then the system is considering the propagation of the path ending at point (i,j) to one of the points (i+1,j+1), (i+2,j+1) or (i+3,j+1). In which case, there are no deletions, only insertions and a decoding between annotation phoneme $a_{i2}$ with query phoneme $q_{j+1}$. Therefore, in step s315, the system copies the log probability of decoding query phoneme $q_{j+1}$ as annotation phoneme $a_{i2}$ (i.e. log $P(a_{i2}|q_{j+1},C)$) to DELSCORE and the processing ends.

If the decision blocks s301 and s305 determine that the annotation is text and that the query is speech, then the transition scores are determined using the other simplified form of equation (4) discussed above. In this case, the processing passes from step s305 to step s319 where the system determines whether or not query phoneme loop pointer j2 equals query phoneme loop pointer j. If it does, then the system is calculating the transition score from point (i,j) to point (i+1,j). In this case, the annotation phoneme $a_{i+1}$ has been deleted from the sequence of query phonemes relative to the sequence of annotation phonemes. Therefore, in step s321, the system determines and copies the log probability of deleting annotation phoneme $a_{i+1}$ (i.e. log $P(\phi|a_{i+1},C)$) to DELSCORE and then the processing ends. If at step s319, the system determines that query phoneme loop pointer j2 is not equal to query phoneme loop pointer j, then the system is currently determining the transition score from point (i,j) to one of the points (i+1,j+1), (i+1,j+2) or (i+1, j+3). In this case, there are no deletions, only insertions and a decoding between annotation phoneme $a_{i+1}$ with query phoneme $q_{j2}$. Therefore, in step s323, the system determines and copies the log probability of decoding annotation phoneme $a_{i+1}$ as query phoneme $q_{j2}$ (i.e. log $P(q_{j2}|a_{i+1},C)$) to DELSCORE and the processing ends.

If the decision blocks s301 and s303 determine that both the annotation and the query are generated from speech, then the transition scores are determined using equation (4) above. In this case, the processing passes from step s303 to step s325 where the system determines if the annotation loop pointer i2 equals annotation loop pointer i. If it does, then the processing proceeds to step s327 where a phoneme loop pointer r is initialized to one. The phoneme pointer r is used to loop through each possible phoneme known to the system during the calculation of equation (4) above. The processing then proceeds to step s329, where the system compares the phoneme pointer r with the number of phonemes known to the system, Nphonemes (which in this embodiment equals 43). Initially r is set to one in step s327, therefore the processing proceeds to step s331 where the system determines the log probability of phoneme $p_r$ occurring (i.e. log $P(p_r|C)$) and copies this to a temporary score TEMPDELSCORE. If annotation phoneme loop pointer i2 equals annotation phoneme i, then the system is propagating the path ending at point (i,j) to one of the points (i,j+1), (i,j+2) or (i,j+3). Therefore, there is a phoneme in the query which is not in the annotation. Consequently, in step s333, the system adds the log probability of deleting phoneme $p_r$ from the annotation (i.e. log $P(\phi|p_r,C)$) to TEMPDELSCORE. The processing then proceeds to step s335, where the system adds the log probability of decoding phoneme $p_r$ as query phoneme $q_{j2}$ (i.e. log $P(q_{j2}|p_r,C)$) to TEMPDELSCORE. The processing then proceeds to step s337 where the log addition of TEMPDELSCORE and DELSCORE is performed and the result is stored in DELSCORE. The processing then proceeds to step s339 where the phoneme loop pointer r is incremented by one and then the processing returns to step s329 where a similar processing is performed for the next phoneme known to the system. Once this calculation has been performed for each of the 43 phonemes known to the system, the processing ends.

If at step s325, the system determines that i2 is not equal to i, then the processing proceeds to step s341 where the system determines if the query phoneme loop pointer j2 equals query phoneme loop pointer j. If it does, then the processing proceeds to step s343 where the phoneme loop pointer r is initialized to one. The processing then proceeds to step s345 where the phoneme loop pointer r is compared with the total number of phonemes known to the system (Nphonemes). Initially r is set to one in step s343, and therefore, the processing proceeds to step s347 where the log probability of phoneme $p_r$ occurring is determined and copied into the temporary store TEMPDELSCORE. The processing then proceeds to step s349 where the system determines the log probability of decoding phoneme $p_r$ as annotation phoneme $a_{i2}$ and adds this to TEMPDELSCORE. If the query phoneme loop pointer j2 equals query phoneme loop pointer j, then the system is propagating the path ending at point (i,j) to one of the points (i+1,j), (i+2,j) or (i+3,j). Therefore, there is a phoneme in the annotation which is not in the query. Consequently, in step s351, the system determines the log probability of deleting phoneme $p_r$ from the query and adds this to TEMPDELSCORE. The processing then proceeds to step s353 where the system performs the log addition of TEMPDELSCORE with DELSCORE and stores the result in DELSCORE. The phoneme loop pointer r is then incremented by one in step s355 and the processing returns to step s345. Once the processing steps s347 to s353 have been performed for all the phonemes known to the system, the processing ends.

If at step s341, the system determines that query phoneme loop pointer j2 is not equal to query phoneme loop pointer j, then the processing proceeds to step s357 where the phoneme loop pointer r is initialized to one. The processing then proceeds to step s359 where the system compares the phoneme counter r with the number of phonemes known to the system (Nphonemes). Initially r is set to one in step s357, and therefore, the processing proceeds to step s361 where the system determines the log probability of phoneme $p_r$ occurring and copies this to the temporary score TEMPDELSCORE. If the query phoneme loop pointer j2 is not equal to query phoneme loop pointer j, then the system is propagating the path ending at point (i,j) to one of the points (i+1,j+1), (i+1,j+2) and (i+2,j+1). Therefore, there are no deletions, only insertions and decodings. The processing therefore proceeds to step s363 where the log probability of decoding phoneme $p_r$ as annotation phoneme $a_{i2}$ is added to TEMPDELSCORE. The processing then proceeds to step s365 where the log probability of decoding phoneme $p_r$ as query phoneme $q_{j2}$ is determined and added to TEMPDELSCORE. The system then performs, in step s367, the log addition of TEMPDELSCORE with DELSCORE and stores the result in DELSCORE. The phoneme counter r is then incremented by one in step s369 and the processing returns to step s359. Once processing steps s361 to s367 have been performed for all the phonemes known to the system, the processing ends.

Normalization

The above description of the dynamic programming process has dealt only with the numerator part of equation (3) above. Therefore, after an input query has been matched with a sequence of annotation phonemes in the database, the score for that match (which is stored in ENDSCORE) must be normalised by the normalising term defined by the denominator of equation (3). As mentioned above, the calculation of the denominator term is performed at the same time as the calculation of the numerator, i.e. in the dynamic programming routine described above. This is because, as can be seen from a comparison of the numerator and the denominator, the terms required for the denominator are all calculated on the numerator. It should, however, be noted that when the annotation or the query is generated from text, no normalization is performed. In this embodiment, normalization is performed so that longer annotations are not given more weight than shorter annotations and so that annotations which include common phonemes are not given more weight than annotations which include uncommon phonemes. It does this by normalising the score by a term which depends upon how well the annotation matches the underlying model.

Training

In the above embodiment, the system used 1892 decoding/deletion probabilities and 43 insertion probabilities (referred to above as the confusion statistics) which were used to score the dynamic programming paths in the phoneme matching operation. In this embodiment, these probabilities are determined in advance during a training session and are stored in a memory (not shown). In particular, during this training session, a speech recognition system is used to provide a phoneme decoding of speech in two ways. In the first way, the speech recognition system is provided with both the speech and the actual words which are spoken. The speech recognition unit can therefore use this information to generate the canonical phoneme sequence of the spoken words to obtain an ideal decoding of the speech. The speech recognition system is then used to decode the same speech, but this time without knowledge of the actual words spoken (referred to hereinafter as the free decoding). The phoneme sequence generated from the free decoding will differ from the canonical phoneme sequence in the following ways:

i) the free decoding may make mistakes and insert phonemes into the decoding which are not present in the canonical sequence or, alternatively, omit phonemes in the decoding which are present in the canonical sequence;

ii) one phoneme may be confused with another; and iii) even if the speech recognition system decodes the speech perfectly, the free decoding may nonetheless differ from the canonical decoding due to the differences between conversational pronunciation and canonical pronunciation, e.g., in conversational speech the word "and" (whose canonical forms are /ae/ /n/ /d/ and /ax/ /n/ /d/) is frequently reduced to /ax/ /n/ or even /n/.

Therefore, if a large number of utterances are decoded into their canonical forms and their free decoded forms, then a dynamic programming method can be used to align the two. This provides counts of what was decoded, d, when the phoneme should, canonically, have been a p. From these training results, the above decoding, deletion and insertion probabilities can be approximated in the following way.

The probability that phoneme, d, is an insertion is given by:

$$P|(d|C) = \frac{I_d}{n_o^d} \qquad (9)$$

where $I_d$ is the number of times the automatic speech recognition system inserted phoneme d and $n_o^d$ is the total number of decoded phonemes which are inserted relative to the canonical sequence.

The probability of decoding phoneme p as phoneme d is given by:

$$P(d|p, C) = \frac{c_{dp}}{n_p} \qquad (10)$$

where $C_{dp}$ is the number of times the automatic speech recognition system decoded d when it should have been p and $n_p$ is the number of times the automatic speech recognition system decoded anything (including a deletion) when it should have been p.

The probability of not decoding anything (i.e. there being a deletion) when the phoneme p should have been decoded is given by:

$$P(\emptyset|p, C) = \frac{O_p}{n_p} \qquad (11)$$

where $O_p$ is the number of times the automatic speech recognition system decoded nothing when it should have decoded p and $n_p$ is the same as above.

Alternative Embodiments

As those skilled in the art will appreciate, the above technique for matching one sequence of phonemes with another sequence of phonemes can be applied to applications other than data retrieval. Additionally, as those skilled in the art will appreciate, although the system described above has used phonemes in the phoneme and word lattice, other phoneme-like units can be used, such as syllables or katakana (Japanese alphabet). As those skilled in the art will appreciate, the above description of the dynamic programming matching and alignment of the two sequences of phonemes was given by way of example only and various modifications can be made. For example, whilst a raster scanning technique for propagating the paths through the lattice points was employed, other techniques could be employed which progressively propagates the paths through the lattice points. Additionally, as those skilled in the art will appreciate, dynamic programming constraints other than those described above may be used to control the matching process.

Figure 19A:
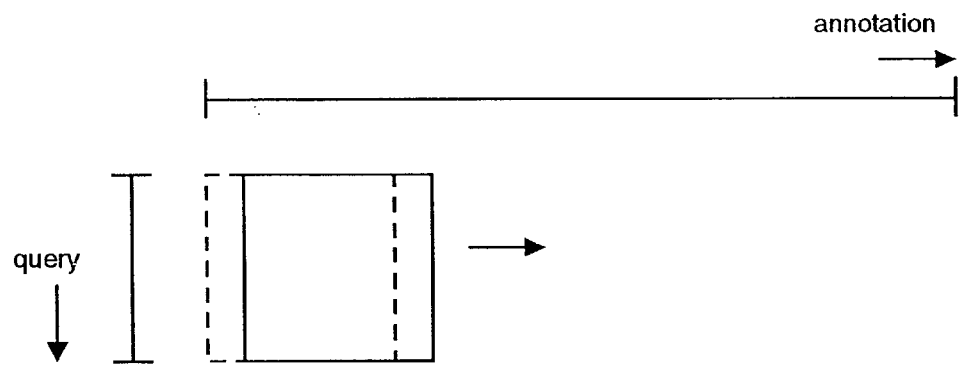
FIG. 19a schematically illustrates an alternative embodiment which employs a different technique for aligning the query with each annotation.
Figure 19B:
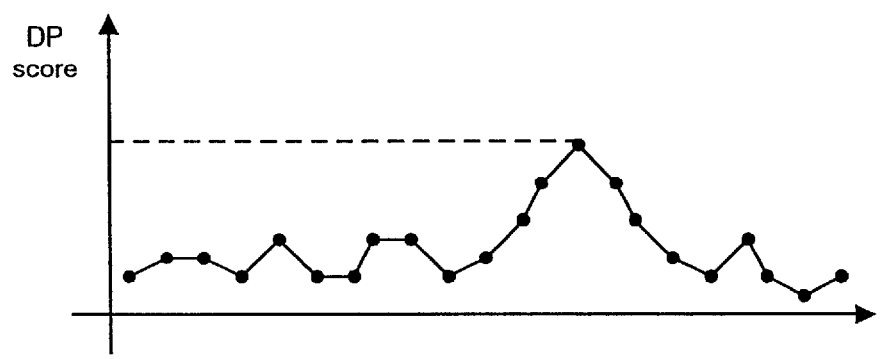

In the above embodiment, the annotation was generally longer than the query and the dynamic programming alignment algorithm aligned the query with the entire annotation. In an alternative embodiment, the alignment algorithm may compare the query with the annotation by stepping the query over the annotation from beginning to end and, at each step, comparing the query with a portion of the annotation of approximately the same size as the query. In such an embodiment, at each step, the query would be aligned with the corresponding portion of the annotation using a similar dynamic programming technique to the one described above. This technique is illustrated in FIG. 19a with the resulting plot showing the way in which the dynamic programming score for the alignments between the query and a current annotation varies as the query is stepped over the annotation is shown in FIG. 19b. The peaks in the plot shown in FIG. 19b represent the parts of the annotation which match best with the query. The annotation which is most similar to the query can then be determined by comparing the peak DP score obtained during the comparison of the query with each annotation.

In the above embodiment, pictures were annotated using the phoneme and word lattice annotation data. As those skilled in the art will appreciate, this phoneme and word lattice data can be used to annotate many different types of data files. For example, this kind of annotation data can be used in medical applications for annotating x-rays of patients, 3D videos of, for example, NMR scans, ultrasound scans etc. It can also be used to annotate 1D data, such as audio data or seismic data.

In the above embodiments, a speech recognition system which generates a sequence of phonemes from the input speech signal was used. As those skilled in the art will appreciate, the above system can be used with other types of speech recognition systems which generate, for example, a sequence of output words or a word lattice which can then be decomposed into a corresponding string of phonemes with alternatives, in order to simulate a recognizer which produces phoneme strings.

In the above embodiment, the insertion, deletion and decoding probabilities were calculated from the confusion statistics for the speech recognition system using a maximum likelihood estimate of the probabilities. As those skilled in the art of statistics will appreciate, other techniques, such as maximum entropy techniques, can be used to estimate these probabilities. Details of a suitable maximum entropy technique can be found at pages 45 to 52 in the book entitled "Maximum Entropy and Bayesian Methods" published by Kluwer Academic publishers and written by John Skilling, the contents of which are incorporated herein by reference.

In the above embodiment, the database 29 and the automatic speech recognition unit 51 were both located within the user terminal 59. As those skilled in the art will appreciate, this is not essential. FIG. 19 illustrates an embodiment in which the database 29 and the search engine 53 are located in a remote server 60 and in which the user terminal 59 accesses the database 29 via the network interface units 67 and 69 and a data network 68 (such as the Internet). In this embodiment, the user terminal 59 can only receive voice queries from the microphone 7. These queries are converted into phoneme and word data by the automatic speech recognition unit 51. This data is then passed to the control unit 55 which controls the transmission of the data over the data network 68 to the search engine 53 located within the remote server 60. The search engine 53 then carries out the search in a similar manner to the way in which the search was performed in the above embodiment. The results of the search are then transmitted back from the search engine 53 to the control unit 55 via the data network 68. The control unit 55 then considers the search results received back from the network and displays appropriate data on the display 57 for viewing by the user 39.

Figure 20:
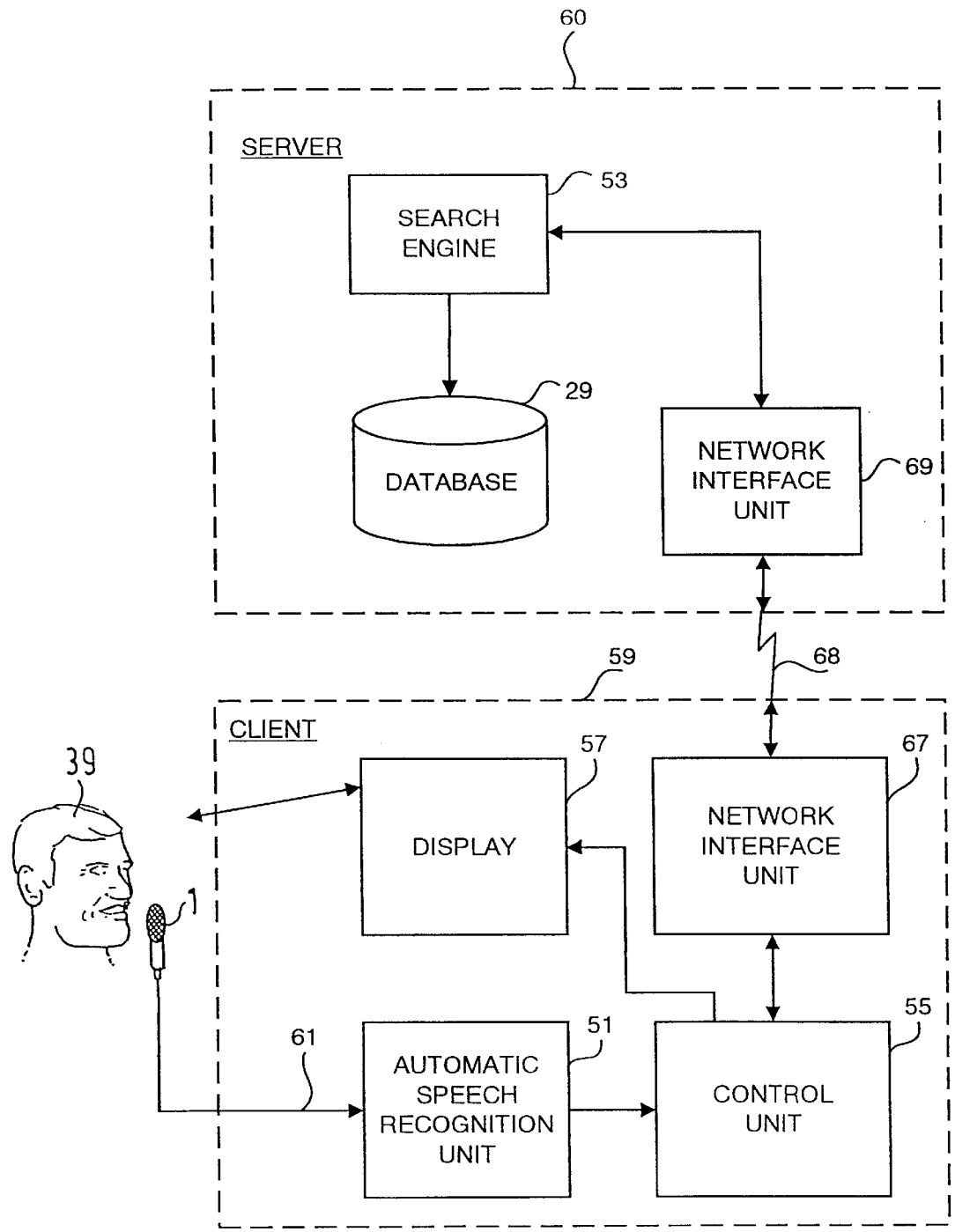
FIG. 20 is a schematic block diagram illustrating the form of an alternative user terminal which is operable to retrieve a data file from a database located within a remote server in response to an input voice query.
Figure 21:
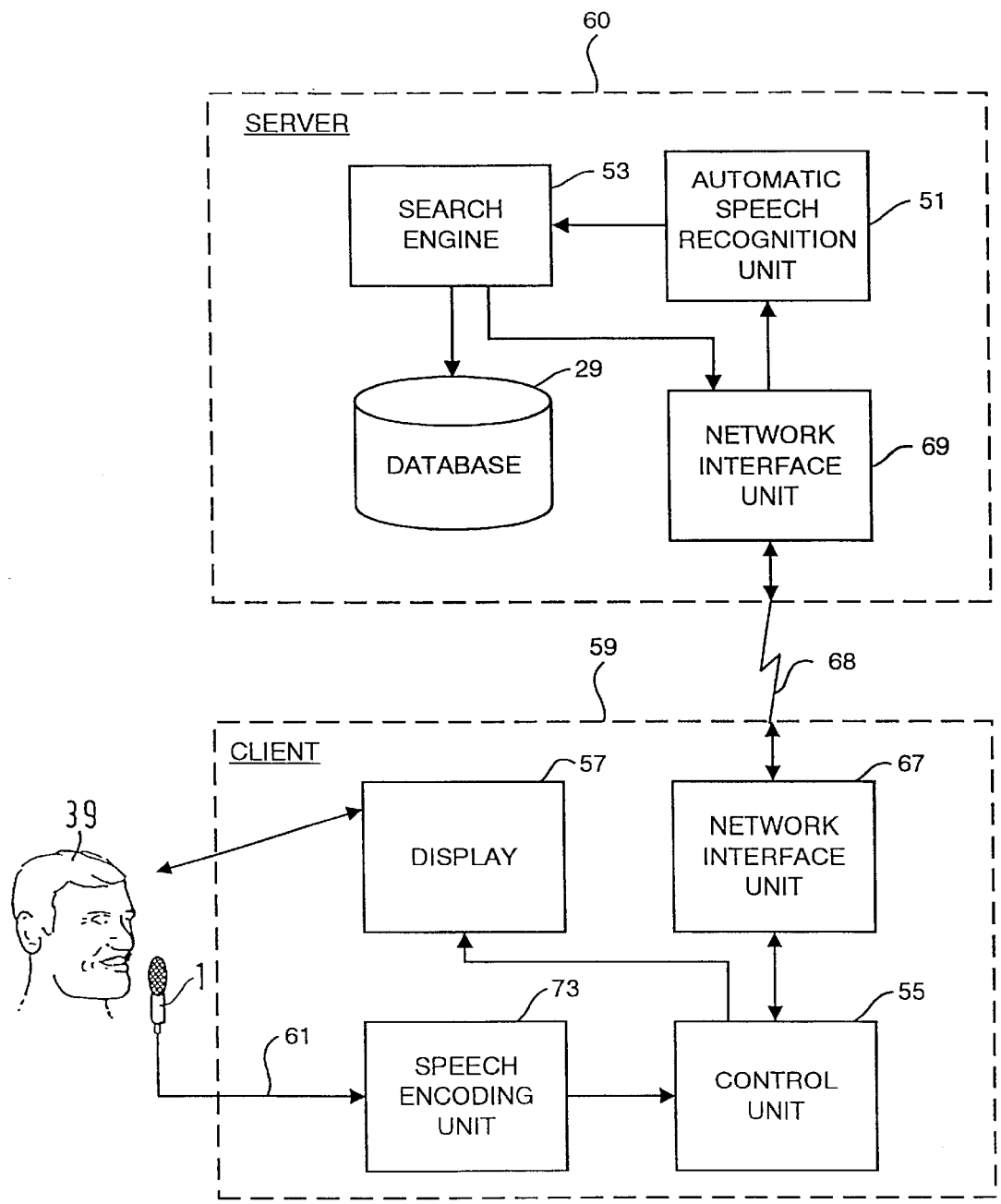
FIG. 21 illustrates another user terminal which allows a user to retrieve data from a database located within a remote server in response to an input voice query.

In addition to locating the database 29 and the search engine 53 in the remote server 60, it is also possible to locate the automatic speech recognition unit 51 in the remote server 60. Such an embodiment is shown in FIG. 20. As shown, in this embodiment, the input voice query from the user is passed via input line 61 to a speech encoding unit 73 which is operable to encode the speech for efficient transfer through the data network 68. The encoded data is then passed to the control unit 55 which transmits the data over the network 68 to the remote server 60, where it is processed by the automatic speech recognition unit 51. The phoneme and word data generated by the speech recognition unit 51 for the input query is then passed to the search engine 53 for use in searching the database 29. The search results generated by the search engine 53 are then passed, via the network interface 69 and the network 68, back to the user terminal 59. The search results received back from the remote server are then passed via the network interface unit 67 to the control unit 55 which analyses the results and generates and displays appropriate data on the display 57 for viewing by the user 39.

In a similar manner, a user terminal 59 may be provided which only allows typed inputs from the user and which has the search engine and the database located in the remote server. In such an embodiment, the phonetic transcription unit 75 may be located in the remote server 60 as well.

In the above embodiments, a dynamic programming algorithm was used to align the sequence of query phonemes with the sequences of annotation phonemes. As those skilled in the art will appreciate, any alignment technique could be used. For example, a naive technique could be used which identifies all possible alignments. However, dynamic programming is preferred because of its ease of implementation using standard processing hardware.

A description has been given above of the way in which two or more canonical sequences of phonemes are compared using a dynamic programming technique. However, as shown in FIGS. 2 and 3, the annotations are preferably stored as lattices. As those skilled in the art will appreciate, in order that the above comparison techniques will work with these lattices, the phoneme sequences defined by the lattices must be "flattened" into a single sequence of phonemes with no branches. A naive approach to do this would be to identify all the different possible phoneme sequences defined by the lattice and then to compare each of those with the or each query sequence. However, this is not preferred, since common parts of the lattice will be matched several times with each query sequence. Therefore, the lattice is preferably flattened by sequentially labelling each phoneme within the lattice in accordance with the time stamp information available for each phoneme within the lattice. Then, during the dynamic programming alignment, different dynamic programming constraints are used at each DP lattice point, in order to ensure that the paths propagate in accordance with the lattice structure.

The table below illustrates the DP constraints used for part of the phoneme lattice shown in FIG. 2. In particular, the first column illustrates the phoneme number ($p_1$ to $p_9$) assigned to each phoneme in the lattice; the middle column corresponds to the actual phoneme in the lattice; and the last column illustrates, for each phoneme, the phonemes to which a path ending at that phoneme may propagate to, at the next dynamic programming time point. Although not shown, the middle column will also include details of the node to which the phoneme is connected and the corresponding phoneme link.

| Phoneme Number | Phoneme | Dynamic Programming Constraints |
| --- | --- | --- |
| $p_1$ | /p/ | $p_1; p_2; p_3; p_4$ |
| $p_2$ | /ih/ | $p_2; p_3; p_4; p_5$ |
| $p_3$ | /k/ | $p_6$ |
| | | $p_3; p_4; p_5; p_7$ |
| | | $p_8$ |

-continued

| Phoneme Number | Phoneme | Dynamic Programming Constraints |
| --- | --- | --- |
| $p_4$ | /ch/ | $p_6; p_{10}$ |
| | | $p_4; p_5; p_7; p_9$ |
| | | $p_8; p_{11}$ |
| $p_5$ | /ax/ | $p_6; p_{10}; p_{12}$ |
| | | $p_5; p_7; p_9; p_{12}$ |
| | | $p_8; p_{11}; p_{13}$ |
| | | $p_{14}$ |
| $p_6$ | /ax/ | $p_6; p_{10}; p_{12}; p_{15}$ |
| | | $p_{16}$ |
| $p_7$ | /ao/ | $p_7; p_9; p_{12}; p_{15}$ |
| | | $p_{16}$ |
| $p_8$ | /ah/ | $p_8; p_{11}; p_{13}; p_{18}$ |
| | | $p_{14}; p_{17}$ |
| $p_9$ | /f/ | $p_9; p_{12}; p_{15} ; p_{18}$ |
| | | $p_{16}; p_{18}$ |

For example, if a dynamic programming path ends at time ordered phoneme $p_4$, then that dynamic programming path can stay at phoneme $p_4$ or it can propagate to any of time ordered phonemes $p_5$ to $p_{11}$. As shown in the table, at some points the possible phonemes to which a path can extend are not consecutively arranged in the time ordered phoneme sequence. For example, for a dynamic programming path ending at time ordered phoneme $p_6$, this path can either stay at this phoneme or progress to phonemes $p_{10}, p_{12}, p_{15}$ or $p_{16}$. By consecutively numbering the phonemes in the lattice in this way and by varying the dynamic programming constraints used in dependence upon the lattice, an efficient dynamic programming matching between the input query and the annotation lattice can be achieved. Further, as those skilled in the art will appreciate, if the input query also generates a lattice, then this may be flattened in a similar way and the dynamic programming constraints adjusted accordingly.

In the above embodiment, the same phoneme confusion probabilities were used for both the annotations and the queries. As those skilled in the art will appreciate, if different recognition systems are used to generate these, then different phoneme confusion probabilities should be used for the annotations and the queries. Since these confusion probabilities depend upon the recognition system that was used to generate the phoneme sequences.

In the above embodiment, when either the annotation or the query was generated from text, it was assumed that the canonical sequence of phonemes corresponding to the typed text was correct. This may not be the case since this assumes that the typed word or words are not mis-spelled or mis-typed. Therefore, in an alternative embodiment, confusion probabilities may also be used for typed queries and/or annotations. In other words, equations (4) and (12) would be used even where either the annotation or the query or both are text. The confusion probabilities used may try to codify either or both mis-spellings and mis-typings. As those skilled in the art will appreciate, the confusion probabilities for mis-typings will depend upon the type of keyboard used. In particular, the confusion probabilities of mis-typing a word will depend upon the layout of the keyboard. For example, if a letter "d" is typed then the keys surrounding the key for the letter "d" will have high mis-typing probabilities whereas those located further away from the "d" key will have lower mis-typing probabilities. As mentioned above, these mis-typing probabilities may be used together with or replaced by confusion probabilities for the mis-spelling of the words. These mis-spelling probabilities may be determined by analyzing typed documents from a large number of different users and monitoring the type of misspellings which usually occur. Such mis-spelling probabilities may also take into account transcription errors caused by mis-keying. In such an embodiment, the dynamic programming constraints used should allow for insertions and/or deletions in the typed input. For example, the constraints illustrated in FIG. 11 could be used.

A further alternative is where the text is input via a keyboard which assigns more than one character to each key (such as the keyboard of a mobile phone), where the user must repeatedly press each key to cycle through the characters assigned to that key. In such an embodiment, the confusion probabilities would be adjusted so that characters assigned to the same key as the input character would have higher mis-typing confusion probabilities than those associated with the other keys. This is because, as anyone who has used a mobile phone to send a text message will appreciate, mis-typings often occur because the key has not been pressed the correct number of times to input the desired character.

In the above embodiments, the control unit calculated decoding scores for each transition using equation (4) or (12) above. Instead of summing over all possible phonemes known to the system in accordance with these equations, the control unit may be arranged, instead, to identify the unknown phoneme Pr, which maximises the probability term within this summation and to use this maximum probability as the probability of decoding the corresponding phonemes of the annotation and query. However, this is not preferred, since it involves additional computation to determine which phoneme (Pr) maximises the probability term within this summation.

In the first embodiment described above, during the dynamic programming algorithm, equation (4) was calculated for each aligned pair of phonemes. In the calculation of equation (4), the annotation phoneme and the query phoneme were compared with each of the phonemes known to the system. As those skilled in the art will appreciate, for a given annotation phoneme and query phoneme pair, many of the probabilities given in equation (4) will be equal to or very close to zero. Therefore, in an alternative embodiment the annotation and query phoneme pair may only be compared with a subset of all the known phonemes, which subset is determined in advance from the confusion statistics. To implement such an embodiment, the annotation phoneme and the query phoneme could be used to address a lookup table which would identify the model phonemes which need to be compared with the annotation and query phonemes using equation (4).

M-GRAM

In the systems described above, a dynamic programming algorithm was used to align an entire query against either entire annotations or portions of annotations. In this embodiment, the query is divided into a number of portions and each of the portions is scanned across the annotation to identify corresponding portions in the annotation. This general technique was proposed by Ng, K. and Zue, V. W. and is discussed in, for example, the paper entitled "Subword unit representations for spoken document retrieval" published in the Proceedings of Eurospeech 1997, the contents of which are incorporated herein by reference.

Figure 22:
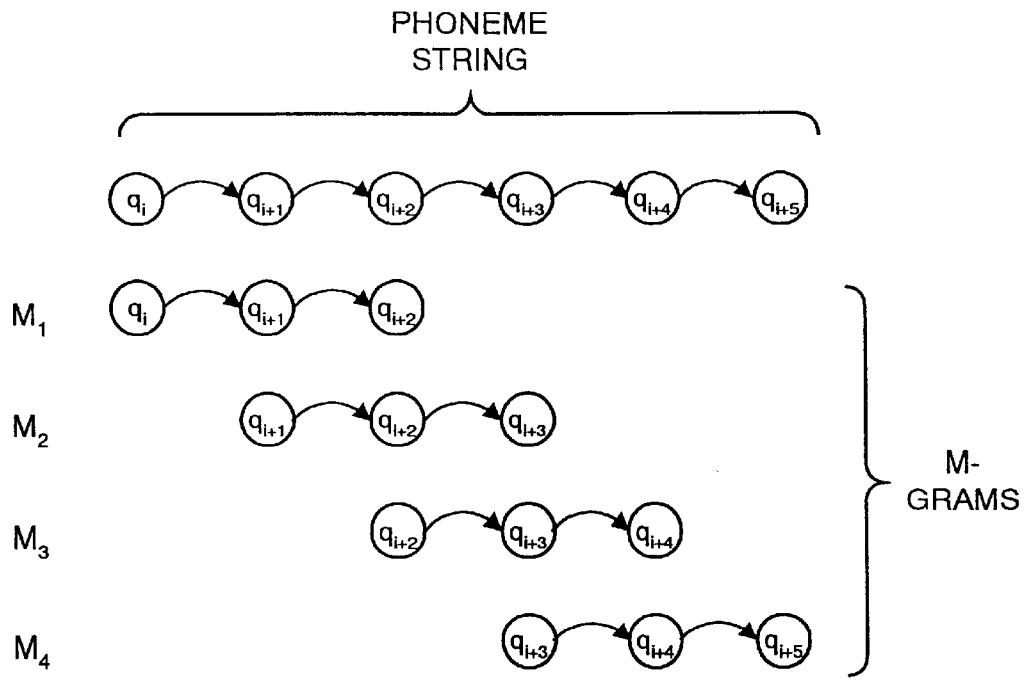
FIG. 22 is a schematic block diagram illustrating the form of a phoneme string and four M-grams generated from the phoneme string.

The portion of the query which is scanned over the annotation can be any size. However, if the portion is a single phoneme then there will not be enough discrimination between the annotations, since each phoneme is likely to occur in each annotation a predetermined number of times. Syllable-sized portions, however, are likely to provide more discriminability, although they are not easy to identify in the query. The technique proposed by Ng and Zue is a compromise between these two possibilities. In particular, this technique uses overlapping fixed-size fragments, or M-grams, of the query phoneme sequence to provide a set of features which are then compared with the annotation. This is illustrated in FIG. 22 which shows part of a query phoneme string having phonemes $q_i$, $q_{i+1}$, $q_{i+2}$, $q_{i+3}$, $q_{i+4}$ and $q_{i+5}$ which are split into four M-grams $M_1$ ($q_i$, $q_{i+1}$, $q_{i+2}$), $M_2$ ($q_{i+1}$, $q_{i+2}$, $q_{i+3}$), $M_3$ ($q_{i+2}$, $q_{i+3}$, $q_{i+4}$) and $M_4$ ($q_{i+3}$, $q_{i+4}$, $q_{i+5}$). In this illustration, it is assumed that each of the four M-grams $M_1$ to $M_4$ are unique and therefore comprise a unique sequence of three phonemes.

Therefore, in this embodiment, the first step in performing the phoneme search in steps s13 and s21 shown in FIG. 5, is to identify all the different M-grams which are in the query phoneme sequence and their frequency of occurrence within the query using, for example, a Boolean search. Then, the search engine 53 determines the frequency of occurrence of the identified M-grams in each of the stored annotations. In this embodiment, to do this, each of the M-grams is aligned along the entire annotation by, effectively, stepping the M-gram along the annotation and, at each step, comparing the current M-gram with a portion of the annotation having the same size as the M-gram. For the M-grams illustrated in FIG. 22, this involves comparing each M-gram with annotation phonemes $a_0$, $a_1$ and $a_2$, then with annotation phonemes $a_1$, $a_2$ and $a_3$, then with annotation phonemes $a_2$, $a_3$ and $a_4$ etc. In this embodiment, rather than perform a Boolean comparison at each step, a similar dynamic programming comparison technique to the one described above is used to compare the current M-gram with the current portion of the annotation. In particular, the comparison technique used in this embodiment uses equation (4) given above and the confusion statistics to determine a score for the possible confusion between one of the M-gram phonemes and one of the annotation phonemes during the DP comparison. However, as those skilled in the art will appreciate, the dynamic programming constraints which are used in this embodiment can be simplified because each alignment involves aligning three phonemes of the query with three phonemes of the current annotation.

Once a dynamic programming score has been calculated for each alignment between the current M-gram and the current portion of the current annotation, this score is normalised in a similar manner to the normalization described above. However, in this embodiment, the score is normalised both with respect to the current portion of the current annotation and with respect to the current M-gram. Additionally, in this embodiment, the normalization term which is calculated does not take into consideration deletions and insertions relative to the unknown model sequence of phonemes. In other words, for an alignment between annotation phoneme $a_i$ and query phoneme $q_j$, the system calculates:

$$\frac{\sum_{r=1}^{N_p} P(a_i \mid p_r, C) P(q_j \mid p_r, C) P(p_r \mid C)}{P(a_i \mid C) P(q_j \mid C)} \qquad (12)$$

This simplification of the normalising term can be done in this embodiment because there are only three phonemes being matched in the query with three phonemes in the annotation and therefore, for each M-gram comparison, it is unlikely that there will be any inserted or deleted phonemes.

However, if the size of the M-grams is increased then a normalization term which considers insertions and deletions would preferably be used.

Figure 23:
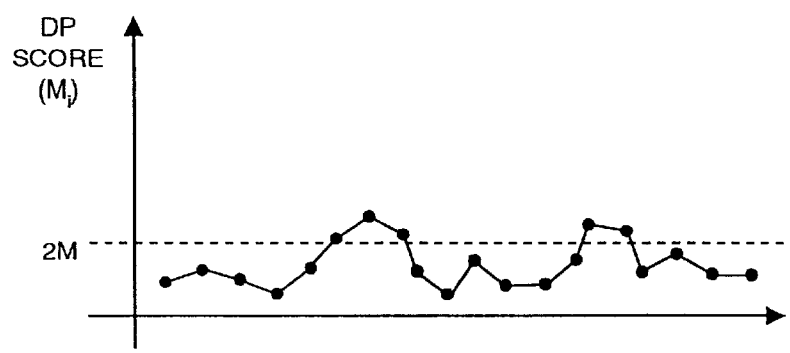
FIG. 23 is a plot illustrating the way in which a dynamic programming score varies with a comparison of one of the M-grams shown in FIG. 22 with a sequence of annotation phonemes.

Once the current M-gram has been scanned along the current annotation, a large number of DP scores will have been calculated. As those skilled in the art will appreciate, the number of DP scores calculated will depend upon the length of the current annotation relative to the size of the M-gram and the step size (which is usually one phoneme). The number of times that the current M-gram occurs in the current annotation can then be found by counting the number of times the DP score exceeds a predetermined threshold. This is illustrated in FIG. 23 which shows the way in which the DP score changes as the current M-gram ($M_i$) is stepped over the current annotation and the threshold value used. As shown, it was found that a threshold value of 2M, where M is the number of phonemes in the M-gram was a suitable threshold value. For the example shown in FIG. 23, the number of occurrences of the current M-gram ($M_i$) in the current annotation is five, since the DP score exceeds the threshold five times. Once all the different M-grams in the input query have been aligned with the current annotation, the number of times each M-gram occurs in both the current annotation and the query will be known. This is illustrated in the following table for the four M-grams shown in FIG. 22.

| M-gram | Frequency of Occurrence in Query | Frequency Occurrence in Current Annotation |
|---|---|---|
| $M_1$ | 1 | 0 |
| $M_2$ | 2 | 2 |
| $M_3$ | 3 | 2 |
| $M_4$ | 1 | 1 |

Figure 24:
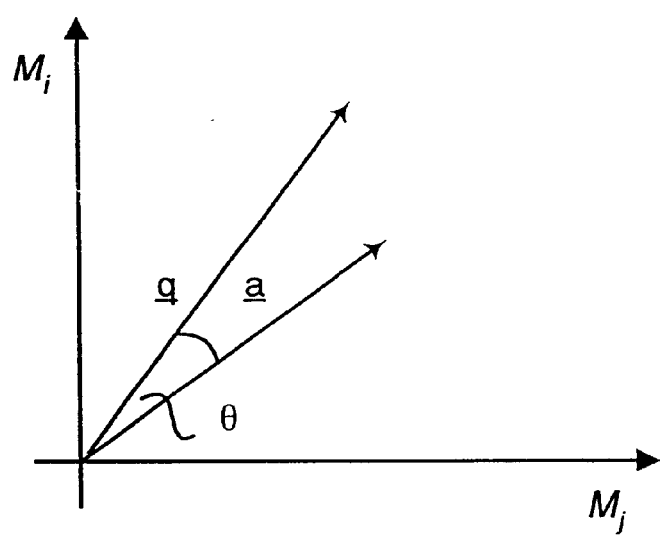
FIG. 24 is a plot showing two vectors and the angle between the two vectors.

With this information, it is then possible to calculate a similarity score representing the similarity between the input query and the current annotation by comparing the frequencies of occurrences. In this embodiment, this similarity score is determined using a cosine measure using the frequencies of occurrence of the identified M-grams in the input query and in the current annotation as vectors. The philosophy behind this technique is that if the input query is similar to the current annotation, then the frequency of occurrence of the M-gram features will be similar for the two phoneme strings. Therefore, if the frequencies of occurrence of the M-grams are considered to be vectors (i.e. considering the second and third columns in the above table as vectors), then if there is a high similarity between the input query and the current annotation, then the angle between these vectors should be small. This is illustrated in FIG. 24 for two-dimensional vectors a and a, with the angle between the vectors given as θ. In the above illustration, the vectors a and q will be four-dimensional vectors (one for each of the four different M-grams) and the similarity score can be calculated from:

$$\text{score} = \cos\theta = \frac{a \cdot q}{|a||q|} \quad (13)$$

This score is then associated with the current annotation and stored until the end of the search. Once the input query has been compared with all the annotations in a similar manner, the control unit considers the scores and identifies whether or not there is a match by, for example, comparing the calculated scores with a predetermined threshold value.

Alternatively, instead of using a cosine measure for the similarity score, a multinomial similarity score may be determined using the frequencies of occurrence of the identified M-grams in the input query and in the current annotation. The basic premise behind this technique is that the M-grams form a closed set of features and the database of annotations and the query of unknown class provide a classification based scenario in which to work. In this embodiment there are 43 different phonemes and each M-gram has three phonemes. This results in a set size of nearly 80,000 ($43^3$). However, as will be shown below, in practice it is only necessary to consider the M-grams which are in the current query.

Considering the frequencies of occurrence of the M-grams in the query and in the current annotation to be vectors (i.e. considering the second and third columns in the above table as vectors), then this technique assumes that these two vectors were generated by the same multinomial model (θ). Additionally, by considering that the frequency of occurrence of each of the M-grams is independent from the other frequencies, then the probability of generating one of the vectors given the model (θ) is:

$$P(\bar{x}|\theta) = \theta_1^{x_1} \cdot \theta_2^{x_2} \cdot \theta_3^{x_3} \cdot \theta_4^{x_4} \ldots \theta_m^{x_m} \quad (14)$$

where $\bar{x}$ is the vector of frequencies of occurrence, $x_1$ is the frequency of occurrence of the $i^{th}$ M-gram, $\theta_1, \theta_2 \ldots \theta_m$ are the model parameters and m is the number of unique M-grams in the system (i.e. $43^3$). Labelling the vector of frequencies of occurrence of the M-grams in the query as vector $\bar{Q}$ and the vector of the frequencies of occurrence of the M-grams in the current annotation as vector $\bar{A}$, then from traditional classification theory, a score for the similarity between the two vectors is given from:

$$P(\bar{Q}|\bar{A}) = \frac{\int d\theta P(\bar{Q}|\theta) P(\bar{A}|\theta) P(\theta)}{\int d\theta P(\bar{A}|\theta) P(\theta)} \quad (15)$$

Assuming that the prior probability of the model, P(θ), is a Dirichlet distribution with parameter a, then this expands to:

$$P(\bar{Q}|\bar{A}) = \frac{\int d\theta \theta_1^{Q_1+A_1+\alpha-1} \cdot \theta_2^{Q_2+A_2+\alpha-1} \ldots \theta_m^{Q_m+A_m+\alpha-1}}{\int d\theta \theta_1^{A_1+\alpha-1} \cdot \theta_2^{A_2+\alpha-1} \ldots \theta_m^{A_m+\alpha-1}} \quad (16)$$

This can be solved as a series of Beta integrals and gamma functions to give:

$$P(\bar{Q}|\bar{A}) = \prod_{i:Q_i \neq 0} \prod_{j=0}^{Q_i-1} \left[ \frac{A_i + j + \alpha}{D + j_s + m\alpha} \right] \quad (17)$$

where $A_i$ is the frequency of occurrence of the $i^{th}$ M-gram in the annotation, j is a loop counter used to ensure that the term in brackets is calculated for each of the occurrences of the $i^{th}$ M-gram in the query, D is the total length of the annotation measured in features (i.e. $D = \Sigma_{i=1}^{n} A_i$) and $j_s$ is an index which is incremented at each calculation of the term in square brackets. In this embodiment, m is $43^3$ and a is taken to be 0.1, following the argument given in the paper by Philip Garner entitled "On Topic Spotting and Dialogue Move Recognition", Computer Speech and Language, 11:275–306, 1997, the contents of which are incorporated herein by reference. Typically α will be between zero and one, but in some circumstances where there is a large amount of prior knowledge, a may be greater than one. As those skilled in the art will appreciate, the term in brackets in equation (17) above is a measure of the probability of the $i^{th}$ M-gram occurring in the annotation. The α and mα terms in this equation are provided in order to ensure that the probability term does not go below a predetermined level when D is small. Therefore, in this embodiment, the similarity measure which is calculated for the similarity between the input query and each annotation is simply the product of the probabilities of the M-grams occurring in the annotation.

To illustrate the calculations performed, the above equation will be evaluated for the frequencies of occurrence given in the table above. Therefore, in this illustration $\overline{Q}$ is the vector [1,1,2,1] and A is the vector [0,2,2,1]. Therefore, the similarity score (P($\overline{Q}$|A)) for the current query and current annotation is:

$$P(\overline{Q}|\overline{A}) = \frac{0+0+0.1}{5+0+43^3 \times 0.1} \times \frac{1+0+0.1}{5+1+43^3 \times 0.1} \times \frac{3+0+0.1}{5+2+43^3 \times 0.1} \times \frac{3+1+0.1}{5+3+43^3 \times 0.1} \times \frac{1+0+0.1}{5+4+43^3 \times 0.1}$$

(18)

This score is then associated with the current annotation and stored until the end of the search. Once the input query has been compared with all the annotations in a similar manner, the control unit considers the scores and identifies the annotation which most likely matches the query as the one having the largest score.

In the above embodiment, equal-sized M-grams were extracted from the sequence of query phonemes. As those skilled in the art will appreciate, different sizes of M-grams may be extracted from the same query. However, such an embodiment is not preferred, because of the added complexity involved.

In the above embodiment, a particular dynamic programming alignment and scoring algorithm was used to align the M-grams extracted from the query with corresponding portions of the annotation. As those skilled in the art will appreciate, techniques other than dynamic programming can be used to align the M-grams with the annotation and other measures of the similarity between each M-gram and each portion of the annotation can be used. For example, the features in the M-gram may be aligned with the corresponding portion of the annotation on a one-to-one basis and the probability of confusing the aligned annotation phoneme with the corresponding M-gram phoneme may be calculated using the confusion statistics, without summing over all unknown phonemes (i.e. without using equation (4) above).

In the above embodiment, each M-gram was stepped or scanned across each annotation from beginning to end. As those skilled in the art will appreciate, it is not important how or in what order each M-gram is compared with the portions in the annotation. What is important is to identify, in a consistent manner, the number of times each M-gram occurs in the query and in each of the annotations. Further, as those skilled in the art will appreciate, it is not essential to use a dynamic programming technique in order to identify the frequencies of occurrence of the M-grams in the query and the annotation. For example, a Boolean matching operation could be performed which finds exact matches between the M-grams and the corresponding portions of the annotation. However, this is not preferred, since it does not account for mis-recognitions either in the annotation or in the query, unless the same mis-recognition occurs in both.

In the above embodiment, the system identified a number of different M-grams in the input query and then determined the frequency of occurrence of those M-grams in the annotation. As those skilled in the art will appreciate, when each of the annotations is loaded into the database, the system may scan the annotations to identify the frequency of occurrence of each possible M-gram and store this vector of numbers which can then be used in a subsequent retrieval operations.

In the above embodiment, the similarity between the query and each annotation was determined by taking a product of probability measures as defined in equation 16. As those skilled in the art will appreciate, probability measures other than the one defined in square brackets in equation 16 may be used. For example, the system may calculate $A_i/D$ as the probability measure and adjust this using some predetermined constant if this probability is unreliable because the current annotation is short and therefore does not comprise many M-grams.

In the above embodiments, the features of the annotation and the query which have been aligned and matched have represented units of speech. As those skilled in the art will appreciate, the above-described technique can be used in other applications where the features of the query and the annotation may be confusable due to the inaccuracies of a recognition system which generated the sequences of features. For example, the above technique could be used in optical character or handwriting recognition systems where there is a likelihood that a recognition system might mistake one input character for another.

A number of embodiments and modifications have been described above. As those skilled in the art will appreciate, there are many other embodiments and modifications which will be apparent to those skilled in the art.

What is claimed is:

1. A comparison apparatus comprising:
   a receiver operable to receive first and second sequences of labels;
   an identifier operable to identify a plurality of different first sub-sequences of labels within said first sequence of labels;
   a first determiner operable to determine and to output the number of times each of said different first sub-sequences occurs within said first sequence of labels;
   a definer operable to define a plurality of second sub-sequences of labels from said second sequence of labels;
   a second determiner operable to determine and to output the number of times each of said different first sub-sequences occurs within said second sequence of labels by comparing each first sub-sequence of labels with each second sub-sequence of labels; and
   a similarity measure calculator operable to calculate a measure of the similarity between the first and second sequences of labels by comparing the numbers output from said first determiner with the numbers output from said second determiner;
   wherein said second determiner comprises:
   a comparator operable to compare a current first sub-sequence of labels with each second sub-sequence of labels using predetermined data including confusion information which defines confusability between different labels, to provide a set of sub-sequence similarity measures; and a counter operable to count the number of times the current first sub-sequence of labels occurs within the second sequence of labels in dependence upon the set of sub-sequence similarity measures provided by said comparator for the current first sub-sequence of labels.

2. An apparatus according to claim 1, wherein each of said first sub-sequences comprises the same number of labels.

3. An apparatus according to claim 1, wherein each of said second sub-sequences comprises the same number of labels.

4. An apparatus according to claim 1, wherein said second sub-sequences of labels comprise the same number of labels as said first sub-sequences of labels.

5. An apparatus according to claim 1, wherein said first determiner comprises a comparator operable to perform a Boolean match between each first sub-sequence of labels and the first sequence of labels and a counter operable to increment a count associated with the current first sub-sequence of labels each time the current first sub-sequence of labels matches a sub-sequence of labels from the first sequence of labels.

6. An apparatus according to claim 1, wherein said second determiner further comprises an aligner operable to align labels of the current first sub-sequence of labels with labels of a current second sub-sequence of labels to form a number of aligned pairs of labels; wherein said comparator is operable to compare the labels of each aligned pair of labels using said confusion information to generate a comparison score representative of the similarity between the aligned pair of labels; and wherein said comparator further comprises a comparison score combiner operable to combine the comparison scores for all the aligned pairs of labels for the current first and second sub-sequences to provide the sub-sequence similarity measure for the current first sub-sequence of labels and the current second sub-sequence of labels.

7. An apparatus according to claim 6, wherein said comparator comprises:
a first sub-comparator operable to compare, for each aligned pair, the first sub-sequence label in the aligned pair with each of a plurality of labels taken from a set of predetermined labels to provide a corresponding plurality of intermediate comparison scores representative of the similarity between said first sub-sequence label and the respective labels from the set;
a second sub-comparator operable to compare, for each aligned pair, the second sub-sequence label in the aligned pair with each of said plurality of labels from the set to provide a further corresponding plurality of intermediate comparison scores representative of the similarity between said second sub-sequence label and the respective labels from the set; and
a comparison score calculator operable to calculate said comparison score for the aligned pair by combining said pluralities of intermediate comparison scores.

8. An apparatus according to claim 7, wherein said first and second sub-comparators are operable to compare the first sub-sequence label and the second sub-sequence label of the aligned pair respectively with each of the labels in said set of predetermined labels.

9. An apparatus according to claim 7, wherein said comparator is operable to generate a comparison score for an aligned pair of labels which represents a probability of confusing the second sub-sequence label of the aligned pair as the first sub-sequence label of the aligned pair.

10. An apparatus according to claim 9, wherein said first and second sub-comparators are operable to provide intermediate comparison scores which are indicative of a probability of confusing the corresponding label taken from the set of predetermined labels as the label in the aligned pair.

11. An apparatus according to claim 10, wherein said comparison score calculator is operable (i) to multiply the intermediate scores obtained when comparing the first and second sub-sequence labels in the aligned pair with the same label from the set to provide a plurality of multiplied intermediate comparison scores; and (ii) to add the resulting multiplied intermediate scores, to calculate said comparison score for the aligned pair.

12. An apparatus according to claim 11, wherein each of said labels in said set of predetermined labels has a predetermined probability of occurring within a sequence of labels and wherein said comparison score calculator is operable to weigh each of said multiplied intermediate comparison scores with the respective probability of occurrence for the label from the set used to generate the multiplied intermediate comparison scores.

13. An apparatus according to claim 12, wherein said comparison score calculator is operable to calculate:

$$\sum_{r=1}^{n} P(q_j | p_r) P(a_i | p_r) P(p_r)$$

where $q_j$ and $a_i$ are the aligned pair of first and second sub-sequence labels respectively; $P(q_j|p_r)$ is the probability of confusing set label $p_r$ as first sub-sequence label $q_j$; $P(a_i|p_r)$ is the probability of confusing set label $p_r$ as second sub-sequence label $a_i$; and $P(p_r)$ represents the probability of set label $p_r$ occurring in a sequence of labels.

14. An apparatus according to claim 13, wherein the confusion probabilities for the first and second sequence labels are determined in advance and depend upon the recognition system that was used to generate the respective first and second sequences.

15. An apparatus according to claim 11, wherein said intermediate scores represent log probabilities and wherein said comparison score calculator is operable to perform said multiplication by adding the respective intermediate scores and is operable to perform said addition of said multiplied scores by performing a log addition calculation.

16. An apparatus according to claim 15, wherein said comparison score combiner is operable to add the comparison scores for all the aligned pairs to determine said sub-sequence similarity measure.

17. An apparatus according to claim 6, wherein said aligner is operable to identify label deletions and insertions in said first and second sequences of labels and wherein said comparator is operable to generate said comparison score for an aligned pair of labels in dependence upon label deletions and insertions identified by said aligner which occur in the vicinity of the labels in the aligned pair.

18. An apparatus according to claim 6, wherein said aligner comprises a dynamic programming unit operable to align said first and second sequences of labels using a dynamic programming technique.

19. An apparatus according to claim 18, wherein said dynamic programming unit is operable to determine progressively a plurality of possible alignments between said current first sub-sequence of labels and said current second sub-sequence of labels and wherein said comparator is operable to determine a comparison score for each of the possible aligned pairs of labels determined by said dynamic programming unit.

20. An apparatus according to claim 19, wherein said comparator is operable to generate said comparison score during the progressive determination of said possible alignments.

21. An apparatus according to claim 18, wherein said dynamic programming unit is operable to determine an optimum alignment between said current first sub-sequence of labels and said current second sub-sequence of labels and wherein said comparison score combiner is operable to provide said sub-sequence similarity measure by combining the comparison scores only for the optimum aligned pairs of labels.

22. An apparatus according to claim 19, wherein said comparison score combiner is operable to provide said sub-sequence similarity measure by combining all the comparison scores for all the possible aligned pairs of labels.

23. An apparatus according to claim 7, wherein each of the labels in said first and second sub-sequences of labels belongs to said set of predetermined labels and wherein said confusion information comprises, for each label in the set of labels, a probability for confusing that label with each of the other labels in the set of labels.

24. An apparatus according to claim 23, wherein said confusion probabilities are determined in advance and depend upon the system used to generate the first and second sub-sequences of labels.

25. An apparatus according to claim 23, wherein said predetermined data further includes, for each label in the set of labels, a probability of inserting the label in a sequence of labels.

26. An apparatus according to claim 23, wherein said predetermined data further includes, for each label in the set of labels, a probability of deleting the label from a sequence of labels.

27. An apparatus according to claim 6, wherein said second determiner further comprises a normalising unit operable to normalise each of said sub-sequence similarity measures.

28. An apparatus according to claim 27, wherein said normalising unit is operable to normalise each sub-sequence similarity measure by dividing each sub-sequence similarity measure by a respective normalisation score which varies in dependence upon the length of the corresponding first and second sub-sequences of labels.

29. An apparatus according to claim 27, wherein the respective normalisation scores vary in dependence upon the sequence of labels in the corresponding first and second sub-sequences of labels.

30. An apparatus according to claim 27, wherein a dynamic programming unit is operable to determine progressively a plurality of possible alignments between said current first sub-sequence of labels and said current second sub-sequence of labels and wherein said comparator is operable to determine a comparison score for each of the possible aligned pairs of labels determined by said dynamic programming unit and wherein said normalising unit is operable to calculate the respective normalisation scores during the progressive calculation of said possible alignments by said dynamic programming unit.

31. An apparatus according to claim 1, wherein said definer is operable to define said plurality of second sub-sequences as successive portions of the second sequence of labels.

32. An apparatus according to claim 31, wherein said successive portions are separated from each other by a single label.

33. An apparatus according to claim 1, wherein said similarity measure calculator calculates said measure of the similarity by treating the numbers output by said first determiner as a first vector and the numbers output from said second determiner as a second vector and by determining a cosine measure of the angle between the two vectors.

34. An apparatus according to claim 1, wherein said first and second sequences of labels represent time sequential signals.

35. An apparatus according to claim 1, wherein said first and second sequences of labels represent audio signals.

36. An apparatus according to claim 35, wherein said first and second sequences of labels represent speech.

37. An apparatus according to claim 36, wherein each of said labels represents a sub-word unit of speech.

38. An apparatus according to claim 37, wherein each of said labels represent a phoneme.

39. An apparatus according to claim 1, wherein said first sequence of labels comprises a plurality of sub-word units generated from a typed input and wherein said confusion information comprises mis-typing probabilities and/or mis-spelling probabilities.

40. An apparatus according to claim 1, wherein said second sequence of labels comprises a sequence of sub-word units generated from a spoken input and wherein said confusion information comprises mis-recognition probabilities.

41. An apparatus according to claim 1, wherein said receiver is operable to receive a plurality of second sequences of labels, wherein said second determiner is operable to determine and output the number of times each of said first sub-sequences of labels occurs within each of said second sequences of labels and wherein said similarity measure calculator is operable to compute a respective measure of the similarity between the first sequence of labels and said plurality of second sequences of labels.

42. An apparatus according to claim 41, further comprising a sequence determiner operable to compare said plurality of similarity measures output by said similarity measure calculator and for outputting a signal indicative of the second sequence of labels which is most similar to said first sequence of labels.

43. An apparatus for searching a database comprising a plurality of information entries to identify information to be retrieved therefrom, each of said plurality of information entries having an associated annotation comprising a sequence of labels, the apparatus comprising:

a receiver operable to receive an input query comprising a sequence of labels;

an apparatus according to claim 1 operable to compare the query sequence of labels with the labels of each annotation to provide a set of comparison results; and an identifier operable to identify said information to be retrieved from said database using said comparison results.

44. An apparatus for searching a database comprising a plurality of information entries to identify information to be retrieved therefrom, each of said plurality of information entries having an associated annotation comprising a sequence of speech labels, the apparatus comprising:

a receiver operable to receive an input query comprising a sequence of speech labels;

an apparatus according to claim 1 operable to compare said query sequence of speech labels with the speech labels of each annotation to provide a set of comparison results; and an identifier operable to identify said information to be retrieved from said database using said comparison results;

wherein said apparatus according to claim 1 has a plurality of different comparison modes of operation and in that the apparatus further comprises:

a determiner operable to determine (i) if the query sequence of speech labels was generated from an audio signal or from text; and (ii) if the sequence of speech labels of a current annotation was generated from an audio signal or from text, and to output a determination result; and a selector operable to select, for the current annotation, the mode of operation of said apparatus according to claim 1 in dependence upon said determination result.

45. An apparatus according to claim 1, wherein said counter is operable to:

threshold each intermediate similarity measures in the set of intermediate similarity measures with a predetermined threshold value to provide a threshold result; and increment said count associated with the current first sub-sequence of labels in dependence upon said threshold result.

46. A comparison apparatus comprising:

a receiver operable to receive first and second sequences of labels;

an identifier operable to identify a plurality of different first sub-sequences of labels within said first sequence of labels;

a first determiner operable to determine the number of times each of said different first sub-sequences occurs within said first sequence of labels;

a second determiner operable to determine the number of times each of said different first sub-sequences occurs within said second sequence of labels; and a similarity measure calculator operable to calculate a similarity score measure representative of the similarity between the first and second sequences of labels using the numbers obtained from said first and second determiners;

wherein the apparatus further comprises a third determiner operable to determine the total number of sub-sequences of labels in said second sequence; and in that said similarity score calculator comprises:

a first sub-calculator operable to calculate a measure of the probability of each of said first sub-sequences occurring in said second sequence of labels using the numbers obtained from said second determiner and the number obtained from said third determiner; and a second sub-calculator operable to calculate said similarity score by taking products of said computed probability measures in dependence upon said numbers obtained from said first determiner.

47. An apparatus according to claim 46, wherein the probability measure which is computed for each first sub-sequence occurring in said second sequence by said first sub-calculator is proportional to the number of times the first sub-sequence occurs within said second sequence obtained from said second determiner and is inversely proportional to the total number of sub-sequences of labels in the second sequence obtained from said third determiner.

48. An apparatus according to claim 46, wherein said similarity score calculator is operable to calculate the similarity measure by calculating:

$$\prod_{i:Q_i \neq 0} \prod_{j=0}^{Q_i-1} \left[ \frac{A_i + j + \alpha}{D + j_s + m\alpha} \right]$$

where the term in brackets is the probability measure calculated by said first sub-calculator for the $i^{th}$ sub-sequence; $A_i$ is the number of times the $i^{th}$ sub-sequence occurs in the second sequence of labels; j is a loop counter used to ensure that the probability measure in brackets is multiplied for each of the occurrences of the $i^{th}$ sub-sequence in the first sequence of labels; D is the total number of sub-sequences of labels in the second sequence of labels obtained by said third determiner; $j_s$ is an index which is incremented at each calculation of the probability measure in brackets; and $\alpha$ and $m\alpha$ are constants to ensure that the probability measure in square brackets does not go below a predetermined lower limit.

49. An apparatus according to claim 48, wherein $\alpha$ lies between zero and one.

50. An apparatus according to claim 46, wherein said first determiner comprises a comparator operable to perform a Boolean match between each first sub-sequence of labels and the first sequence of labels and a counter operable to increment a count associated with a current first sub-sequence of labels each time the current first sub-sequence of labels matches a sub-sequence of labels in the first sequence of labels.

51. An apparatus according to claim 46, wherein said second determiner comprises a comparator operable to perform a Boolean match between each first sub-sequence of labels and the second sequence of labels and a counter operable to increment a count associated with a current first sub-sequence of labels each time the current first sub-sequence of labels matches a sub-sequence of labels in the second sequence of labels.

52. An apparatus according to claim 46, further comprising a definer operable to define a plurality of second sub-sequences of labels from said second sequence of labels and wherein said second determiner is operable to determine said numbers by comparing each first sub-sequence of labels with each second sub-sequence of labels.

53. An apparatus according to claim 52, wherein said second determiner comprises;

a comparator operable to compare a current first sub-sequence of labels with each second sub-sequence of labels using predetermined data including confusion information which defines confusability between different labels to provide a set of sub-sequence similarity measures; and a counter operable to count the number of times the current sub-sequence of labels occurs within the second sequence of labels in dependence upon the set of sub-sequence similarity measures provided by said comparator for the current first sub-sequence of labels.

54. An apparatus according to claim 53, wherein said second determiner further comprises an aligner operable to align labels of the current first sub-sequence of labels with labels of a current second sub-sequence of labels to form a number of aligned pairs of labels; wherein said comparator is operable to compare the labels of each aligned pair of labels using said confusion information to generate a comparison score representative of the similarity between the aligned pair of labels; and wherein said comparator further comprises a comparison score combiner operable to combine the comparison scores for all the aligned pairs of labels to provide the sub-sequence similarity measure for the current first sub-sequence of labels and the current second sub-sequence of labels.

55. An apparatus according to claim 48, wherein each of the labels in said first and second sequences of labels belongs to a set of predetermined labels and wherein m is the number of possible sub-sequences of labels which can be formed from the set of predetermined labels.

56. An apparatus according to claim 46, wherein said receiver is operable to receive a plurality of second sequences of labels, wherein said second determiner is operable to determine the number of times each of said first sub-sequences of labels occurs within each of said second sequences of labels and wherein said similarity score calculator is operable to calculate a respective measure of the similarity between the first sequence of labels and said plurality of second sequences of labels.

57. An apparatus according to claim 56, further comprising a sequence determiner operable to compare said plurality of similarity measures output by said similarity score calculator and for outputting a signal indicative of the second sequence of labels which is most similar to said first sequence of labels.

58. A comparison method comprising the steps of:
receiving first and second sequences of labels;
identifying a plurality of different first sub-sequences of labels within said first sequence of labels;
a first determining step of determining and outputting the number of times each of said different first sub-sequences occurs within said first sequence of labels;
defining a plurality of second sub-sequences of labels from said second sequence of labels;
a second determining step of determining and outputting the number of times each of said different first sub-sequences occurs within said second sequence of labels by comparing each first sub-sequence of labels with each second sub-sequence of labels; and
computing a measure of the similarity between the first and second sequences of labels by comparing the numbers output from said first determining step with the numbers output from said second determining step;
wherein said second determining step comprises the steps of:
comparing a current first sub-sequence of labels with each second sub-sequence of labels using predetermined data including confusion information which defines confusability between different labels, to provide a set of sub-sequence similarity measures; and
counting the number of times the current first sub-sequence of labels occurs within the second sequence of labels in dependence upon the set of sub-sequence similarity measures provided by the comparing step for the current first sub-sequence of labels.

59. A method according to claim 58, wherein each of said first sub-sequences comprises the same number of labels.

60. A method according to claim 58, wherein each of said second sub-sequences comprises the same number of labels.

61. A method according to claim 58, wherein said second sub-sequences of labels comprise the same number of labels as said first sub-sequences of labels.

62. A method according to claim 58, wherein said first determining step comprises the step of performing a Boolean match between a current first sub-sequence of labels and the first sequence of labels and the step of incrementing a count associated with the current first sub-sequence of labels each time the current first sub-sequence of labels matches a sub-sequence of labels from the first sequence of labels.

63. A method according to claim 58, wherein said second determining step further comprises the step of aligning labels of the current first sub-sequence of labels with labels of a current second sub-sequence of labels to form a number of aligned pairs of labels; wherein said comparing step compares the labels of each aligned pair of labels using said similarity information to generate a comparison score representative of the similarity between the aligned pair of labels; and wherein said comparing step further comprises the step of combining the comparison scores for all the aligned pairs of labels for the current first and second sub-sequences to provide the sub-sequence similarity measure for the current first sub-sequence of labels and the current second sub-sequence of labels.

64. A method according to claim 63, wherein said comparing step comprises:
a first comparing step of comparing, for each aligned pair, the first sub-sequence label in the aligned pair with each of a plurality of labels taken from a set of predetermined labels to provide a corresponding plurality of intermediate comparison scores representative of the similarity between said first sub-sequence label and the respective labels from the set;
a second comparing step of comparing, for each aligned pair, the second sub-sequence label in the aligned pair with each of said plurality of labels from the set to provide a further corresponding plurality of intermediate comparison scores representative of the similarity between said second sub-sequence label and the respective labels from the set; and
a step of calculating said comparison score for the aligned pair by combining said pluralities of intermediate comparison scores.

65. A method according to claim 64, wherein said first and second comparing steps compare the first sub-sequence label and the second sub-sequence label of the aligned pair respectively with each of the labels in said set of predetermined labels.

66. A method according to claim 64, wherein said comparing step generates a comparison score for an aligned pair of labels which represents a probability of confusing the second sub-sequence label of the aligned pair as the first sub-sequence label of the aligned pair.

67. A method according to claim 66, wherein said first and second comparing steps provide intermediate comparison scores which are indicative of a probability of confusing the corresponding label taken from the set of predetermined labels as the label in the aligned pair.

68. A method according to claim 67, wherein said calculating step comprises the steps of (i) multiplying the intermediate scores obtained when comparing the first and second sub-sequence labels in the aligned pair with the same label from the set to provide a plurality of multiplied intermediate comparison scores; and (ii) adding the resulting multiplied intermediate scores, to calculate said comparison score for the aligned pair.

69. A method according to claim 68, wherein each of said labels in said set of predetermined labels has a predetermined probability of occurring within a sequence of labels and wherein said calculating step weighs each of said multiplied intermediate comparison scores with the respective probability of occurrence for the label from the set used to generate the multiplied intermediate comparison scores.

70. A method according to claim 69, wherein said calculating step calculates:

$$\sum_{r=1}^{n} P(q_j \mid p_r) P(a_i \mid p_r) P(p_r)$$

where $q_j$ and $a_i$ are the aligned pair of first and second sub-sequence labels respectively; $P(q_j|p_r)$ is the probability of confusing set label $p_r$ as first sub-sequence label $q_j$; $P(a_i|p_r)$ is the probability of confusing set label $p_r$ as second sub-sequence label $a_i$; and $P(p_r)$ represents the probability of set label $p_r$ occurring in a sequence of labels.

71. A method according to claims 70, wherein the confusion probabilities for the first and second sequence labels are determined in advance and depend upon the recognition system that was used to generate the respective first and second sequences.

72. A method according to claim 68, wherein said intermediate scores represent log probabilities and wherein said calculating step performs said multiplication by adding the respective intermediate scores and performs said addition of said multiplied scores by performing a log addition calculation.

73. A method according to claim 72, wherein said combining step adds the comparison scores for all the aligned pairs to determine said similarity measure.

74. A method according to claim 63, wherein said aligning step identifies label deletions and insertions in said first and second sequences of labels and wherein said comparing step is operable to generate said comparison score for an aligned pair of labels in dependence upon labels deletions and insertions identified by said aligning step which occur in the vicinity of the labels in the aligned pair.

75. A method according to claim 63, wherein said aligning step uses a dynamic programming alignment algorithm to align said first and second sequences of labels.

76. A method according to claim 75, wherein said dynamic programming algorithm progressively determines a plurality of possible alignments between said current first sub-sequence of labels and said current second sub-sequence of labels and wherein said comparing step determines a comparison score for each of the possible aligned pairs of labels determined by said dynamic programming algorithm.

77. A method according to claim 76, wherein said comparing step generates said comparison score during the progressive determination of said possible alignments.

78. A method according to claim 75, wherein said dynamic programming algorithm determines an optimum alignment between said current first sub-sequence of labels and said current second sub-sequence of labels and wherein said combining step provides said sub-sequence similarity measure by combining the comparison scores only for the optimum aligned pairs of labels.

79. A method according to claim 76, wherein said combining step provides said sub-sequence similarity measure by combining all the comparison scores for all the possible aligned pairs of labels.

80. A method according to claim 58, wherein each of the labels in said first and second sub-sequences of labels belongs to said set of predetermined labels and wherein said confusion information comprises, for each label in the set of labels, a probability for confusing that label with each of the other labels in the set of labels.

81. A method according to claim 80, wherein said confusion probabilities are determined in advance and depend upon the system used to generate the first and second sub-sequences of labels.

82. A method according to claim 80, wherein said predetermined data further includes, for each label in the set of labels, a probability of inserting the label in a sequence of labels.

83. A method according to claim 80, wherein said predetermined data further includes, for each label in the set of labels, a probability of deleting the label from a sequence of labels.

84. A method according to claim 63, wherein said second determining step further comprises the step of normalising each of said sub-sequence similarity measures.

85. A method according to claim 84, wherein said normalising step normalises each sub-sequence similarity measure by dividing each similarity measure by a respective normalisation score which varies in dependence upon the length of the corresponding first and second sub-sequences of labels.

86. A method according to claim 84, wherein the respective normalisation scores vary in dependence upon the sequence of labels in the corresponding first and second sub-sequences of labels.

87. A method according to claim 84, wherein said aligning step uses a dynamic programming alignment algorithm to align said first and second sequences of labels and wherein said normalising step calculates the respective normalisation scores during the progressive calculation of said possible alignments by said dynamic programming algorithm.

88. A method according to claim 58, wherein said defining step defines said plurality of second sub-sequences as successive portions of the second sequence of labels.

89. A method according to claim 88, wherein successive portions are separated from each other by a single label.

90. A method according to claim 58, wherein said computing step computes said measure of the similarity between the first and second sequences of labels by treating the numbers output by the first determining step as a first vector and by treating the numbers output by said second determining step as a second vector and by determining a cosine measure of the angle between the two vectors.

91. A method according to claim 58, wherein said first and second sequences of labels represent time sequential signals.

92. A method according to claim 58, wherein said first and second sequences of labels represent audio signals.

93. A method according to claim 92, wherein said first and second sequences of labels represent speech.

94. A method according to claim 93, wherein each of said labels represents a sub-word unit of speech.

95. A method according to claim 94, wherein each of said labels represents a phoneme.

96. A method according to claim 58, wherein said first sequence of labels comprises a plurality of sub-word units generated from a typed input and wherein said similarity information comprises mis-typing probabilities and/or mis-spelling probabilities.

97. A method according to claim 58, wherein said second sequence of labels comprises a sequence of sub-word units generated from a spoken input and wherein said similarity information comprises mis-recognition probabilities.

98. A method according to claim 58, wherein said receiving step receives a plurality of second sequences of labels, wherein said second determining step determines and outputs the number of times each of said first sub-sequences of labels occurs within each of said second sequences of labels and wherein said computing step computes a respective measure of the similarity between the first sequence of labels and said plurality of second sequences of labels.

99. A method according to claim 98, further comprising the step of comparing said plurality of similarity measures output by said computing step and the step of outputting a signal indicative of the second sequence of labels which is most similar to said first sequence of labels.

100. A method of searching a database comprising a plurality of information entries to identify information to be retrieved therefrom, each of said plurality of information entries having an associated annotation comprising a sequence of labels, the method comprising the steps of:

receiving an input query comprising a sequence of labels;

a method according to claim 58 for comparing the query sequence of labels with the labels of each annotation to provide a set of comparison results; and identifying said information to be retrieved from said database using said comparison results.

101. A method according to claim 100, wherein one or more of said information entries is the associated annotation.

102. A method of searching a database comprising a plurality of information entries to identify information to be retrieved therefrom, each of said plurality of information entries having an associated annotation comprising a sequence of speech labels, the method comprising the steps of:
    receiving an input query comprising a sequence of speech labels;
    a method according to claim 58 for comparing said query sequence of speech labels with the speech labels of each annotation to provide a set of comparison results; and
    identifying said information to be retrieved from said database using said comparison results;
    wherein said method according to claim 57 has a plurality of different comparison modes of operation and in that the method further comprises the steps of:
    determining if the query sequence of speech labels was generated from an audio signal or from text and if the sequence of speech labels of a current annotation was generated from an audio signal or from text and outputting a determination result; and
    selecting, for the current annotation, the mode of operation of said method according to claim 58 in dependence upon said determination result.

103. A method according to claim 58, wherein the steps of the claimed method are performed in the order given in the claims.

104. A method according to claim 58, wherein said counting step comprises:
    thresholding each intermediate similarity measure in the set of intermediate similarity measures with a predetermined threshold value to provide a threshold result; and
    incrementing a count associated with the current first sub-sequence of labels in dependence upon said threshold result.

105. A comparison method comprising the steps of:
    receiving first and second sequences of labels;
    identifying a plurality of different first sub-sequences of labels within said first sequence of labels;
    a first obtaining step of obtaining the number of times each of said different first sub-sequences occurs within said first sequence of labels;
    a second obtaining step of obtaining the number of times each of said different first sub-sequences occurs within said second sequence of labels; and
    computing a similarity score representative of the similarity between the first and second sequences of labels using the numbers obtained from said first and second obtaining steps;
    wherein the method further comprises a third obtaining step of obtaining the total number of sub-sequences of labels in said second sequence; and in that
    said computing step comprises:
    a first computing step of computing a measure of the probability of each of said first sub-sequences occurring in said second sequence of labels using the numbers obtained from said second obtaining step and the number obtained from said third obtaining step; and
    a second computing step of computing said similarity score by taking products of said computed probability measures in dependence upon said numbers obtained from said first obtaining step.

106. A method according to claim 105, wherein the probability measure which is computed for each first sub-sequence occurring in said second sequence in said first computing step is proportional to the number of times the first sub-sequence occurs within said second sequence obtained in said second obtaining step and is inversely proportional to the total number of sub-sequences of labels in the second sequence obtained in said third obtaining step.

107. A method according to claim 105, wherein said computing step computes the similarity measure by calculating:

$$\prod_{i:Q_i \neq 0} \prod_{j=0}^{Q_i-1} \left[ \frac{A_i + j + \alpha}{D + j_s + m\alpha} \right]$$

where the term in brackets is the probability measure calculated in said first computing step for the $i^{th}$ sub-sequence; $A_i$ is the number of times the $i^{th}$ sub-sequence occurs in the second sequence of labels; j is a loop counter used to ensure that the probability measure in brackets is multiplied for each of the occurrences of the $i^{th}$ sub-sequence in the first sequence of labels; D is the total number of sub-sequences of labels in the second sequence of labels obtained in said third obtaining step; $j_s$ is an index which is incremented at each calculation of the probability measure in brackets; and $\alpha$ and $m\alpha$ are constants to ensure that the probability measure in square brackets does not go below a predetermined lower limit.

108. A method according to claim 107, wherein $\alpha$ lies between zero and one.

109. A method according to claim 105, wherein said first obtaining step comprises the step of performing a Boolean match between each first sub-sequence of labels and the first sequence of labels and the step of incrementing a count associated with a current first sub-sequence of labels each time the current first sub-sequence of labels matches a sub-sequence of labels in the first sequence of labels.

110. A method according to claim 105, wherein said second obtaining step comprises the step of performing a Boolean match between each first sub-sequence of labels and the second sequence of labels and the step of incrementing a count associated with a current first sub-sequence of labels each time the current first sub-sequence of labels matches a sub-sequence of labels in the second sequence of labels.

111. A method according to claim 105, further comprising the step of defining a plurality of second sub-sequences of labels from said second sequence of labels and wherein said second obtaining step obtains said numbers by comparing each first sub-sequence of labels with each second sub-sequence of labels.

112. A method according to claim 111, wherein said second obtaining step comprises the steps of;
    comparing a current first sub-sequence of labels with each second sub-sequence of labels using predetermined data including confusion information which defines confusability between different labels to provide a set of sub-sequence similarity measures;
    thresholding each intermediate similarity measure of the set with a predetermined threshold value and outputting a threshold result; and determining the number of times the current sub-sequence of labels occurs within the second sequence of labels in dependence upon the threshold results output for the corresponding set of sub-sequence similarity measures.

113. A method according to claim 112, wherein said second obtaining step further comprises the step of aligning labels of the current first sub-sequence of labels with labels of a current second sub-sequence of labels to form a number of aligned pairs of labels; wherein said comparing step compares the labels of each aligned pair of labels using said similarity information to generate a comparison score representative of the similarity between the aligned pair of labels; and wherein said comparing step further comprises the step of combining the comparison scores for all the aligned pairs of labels to provide the sub-sequence similarity measure for the current first sub-sequence of labels and the current second sub-sequence of labels.

114. A method according to claim 107, wherein each of the labels in said first and second sequences of labels belongs to a set of predetermined labels and wherein m is the number of possible sub-sequences of labels which can be formed from the set of predetermined labels.

115. A method according to claim 105, wherein said receiving step receives a plurality of second sequences of labels, wherein said second obtaining step obtains and outputs the number of times each of said first sub-sequences of labels occurs within each of said second sequences of labels and wherein said computing step computes a respective measure of the similarity between the first sequence of labels and said plurality of second sequences of labels.

116. A method according to claim 115, further comprising the step of comparing said plurality of similarity measures output by said computing step and outputting a signal indicative of the second sequence of labels which is most similar to said first sequence of labels.

117. A computer readable medium storing processor implementable process steps for the carrying out a comparison method, the process steps comprising:

a step of receiving first and second sequences of labels;

a step of identifying a plurality of different first sub-sequences of labels within said first sequence of labels;

a first determining step of determining and outputting the number of times each of said different first sub-sequences occurs within said first sequence of labels;

a step of defining a plurality of second sub-sequences of labels from said second sequence of labels;

a second determining step of determining and outputting the number of times each of said different first sub-sequences occurs within said second sequence of labels by comparing each first sub-sequence of labels with each second sub-sequence of labels; and a step of computing a measure of the similarity between the first and second sequences of labels by comparing the numbers output from said first determining step with the numbers output from said second determining step;

wherein said second determining step comprises:

a step of comparing a current first sub-sequence of labels with each second sub-sequence of labels using predetermined data including confusion information which defines confusability between different labels, to provide a set of sub-sequence similarity measures; and a step of counting the number of times the current first sub-sequence of labels occurs within the second sequence of labels in dependence upon the set of sub-sequence similarity measures provided by the comparing step for the current first sub-sequence of labels.

118. A computer readable medium storing processor implementable process steps for carrying out a comparison method, the process steps comprising:

a step of receiving first and second sequences of labels;

a step of identifying a plurality of different first sub-sequences of labels within said first sequence of labels;

a first obtaining step of obtaining the number of times each of said different first sub-sequences occurs within said first sequence of labels;

a second obtaining step of obtaining the number of times each of said different first sub-sequences occurs within said second sequence of labels; and a step of computing a similarity score representative of the similarity between the first and second sequences of labels using the numbers obtained from said first and second obtaining steps;

wherein the process steps further comprise a third obtaining step of obtaining the total number of sub-sequences of labels in said second sequence; and in that said computing step comprises:

a first computing step of computing a measure of the probability of each of said first sub-sequences occurring in said second sequence of labels using the numbers obtained from said second obtaining step and the number obtained from said third obtaining step; and a second computing step of computing said similarity score by taking products of said computed probability measures in dependence upon said numbers obtained from said first obtaining step.

119. A computer readable medium storing processor implementable instructions for carrying out a method of searching a database comprising a plurality of information entries to identify information to be retrieved therefrom, each of said plurality of information entries having an associated annotation comprising a sequence of labels, the process steps comprising:

a step of receiving an input query comprising a sequence of labels;

the process steps stored on the computer readable medium according to claim 117 or 118 for comparing the query sequence of labels with the labels of each annotation to provide a set of comparison results; and a step of identifying said information to be retrieved from said database using said comparison results.

120. Processor implementable instructions for carrying out a comparison method, the process steps comprising:

a step of receiving first and second sequences labels;

a step of identifying a plurality of different first sub-sequences of labels within said first sequence labels;

a first determining step of determining and outputting the number of times each of said different first sub-sequences occurs within said first sequence of labels;

a step of defining a plurality of second sub-sequences of labels from said second sequence of labels;

a second determining step of determining and outputting the number of times each of said different first sub-sequences occurs within said second sequence of labels by comparing each first sub-sequence of labels with each second sub-sequence of labels; and a step of computing a measure of the similarity between the first and second sequences of labels by comparing the numbers output from said first determining step with the numbers output from said second determining step;

wherein said second determining step comprises:
a step of comparing a current first sub-sequence of labels with each second sub-sequence of labels using predetermined data including confusion information which defines confusability between different labels, to provide a set of sub-sequence similarity measures; and
counting the number of times the current first sub-sequence of labels occurs within the second sequence of labels in dependence upon the set of sub-sequence similarity measures provided by the comparing step for the current first sub-sequence of labels.

121. Processor implementable instructions for carrying out a comparison method, comprising:
a step of receiving first and second sequences of labels;
a step of identifying a plurality of different first sub-sequences of labels within said first sequence of labels;
a first obtaining step of obtaining the number of times each of said different first sub-sequences occurs within said first sequence of labels;
a second obtaining step of obtaining the number of times each of said different first sub-sequences occurs within said second sequence of labels; and
a step of computing a similarity score representative of the similarity between the first and second sequences of labels using the numbers obtained from said first and second obtaining steps;
wherein the process steps further comprise a third obtaining step of obtaining the total number of sub-sequences of labels in said second sequence; and in that
said computing step comprises:
a first computing step of computing a measure of the probability of each of said first sub-sequences occurring in said second sequence of labels using the numbers obtained from said second obtaining step and the number obtained from said third obtaining step; and
a second computing step of computing said similarity score by taking products of said computed probability measures in dependence upon said numbers obtained from said first obtaining step.

122. Processor implementable instructions for carrying out a method of searching a database comprising a plurality of information entries to identify information to be retrieved therefrom, each of said plurality of information entries having an associated annotation comprising a sequence of labels, the process steps comprising:
a step of receiving an input query comprising a sequence of labels;
the process steps according to claim 120 or 121 for comparing the query sequence of labels with the labels of each annotation to provide a set of comparison results; and
a step of identifying said information to be retrieved from said database using said comparison results.

123. A comparison apparatus comprising:
means for receiving first and second sequences of labels;
means for identifying a plurality of different first sub-sequences of labels within said first sequence of labels;
first determining means for determining and outputting the number of times each of said different first sub-sequences occurs within said first sequence of labels;
means for defining a plurality of second sub-sequences of labels from said second sequence of labels;
second determining means for determining and outputting the number of times each of said different first sub-sequences occurs within said second sequence of labels by comparing each first sub-sequence of labels with each second sub-sequence of labels; and
means for computing a measure of the similarity between the first and second sequences of labels by comparing the numbers output from said first determining means with the numbers output from said second determining means;
wherein said second determining means comprises:
means for comparing a current first sub-sequence of labels with each second sub-sequence of labels using predetermined data including confusion information which defines confusability between different labels, to provide a set of intermediate similarity measures; and
means for counting the number of times the current first sub-sequence of labels occurs within the second sequence of labels in dependence upon the set of intermediate similarity measures provided by said comparing means for the current first sub-sequence of labels.

124. An apparatus for searching a database comprising a plurality of information entries to identify information to be retrieved therefrom, each of said plurality of information entries having an associated annotation comprising a sequence of labels, the apparatus comprising:
means for receiving an input query comprising a sequence of labels;
an apparatus according to claim 123 for comparing the query sequence of labels with the labels of each annotation to provide a set of comparison results; and
means for identifying said information to be retrieved from said database using said comparison results.

125. An apparatus for searching a database comprising a plurality of information entries to identify information to be retrieved therefrom, each of said plurality of information entries having an associated annotation comprising a sequence of speech labels, the apparatus comprising:
means for receiving an input query comprising a sequence of speech labels;
an apparatus according to claim 123 for comparing said query sequence of speech labels with the speech labels of each annotation to provide a set of comparison results; and
means for identifying said information to be retrieved from said database using said comparison results;
wherein said apparatus according to claim 123 has a plurality of different comparison modes of operation and in that the apparatus further comprises:
means for determining (i) if the query sequence of speech labels was generated from an audio signal or from text; and (ii) if the sequence of speech labels of a current annotation was generated from an audio signal or from text, and for outputting a determination result; and
means for selecting, for the current annotation, the mode of operation of said apparatus according to claim 123 in dependence upon said determination result.

126. A comparison apparatus comprising:
means for receiving first and second sequences of labels;
means for identifying a plurality of different first sub-sequences of labels within said first sequence of labels;
first obtaining means for obtaining the number of times each of said different first sub-sequences occurs within said first sequence of labels;
second obtaining means for obtaining the number of times each of said different first sub-sequences occurs within said second sequence of labels; and means for computing a similarity score representative of the similarity between the first and second sequences of labels using the numbers obtained from said first and second obtaining means;

wherein the apparatus further comprises third obtaining means for obtaining the total number of sub-sequences of labels in said second sequence; and in that said computing means comprises:

first computing means for computing a measure of the probability of each of said first sub-sequences occurring in said second sequence of labels using the numbers obtained from said second obtaining means and the number obtained from said third obtaining means; and second computing means for computing said similarity score by taking products of said computed probability measures in dependence upon said numbers obtained from said first obtaining means.

127. A comparison apparatus comprising:

a receiver operable to receive first and second sequences of labels;

an identifier operable to identify a plurality of first sub-sequences of labels within said first sequence of labels;

a first determiner operable to determine and to output the number of times each of said first sub-sequences occurs within said first sequence of labels;

a definer operable to define a plurality of second sub-sequences of labels from said second sequence of labels;

a second determiner operable to determine and to output the number of times each of said first sub-sequences occurs within said second sequence of labels by comparing each first sub-sequence of labels with each second sub-sequence of labels; and a similarity measure calculator operable to calculate a measure of the similarity between the first and second sequences of labels by comparing the numbers output from said first determiner with the numbers output from said second determiner.

128. A comparison method comprising:

receiving first and second sequences of labels;

identifying a plurality of first sub-sequences of labels within said first sequence of labels;

a first determining step of determining and outputting the number of times each of said first sub-sequences occurs within said first sequence of labels;

defining a plurality of second sub-sequences of labels from said second sequence of labels;

a second determining step of determining and outputting the number of times each of said first sub-sequences occurs within said second sequence of labels by comparing each first sub-sequence of labels with each second-sequence of labels; and computing a measure of the similarity between the first and second sequences of labels by comparing the numbers output from said first determining step with the numbers output from said second determining step.

129. A computer readable medium storing processor implementable process steps for carrying out a comparison method, the process steps comprising:

a step of receiving first and second sequences of labels;

a step of identifying a plurality of first sub-sequences of labels within said first sequence of labels;

a first determining step of determining and outputting the number of times each of said first sub-sequences occurs within said first sequence of labels;

a step of defining a plurality of second sub-sequences of labels from said second sequence of labels;

a second determining step of determining and outputting the number of times each of said first sub-sequences occurs within said second sequence of labels by comparing each first sub-sequence of labels with each second sub-sequence of labels; and a step of computing a measure of the similarity between the first and second sequences of labels by comparing the numbers output from said first determining step with the numbers output from said second determining step.

130. Processor implementable instructions for carrying out a comparison method, the instructions comprising:

instructions for receiving first and second sequences of labels;

instructions for identifying a plurality of first sub-sequences of labels within said first sequence of labels;

instructions for a first determining step of determining and outputting the number of times each of said first sub-sequences occurs within said first sequence of labels;

instructions for defining a plurality of second sub-sequences of labels from said second sequence of labels;

instructions for a second determining step of determining and outputting the number of times each of said first sub-sequences occurs within said second sequence of labels by comparing each first sub-sequence of labels with each second sub-sequence of labels; and instructions for computing a measure of the similarity between the first and second sequences of labels by comparing the numbers output from said first determining step with the numbers output from said second determining step.

* * * * *

UNITED STATES PATENT AND TRADEMARK OFFICE
CERTIFICATE OF CORRECTION

PATENT NO. : 6,882,970 B1
DATED : April 19, 2005
INVENTOR(S) : Philip Neil Garner et al.

It is certified that error appears in the above-identified patent and that said Letters Patent is hereby corrected as shown below:

Title page,
Item [56], References Cited, OTHER PUBLICATIONS, "J. Skilling" reference, "Maximun" should read -- Maximum --; and "Scheil, et al." reference, "Grandada," should read -- Granada, --.

Column 3,
Line 8, "according to any of claims 1 to 44" should be deleted.

Column 10,
Line 37, "phoneme ai" should read -- phoneme $a_i$ --.

Column 12,
Line 35, "Φ," should read -- $\Phi_s$ --; and
Line 51, "sa" should read -- $s_a$ --.

Column 13,
Line 55, "phoneme ai" should read -- phoneme $a_i$ --.

Column 15,
Line 58, "node ($\Phi_c$)." should read -- node ($\Phi_e$). --.

Column 16,
Line 22, "step sill," should read -- step s111, --.

Column 17,
Line 23, "node $\Phi_o$." should read -- node $\Phi_e$. --; and
Line 45, "step s1 77" should read -- step s177 --.

Column 18,
Line 8, "Step s1 87," should read -- step s187, --.

Column 21,
Line 5, "steps s1 27," should read -- steps s127, --; and
Line 25, "node $\Phi_o$," shoud read -- node $\Phi_e$, --.

Column 25,
Line 66, "is shown" should read -- as shown --.

UNITED STATES PATENT AND TRADEMARK OFFICE
CERTIFICATE OF CORRECTION

PATENT NO.     : 6,882,970 B1
DATED          : April 19, 2005
INVENTOR(S)    : Philip Neil Garner et al.

It is certified that error appears in the above-identified patent and that said Letters Patent is hereby corrected as shown below:

Column 28,
Line 42, "queries. Since" should read -- queries, since --.

Column 29,
Line 26, "phoneme Pr," should read -- phoneme $p_r$, --; and
Line 31, "phoneme (Pr)" should read -- phoneme ($p_r$) --.

Column 31,
Line 54, "vectors a and a," should read -- vectors a and q, --.

Column 32,
Line 42, "parameter a," should read -- parameter $\alpha$, --; and
Line 64, "a is" should read -- $\alpha$ is --.

Column 33,
Line 4, "a may" should read -- $\alpha$ may --; and
Line 16, "A" should read -- $\bar{A}$ --.

Column 39,
Line 12, "measures" should read -- measure --; and
Line 32, "score" should be deleted.

Column 40,
Line 37, "comprises;" should read -- comprises: --.

Column 43,
Line 3, "claims 70," should read -- claim 70, --.

Column 45,
Line 19, "claim 57" should read -- claim 58 --.

Column 46,
Line 58, "of;" should read -- of: --.

Column 48,
Lines 49 and 51, "labels;" should read -- of labels; --.

UNITED STATES PATENT AND TRADEMARK OFFICE
CERTIFICATE OF CORRECTION

PATENT NO. : 6,882,970 B1
DATED : April 19, 2005
INVENTOR(S) : Philip Neil Garner et al.

It is certified that error appears in the above-identified patent and that said Letters Patent is hereby corrected as shown below:

Column 51,
Line 7, "and in that said" should read -- and ¶ wherein --.

Signed and Sealed this

Eighth Day of November, 2005

JON W. DUDAS
*Director of the United States Patent and Trademark Office*